United States Patent [19]
Lombardi

[11] Patent Number: 5,889,951
[45] Date of Patent: Mar. 30, 1999

[54] SYSTEMS, METHODS, AND COMPUTER PROGRAM PRODUCTS FOR ACCESSING, LEASING, RELOCATING, CONSTRUCTING AND MODIFYING INTERNET SITES WITHIN A MULTI-DIMENSIONAL VIRTUAL REALITY ENVIRONMENT

[75] Inventor: Julian Lombardi, Greensboro, N.C.

[73] Assignee: Viewpoint Corporation, Greensboro, N.C.

[21] Appl. No.: 647,592

[22] Filed: May 13, 1996

[51] Int. Cl.$^6$ .................................................. G06F 13/00
[52] U.S. Cl. ...................................................... 395/200.49
[58] Field of Search .................. 395/200.49, 200.33, 395/200.47, 200.48, 200.32, 200.59, 200.54, 200.58, 200.55, 200.36, 200.34, 200.57

[56] References Cited

U.S. PATENT DOCUMENTS

| | | | |
|---|---|---|---|
| 4,209,787 | 6/1980 | Freeny, Jr. | 343/112 |
| 4,217,588 | 8/1980 | Freeny, Jr. | 343/112 |
| 4,232,317 | 11/1980 | Freeny, Jr. | 343/112 |
| 4,528,643 | 7/1985 | Freeny, Jr. | 364/900 |
| 5,452,468 | 9/1995 | Peterson | 395/800 |
| 5,485,609 | 1/1996 | Vitter et al. | 707/101 |
| 5,548,722 | 8/1996 | Jalalian et al. | 395/200.5 |
| 5,706,502 | 1/1998 | Foley et al. | 395/610 |
| 5,737,533 | 4/1998 | De Hond | 395/200.49 |

OTHER PUBLICATIONS

"3Dlabs GLINT Chip Brings Real–Time Virtual Reality to the Internet"; *Business Wire;* (Apr. 3, 1995).

James Staten; Virtual reality comes to Internet via Gopher; *MacWEEK;* (May 8, 1995).

Gina Smith; "Whole New Worlds On–Line; S.F. Startup Making Waves With 3–D Virtual Reality World on the Internet"; *The San Francisco Examiner;* (May 14, 1995).

Shawn P. McCarthy; "On Closer Examination, This Must Be the (Virtual) Place"; *Government Computer News.* vol. 14; No. 10; p. 57 (May 15, 1995).

Gail Robinson; "VR on the Net: Too Costly for Prime Time?"; *Electronic Engineering Times;* p. 37; (Jun. 26, 1995).

Larry Lange; "The Internet: Where's It All Going"; *InformationWeek;* p. 30; (Jul. 17, 1995).

Ellen Messmer; "Electronic Commerce Enters Third Dimension"; *Network World;* (Aug. 14, 1995).

Thom Stark; "Virtual Reality: Future of the Web?"; *LAN Times;* (Sep. 25, 1995).

"Encarta 96 Encyclopedia and Encarta 96 World Atlas Hit Shelves With Online Updates for Encyclopedia and 3–D Mapping for Atlas"; *PR Newswire;* (Oct. 2, 1995).

R. Colin Johnson; "Cyber Cowbody Rides VR" *Electronic Engineering Times;* p. 82; (Oct. 16, 1995).

John W. Verity; "A 3–D World for the World Wide Web"; *Business Week;* (Oct. 23, 1995).

Glyn Moody; "VRML Takes the Internet into the Third Dimension"; *Computer Weekly;* p. 35; (Jan. 4, 1996).

"Black Sun Offers 3–D Net Viewer"; *Financial Report;* (Feb. 12, 1996).

(List continued on next page.)

*Primary Examiner*—Moustafa M. Meky
*Attorney, Agent, or Firm*—Myers Bigel Sibley & Sajovec, P.A.

[57] ABSTRACT

The present invention facilitates viewing, organizing, and optimizing Internet sites. A multi-dimensional virtual environment includes one or more respective virtual sites for each Internet site. Users are given the ability to explore the virtual environment and access Internet site data and services via respective virtual site(s). Transfer of data related to an Internet and virtual site includes assigning a transfer priority to each virtual site based on the user's location within the virtual environment, and transferring data based on the assigned priority. Users are provided with the ability to lease portions of the virtual environment, to create and modify the appearance and functionality of virtual sites on leased portions, to assign Internet site data and services to virtual sites, and to relocate virtual sites within the virtual environment.

69 Claims, 47 Drawing Sheets

OTHER PUBLICATIONS

"Virtual Vacation"; (http://www.macuser.ziff.com/~macuser/mu_0795/traveler.html).

"The Virtual Tourist"; (http://www.vtourist.com///webmap/).

"FUNET Suomi–Finland"; (http://www.funet.fi/resources/map.html).

"Southern Finland"; (http://www.funet.fi/resources/maps/suomi–s/).

"Helsinki, Espoo, Vantaa, Kauniainen"; (http://www.funet.fi/resources/maps/capitalarea/).

"Northern Helsinki"; (http://www.funet.fi/resources/maps/helsinki–n/).

Helsinki Metropoitian Area; (http://www.funet.fi/Finland/Helsinki–info.html).

"Integrated Data Systems"; (http://www.ids/net.com/ids/introduc.html).

John R. Vacca; "The Outer Limits; Virtual Reality on the Internet"; *Internet World;* (Mar. 1995); (http://pubs.iworld.com/iw–online/Mar95/feat42.htm).

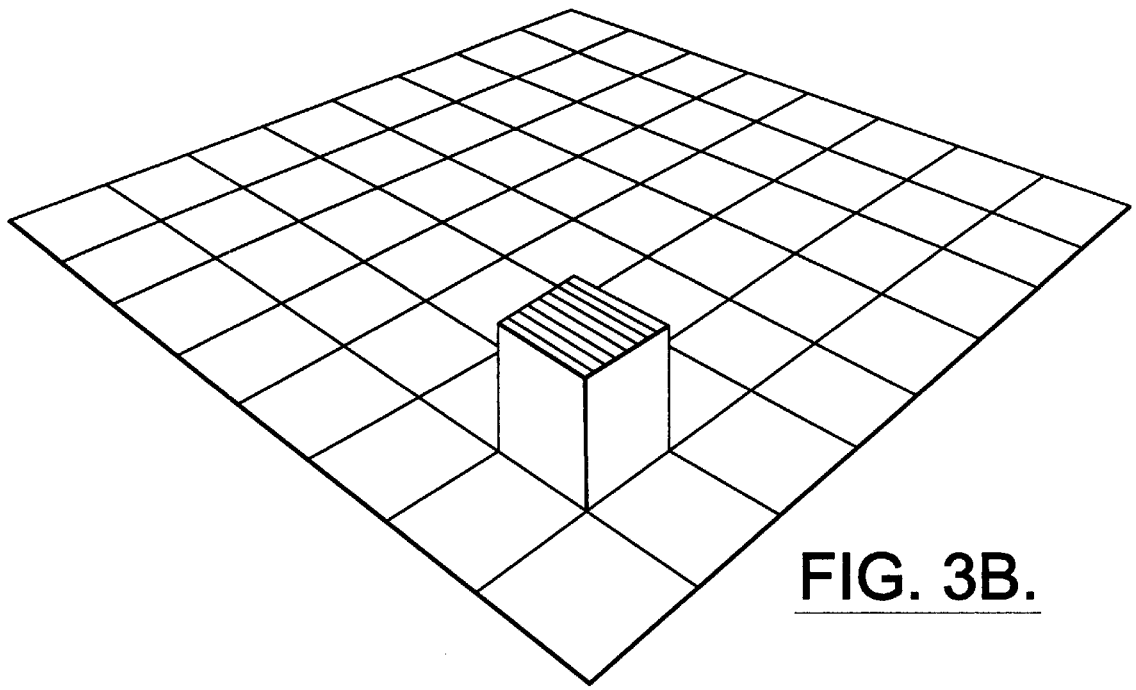

FIG. 3B.

| CLIENT MODULES | |
|---|---|
| STARTUP MODULE | 100 |
| EXPLORE MODULE | 200 |
| AUTO-PILOT MODULE | 300 |
| ACTIVATION MODULE | 400 |
| LEASING CLAIM MODULE | 500 |
| LEASING CONTRACT MODULE | 520 |
| LEASING APPROVAL MODULE | 550 |
| EDITOR MODULE | 600 |
| PRIORITY CACHING MODULE | 700 |
| ASYNCHRONOUS DOWNLOAD MODULE | 800 |
| ACCESSING CACHED DATA MODULE | 900 |

| SERVER MODULES | |
|---|---|
| INITIAL SESSION CONNECTION TO CENSUS SERVER | 1000 |
| SECONDARY SESSION CONNECTION TO CENSUS SERVER | 1100 |

FIG. 4.

SYSTEMS, METHODS, AND COMPUTER PROGRAM PRODUCTS FOR ACCESSING, LEASING, RELOCATING, CONSTRUCTING AND MODIFYING INTERNET SITES WITHIN A MULTI-DIMENSIONAL VIRTUAL REALITY ENVIRONMENT

FIELD OF THE INVENTION

The present invention relates generally to computer networks, and more particularly to the Internet.

BACKGROUND OF THE INVENTION

The Internet is a worldwide decentralized network of computers having the ability to communicate with each other. Until fairly recently, the Internet was used mostly for communicating via electronic mail (e-mail), or for locating and transferring data through such services as "Gopher", "WAIS", "Archie", and "FTP." The programs for locating and transferring data typically utilized menus and other text-based interfaces.

The World Wide Web (hereinafter the "Web") was created in the early 1990's, and is comprised of many Internet sites (computers connected to the Internet) having hypertext documents or "Web pages" that can be accessed by users via a "browser" program (for example, Navigator™ and Mosaic). When viewed via a browser, a Web page typically displays text and color graphics, and can play sound, animation, and video clips. Through the Web, users can access the various Internet services, including Gopher, Telnet, and FTP.

Web pages, written in Hypertext Markup Language (HTML), contain hypertext links (usually highlighted keywords) that provide access to other web pages, even those on other Internet sites. When a user selects a particular hypertext link, the Web browser reads and interprets the address, called a URL (Uniform Resource Locator) associated with the link and then connects the user's computer with the Internet site (computer) at that address. A URL gives the type of resource being accessed (e.g., Gopher, WAIS) and optionally the path of the file sought. For example: resource://host.domain/path /filename, wherein the resource can be "file", "http", "gopher", "WAIS", "news", or "telnet".

Therefore, to travel the Internet and view a particular file, a user must generally either know the URL for the Internet site and file he/she wishes to visit and enter it directly into the browser, or the user must activate a hypertext link to the Internet site and file provided in a Web page. Consequently, a major drawback of current Internet browsing software is that users are generally unable to "view" the Internet as one traveling around the world in an automobile or airplane would. The Internet is basically a "black box" that users can "reach in" and "pull" information out of, but cannot see in its entirety. Search engines are available for providing listings of Internet sites having certain common characteristics. However, traveling to any of the listed Internet sites generally requires activation of a link. The user is unable to see where he or she is going.

Another drawback of current Internet browsing software is the slowness or "lag time" that is often encountered when accessing an Internet site. When a user selects a particular Internet site, access is generally not instantaneous. Current technology employing HTML or Virtual Reality Modeling Language (VRML) generally requires that complex graphical data be downloaded from an Internet site and then rendered on the user's computer. Consequently, a user must wait for the computer to download data from the Internet site; a process which can take anywhere from a few seconds to more than a few minutes. Lag time is caused by, among other things, the large size of images and graphics, and the low relative bandwidth of the Internet and most communications networks connected to the Internet.

SUMMARY OF THE INVENTION

It is therefore an object of the present invention to provide users of the Internet with the ability to see Internet sites before selecting to use their services, thereby eliminating the need for HTML/VRML links and knowledge of Internet site URLs.

It is another object of the present invention to reduce the time required to download data from an Internet site.

It is yet another object of the present invention to facilitate the organization of Internet sites.

Users of the present invention are provided with systems, methods, and computer program products for accessing a plurality of Internet sites displayed as a multi-dimensional (two dimensional or three-dimensional) virtual environment. Each of the many Internet sites is represented by at least one virtual site in the multi-dimensional virtual environment, wherein the virtual sites have a geographic relationship in the displayed multi-dimensional virtual environment which is different from the actual geographic relationship of the plurality of Internet sites. Access to each Internet site is made via one or more of its respective virtual sites in the displayed virtual environment.

Internet site owners, virtual site owners, and/or other providers of information or services through the Internet are referred to herein as "service providers." Also, the term "users" refers to all parties who utilize the present invention, including service providers and non-service providers. Users will have navigating ability to move, via a reference, through the virtual environment exploring Internet resources as if they were travelling via some means (walking, driving, flying, and the like) within the "real world", without the perception of lag time involved in current "real time" Internet exploring. Direction and speed of the reference are controllable by the user so that the user can "wander" wherever desired, and at whatever speed desired. In addition, speed, distance, and elevation, relative to virtual sites, may be manually or automatically adjusted during navigation.

The present invention is advantageous because it provides users with the ability to travel from virtual site to virtual site without requiring hypertext links or knowledge of Internet site addresses (URLs). The present invention provides virtual physical form to the Internet and allows users to "see" what's along the "highway" as they travel to and between sites. The term "Internet sites", as used herein, includes any Internet-connected computers which provide text, audio, video, images, and the like, as well as Internet services. Exemplary sites include Web sites, Gopher sites, WAIS sites, FTP sites, e-mail sites C-U-See-Me sites, and Internet phones (both peer-to-peer and server based), all of which may be offered by a single Internet site.

Client-server software programs and databases may be used to implement the present invention. Client software typically provides the terrain engines necessary to navigate the virtual environment, the editing programs necessary to modify the virtual environment, the editing programs necessary to construct two and three-dimensional sites within the virtual environment, and communications programs for communicating with various Internet sites. One or more client databases, provided via a CD-ROM or other computer readable media, contains computer program code for generating the virtual environment including data relating to Internet sites represented therein.

The present invention includes Internet site data caching, wherein the transfer to a user of Internet site data and virtual site data may be initiated before a user arrives at a respective virtual site, thereby reducing the user's idle time. Data transfer time may or may not be reduced, but all or part of the data transfer may occur before the user is prepared to examine it. The present invention allows the process of transferring data across the Internet to become more transparent to the user.

Data transfer may be initiated when a user's reference approaches within a predetermined distance from a respective virtual site. In addition, data transfer may be accomplished by assigning a data transfer priority to a plurality of virtual sites, and then transferring data based on the data transfer priority assigned to a respective virtual site. Priorities may be assigned based on the distance of the reference from virtual sites, and based upon the data contained at an Internet site. In addition, priorities may be assigned based upon the orientation and speed of the reference, as well as on user behavior. Priorities may also be assigned based on virtual site characteristics, including whether a virtual site is landmarked. Internet site data may be transferred from the actual Internet site, from computer usable media, or from both the actual Internet site and computer usable media.

A user of the present invention may move through the virtual environment in "explore" mode and "auto-pilot" mode. In explore mode, completely free motion is available to the user. The user typically uses an input device to control movement through the virtual environment. In explore mode the user basically is given the ability to wander at will through the virtual environment. In auto-pilot mode, the user is automatically guided to virtual coordinates or a virtual site representing respective Internet site(s) and data related to a corresponding Internet site may be simultaneously cached by the client software. Auto-pilot mode may be engaged by selecting a percept, inputting virtual coordinates, selecting a landmark, starting a tour, activating an applet or script, inputting a URL, and the like. When auto-pilot mode is engaged, the user, via the reference, may be elevated and is accelerated from his/her present location towards the virtual coordinates or virtual site. As the user reaches his/her destination, the reference is gradually decelerated. This method of acceleration and deceleration allows the user to assess his/her virtual surroundings while departing from and arriving at virtual coordinates or a virtual site. During acceleration, travel, and deceleration, data related to corresponding Internet sites may be downloaded to the user's computer. This ability to view the surrounding environment and the virtual sites contained therein present the user with the ability to become aware of virtual sites which have located in the neighborhood of the user's departure and arrival.

The present invention is advantageous over existing web browsers for several reasons. It allows a user to browse all Internet services and not just Internet services on the Web. It significantly reduces the lag time perceived by a user during downloading of information as users access Internet sites. In addition, the present invention permits, computer usable media on the user's computer to contain information related to various Internet sites that will decrease the necessity of downloading information, and therefore decrease the downloading time. Consequently, the lag time currently experienced when accessing Internet sites is significantly decreased by the present invention.

The present invention is designed to promote self-organization of Internet sites within a multi-dimensional virtual environment. Service providers are given the ability to relocate virtual sites within the virtual environment with relative ease. The present invention represents an Internet operating system capable of allowing the structure and organization of the Internet to self-optimize through selective processes over time, resulting in evolutionary modification and adaptive traits at the organizational level of the Internet. Traditional market pressures, such as the need to efficiently use resources, are allowed to influence service providers to position their virtual representations in relation to other service provider's representations.

Users of the present invention are provided with the ability to select and lease discrete units of virtual terrain within the multi-dimensional virtual environment representing the Internet, and construct two or three-dimensional structures upon these leased units representing their actual Internet sites. The appearance and functionality of virtual sites and their contents within the multi-dimensional virtual environment are also modifiable. In addition, portions of the multi-dimensional virtual environment may be modified. Portions of the 3D virtual environment may be leased via a central server (or multiple servers) connected to the Internet. On-line communications with this central server(s) permits information about the activities of service providers in the multi-dimensional virtual environment to be available to all users. Activities may include the location and size of all leased virtual sites and the length of time the virtual sites have been leased.

The client database(s) and software may be available to users on a subscription basis, wherein the multi-dimensional virtual environment will be updated regularly to incorporate changes made by service providers. By allowing users to lease portions of the virtual environment and construct virtual sites thereon, it is expected that Internet sites will organize themselves in a way similar to that of the real world. For example, a mail order house in California that leases a portion of the virtual environment and establishes a site thereon, may soon find that another mail order house based in New York offering competitive services leases a portion of the virtual environment nearby and moves its site thereto.

As another example, sites related to financial services may tend to congregate together to form a virtual "Wall Street." It is expected that sites with something in common will locate near each other, and that various virtual "communities" of virtual sites offering different and at times complementary services will also evolve. In addition, it is expected that portions of the virtual environment may be leased between virtual sites and communities upon which advertising may be placed, similar to billboards located along a highway.

The present invention also permits virtual site modification wherein the appearance and functionality of virtual sites within the virtual environment can be modified. The present invention also permits virtual environment modification wherein portions and properties of the virtual environment can be modified.

BRIEF DESCRIPTION OF THE DRAWINGS

FIG. 3B illustrates a 3D or landscape view of a virtual site in a virtual environment.

FIG. 4 illustrates various modules of client and server software.

DETAILED DESCRIPTION OF THE PREFERRED EMBODIMENTS

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
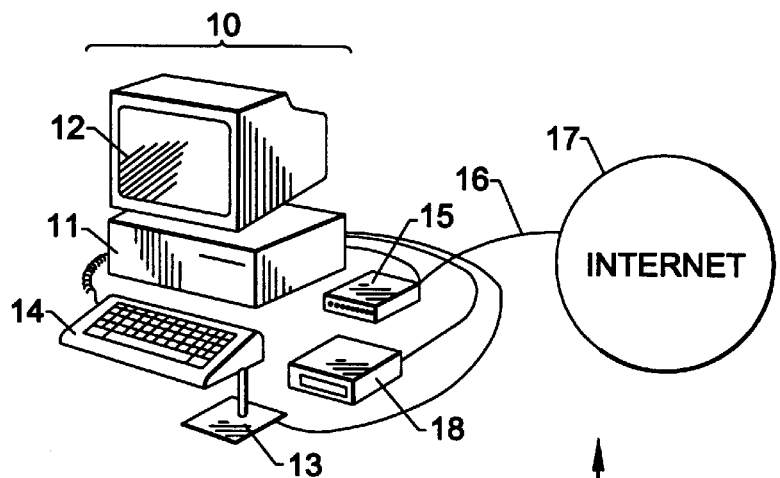
FIG. 1 schematically illustrates a preferred hardware configuration for implementing the present invention.

Referring now to FIG. 1, a preferred hardware configuration for implementing the present invention is illustrated. A computer 10, such as an Apple®, IBM®, or IBM-compatible personal computer, preferably includes a central processing unit 11, a display 12, a pointing device 13, a keyboard 14, access to persistent data storage 15, and an Internet connection 16 for connecting to the Internet 17. The central processing unit 11 contains one or more microprocessors (not shown) or other computational devices and random access memory (not shown) or its functional equivalent, including but not limited to, RAM, FLASHRAM, and VRAM for storing programs therein for processing by the microprocessor(s) or other computational devices. A portion of the random access memory and/or persistent data storage, referred to as "cache," is utilized by the present invention to store client software information, client data information and information related to Internet sites and virtual sites.

The present invention may be implemented via other computing devices, including, but not limited to, mainframe computing systems and mini-computers. Preferably, the computer used to implement the present invention has at least six-hundred (600) megabytes of persistent computer storage, and a graphics display device. Although it is preferable to use a high resolution color display and graphics accelerator card, a black and white display or standard broadcast or cable television monitor may be used. It will be understood that a computer or other apparatus configured to execute the program code, embodied within computer usable media, operates as means for performing the various functions and carries out the methods of the various operations, according to the present invention.

A device 18 is provided for loading computer readable media, such as a CD-ROM, tape, or disk. Alternatively, device 18 may be replaced or augmented by the distribution of data, including client software and database(s), via the Internet through Internet connection 16. The keyboard 14, having a plurality of keys thereon, is in communication with the central processing unit 11. A pointing device 13, such as a mouse or joystick(s), is also connected to the central processing unit. It is understood by those having skill in the art that many forms of pointing devices are used in data processing systems. Henceforth, any reference hereinafter to a pointing device will include a 2D or 3D mouse, gamepad, joystick, trackball, pen, touchscreen, keyboard, and the like. The Internet connection 16 may be made via traditional phone lines, ISDN link, T1 link, cable (television), ethernet (direct network), and the like.

The present invention will employ a simulated Heads-up Display (HUD) to enhance navigation through the virtual environment. A HUD display is advantageous for facilitating user orientation within the virtual environment, and for identifying distant sites and objects. Preferably, information related to virtual sites within the virtual environment will appear to the user through the HUD display during navigation. Such information may include virtual site distance from the reference, keywords about the site, company logos, and the like.

Stored computer readable program code also acts as means for carrying out the various methods and functions of the present invention. Computer readable program code means is provided for displaying virtual sites representing one or more of the plurality of Internet sites within a multi-dimensional virtual environment. Computer readable program code also acts as means for navigating, in response to user inputs, through the virtual environment, and for becoming aware of and/or accessing selected ones of the Internet sites via respective virtual sites in the displayed multi-dimensional virtual environment. Computer readable program code also acts as means for automatically adjusting the speed, distance and elevation of the reference relative to virtual sites during navigation of the three-dimensional virtual environment.

Computer readable program code is provided as means for reducing the time perceived by a user to receive Internet site data, by initiating the transfer of data related to an Internet site before a user's reference arrives at a respective virtual site for purposes of accessing data contained therein. Computer readable program code is provided as means for reducing a user's idle time during download of data by exposing the user to virtual sites other than those that are being downloaded. Computer readable program code means is provided for initiating the transfer of data related to an Internet site when a user's reference approaches within a predetermined distance from a respective virtual site. Computer readable program code means is provided for assigning a data transfer priority to a plurality of virtual sites, and for transferring data related to an Internet site based on the data transfer priority assigned to a respective virtual site. Computer readable program code means is provided for transferring Internet site data from an Internet site, for transferring Internet site data from computer usable media, and for transferring Internet site data from both an Internet site and from computer usable media.

Computer readable program code also acts as means for providing users with the ability to lease portions of the virtual environment, and to relocate virtual sites within the virtual environment. Computer readable program code also provides users with the ability to modify the appearance and functionality of virtual sites within the virtual environment, and to modify portions of the virtual environment. Computer readable program code also acts as means for communicating information about leased portions of the virtual environment to users, for communicating information about the relocation of virtual sites within the virtual environment to users, and for incorporating this information within the client database(s).

The Virtual Environment

Figure 2A:
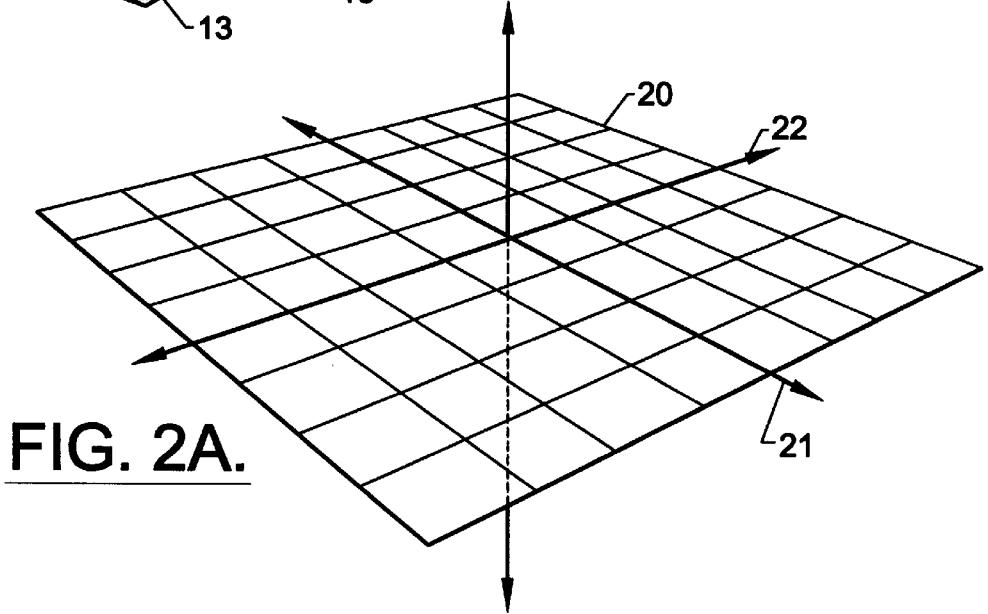
FIG. 2A illustrates a Cartesian plane upon which the coordinates of a virtual environment are based.
Figure 2B:
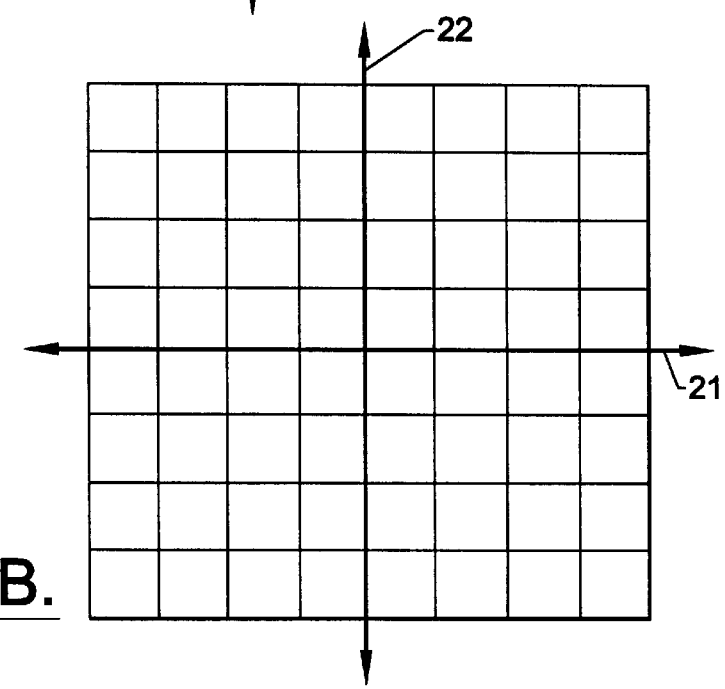
FIG. 2B illustrates a virtual environment as a two-dimensional surface.
Figure 2C:
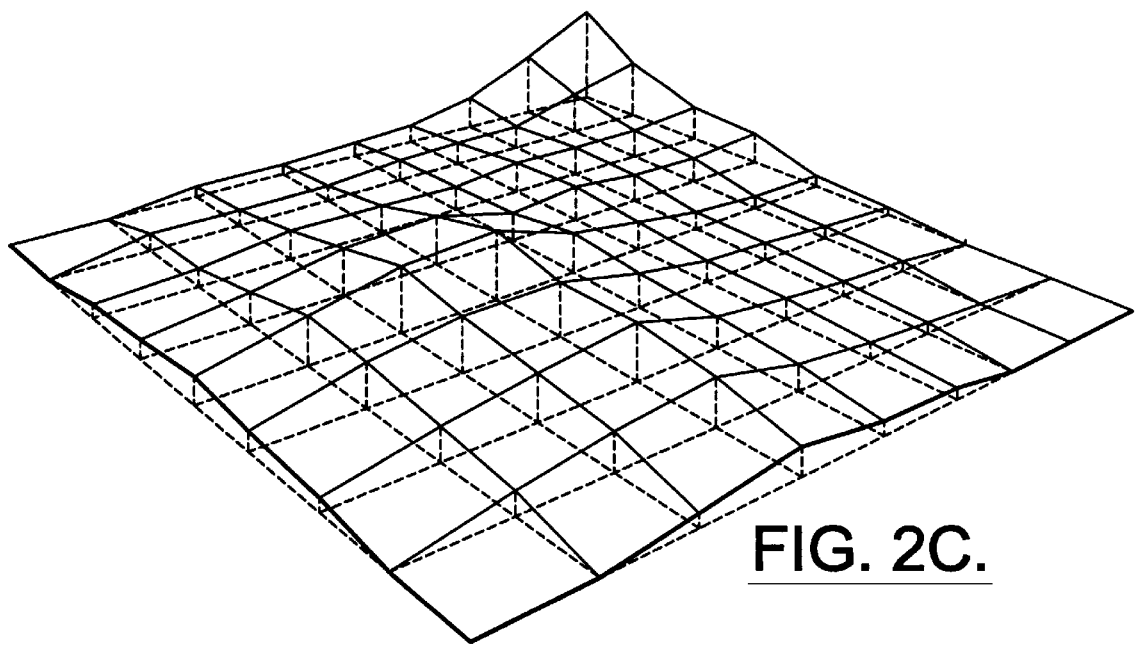
FIG. 2C illustrates a virtual environment as a 3D topographical landscape.

Referring now to FIGS. 2A–2C, a general overview of a 3D virtual environment, according to the present invention, will be provided. As shown in FIG. 2A, a virtual environment utilizes a coordinate system 20, comprising "X" and "Y" axes 21,22 perpendicular to each other in the same plane. A coordinate system is established on this "X" and "Y" plane, and defines the domain of the virtual landscape. The coordinate system 20 may wrap around to join itself on the edges of the domain, and thereby create a continuous surface without edges. For example, if a user was to move along one axis in the coordinate system 20 beginning at coordinates (0,0), then the user would eventually return to that point (0,0). The virtual environment may be viewed in "map view mode" as a two-dimensional surface, as illustrated in FIG. 2B, or may be viewed in "landscape mode" as a 3D topographical landscape as illustrated in FIG. 2C.

In order to render a complex and detailed terrain in landscape mode, the coordinate system 20 inherits a third dimension defined by a "Z" axis perpendicular to the plane defined by the "X" and "Y" axes 21,22 (FIG. 2C). The terrain viewed in landscape mode is generated by a terrain engine which comprises one or more mathematical function(s) defined for part or all of the coordinate system's domain. When given a particular set of coordinates in the coordinate system 20, the terrain engine will return a height value (Z axis coordinate). Such location and height pairs comprise a three-dimensional mesh, which is then fed to a graphics engine for rendering the virtual terrain. These functions produce a variably irregular surface similar to that of a natural landscape.

Figure 3A:
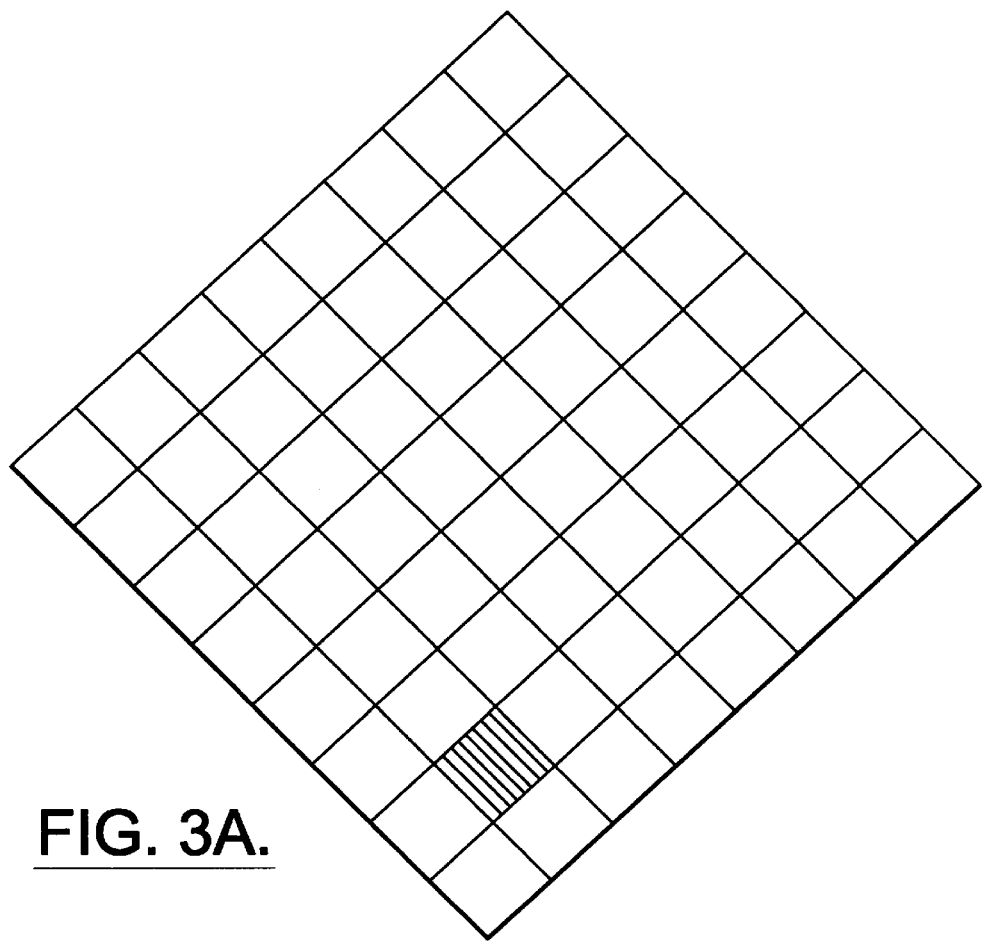
FIG. 3A illustrates a two-dimensional or map view of a virtual site in a virtual environment.

Located within the virtual environment, virtual sites are virtual representations of actual Internet sites and their services, although it is possible that a virtual site may not grant access to a representative Internet site or its services. A two-dimensional or "map view" of an Internet site in the virtual environment is illustrated in FIG. 3A. A three-dimensional (3D) or "landscape" view of a simple virtual site is illustrated in FIG. 3B. Also available, in either landscape or map view mode, are a variety of special effects. For example, atmospheric effects can be rendered to produce changes in the appearance of the sky (haze, sun, moon, stars, clouds) as well as changes in the overall virtual environment (nighttime, daytime). Additional effects can be generated by applets or scripting languages capable of two or three-dimensional graphics output.

Virtual sites may comprise visible and invisible objects, triggers, inactive and active zones, sources, features, scripts, and applets. However, features may or may not be directly associated with a virtual site. An object is a tangible virtual convex polyhedron or polygon, as described in greater detail below. A trigger is an object which provides a mechanism for accessing services or information from an Internet site(s) and/or modifying the virtual environment. The term "tangible" means that a user cannot pass through the surface of the object, but must go around the surface of the object. Three-dimensional objects are typically represented as a combination of convex polyhedra and/or polygons. As is well known to those having skill in the art, a convex polyhedron is a three-dimensional structure which is completely bounded by a plurality of flat surfaces, such that any two points inside the polyhedron may be connected by a line which does not cross any of the surfaces of the polyhedron. Typical examples of convex polyhedra include cubes, cylinders and pyramids. In addition, a single two-dimensional polygon may be used to represent a two-dimensional object.

A zone is an intangible convex polyhedron. The term "intangible" means that a user may pass through the surface of a polyhedron or polygon. An active zone is a zone that, when entered by the reference, causes the activation of a service or the transfer of information provided by an Internet site(s), and/or modification of the virtual environment. A feature is a perceivable geographic aspect of the virtual terrain, such as, but not limited to, a lake, peninsula, mountain range, and the like.

Each virtual site includes one or more units of virtual terrain defined by "X" and "Y" coordinates, and preferably, a predetermined amount of space above and/or below the plane, defined by "Z" coordinates. Preferably, the surface portion of the virtual environment and any portion above or below it, will be overlaid with a variable color texture map mosaic based on a discrete set of textures resident within the client software on or computer usable media and perhaps updated with each new release of the client database. Default assignments of texture maps and elevations to specific virtual sites within the virtual environment will be determined by the client software. Texture maps can be modified, both in texture and in location, by service providers. In addition, terrain elevations may be modified by service providers.

Initially, several virtual sites may be scattered throughout the multi-dimensional virtual environment for providing access to all Internet sites. Each of these initial virtual sites would be responsible for a subset of all Internet sites. It should be understood, that any relocation of a virtual site within the virtual environment does not change the address (URL) of the actual Internet site.

The overall visual effect of the virtual environment is similar in appearance to that rendered in virtual reality programs such as Flight Unlimited® by Looking Glass Technologies®. However, unlike conventional virtual reality programs wherein the landscape is static, the present invention is dynamic in that it provides service providers with the ability to modify the virtual environment so that the modifications become perceivable by users. Furthermore, the ability for multiple users at different physical locations to access the same dynamically changing virtual landscape and structures thereon, is a feature heretofore unavailable in virtual reality programming as it relates to the Internet.

Users of the present invention will be able to travel the virtual environment and see virtual representations of actual Internet sites. Therefore, the present invention provides a means by which Internet sites are related in a way not possible with current Internet technologies. The present invention is embodied in user software and client databases, as described in detail below.

Client Software

Referring to FIG. 4, the client software comprises a plurality of modules, each having specific functions, as described in detail below. Each module comprises computer code written in C++. However, the present invention may be written in other conventional programming languages such as FORTRAN or COBOL. The client software runs on current standard desktop computer platforms such as, but not limited to, Windows®, Windows 95®, Windows NT®, UNIX®, and OS/2®. The present invention utilizes, in part, many standard features of current desktop configurations, such as the ability to store data locally, connect to the Internet, and display visual information.

It will be understood by those having skill in the art that one or more of the steps of each module may be implemented using computer readable program code, embodied within computer usable media, executing on a general purpose computing system, on a special purpose computing system, or on a combination thereof. It will also be understood that, for the flow charts described below for each module, each block, and combinations thereof, may be implemented by computer program instructions. These computer program instructions may be loaded into a computer or other programmable apparatus to produce a machine, such that the instructions which execute on the computer or other programmable apparatus create means for implementing the functions specified in the flow chart block or blocks.

The computer program instructions may also be stored in computer readable media (including magnetic media, optical media, read only memory, random access memory, and the like) that can direct a computer or other programmable apparatus to function in a particular manner, such that the instructions stored in the computer readable media produce an article of manufacture including instruction means which implement the function specified in the flow chart block or blocks for each module. The computer program instructions may also be loaded into a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks for each module.

Figure 13A:
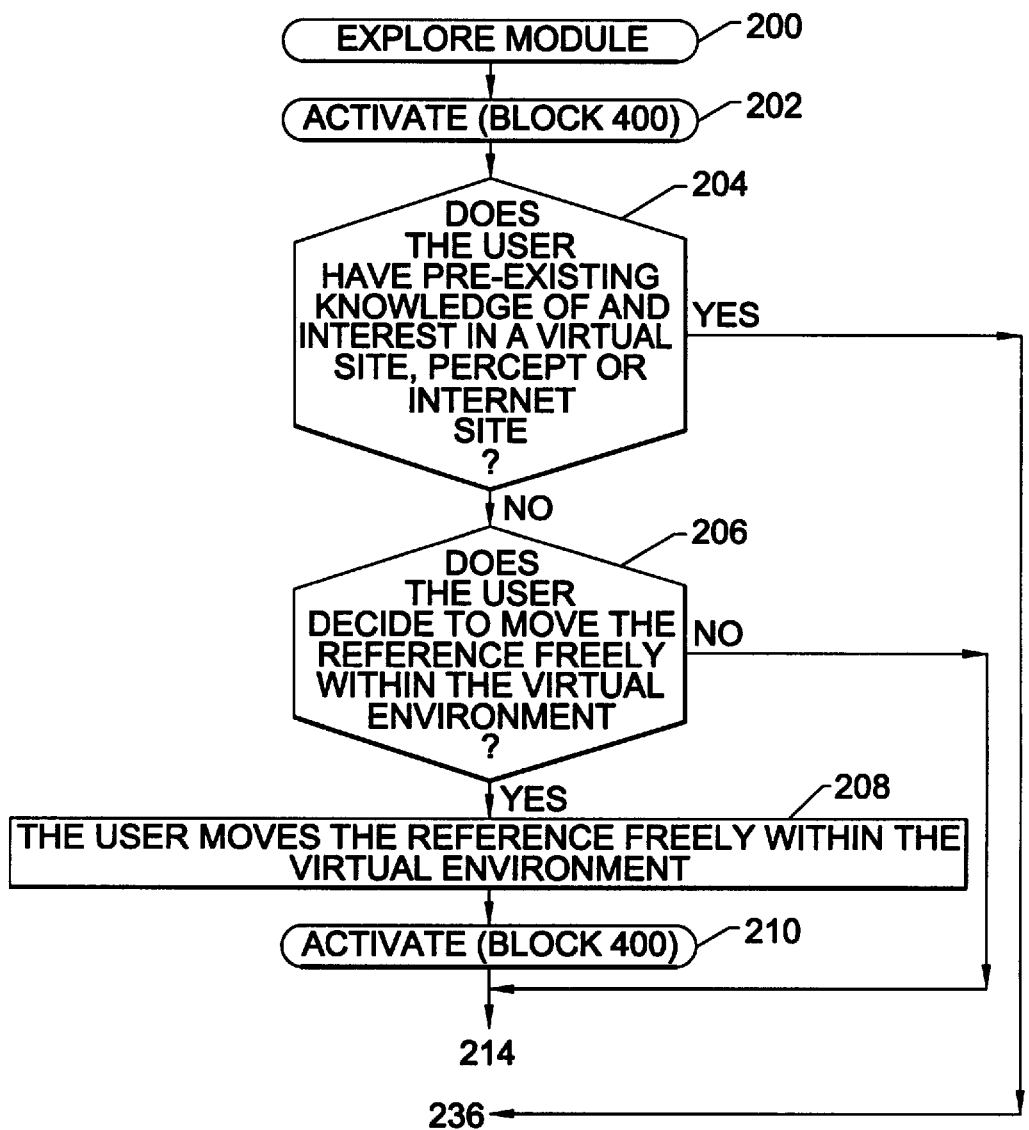
FIGS. 13A–13F are flow charts illustrating operations for the Explore Module, according to the present invention.
Figure 13B:
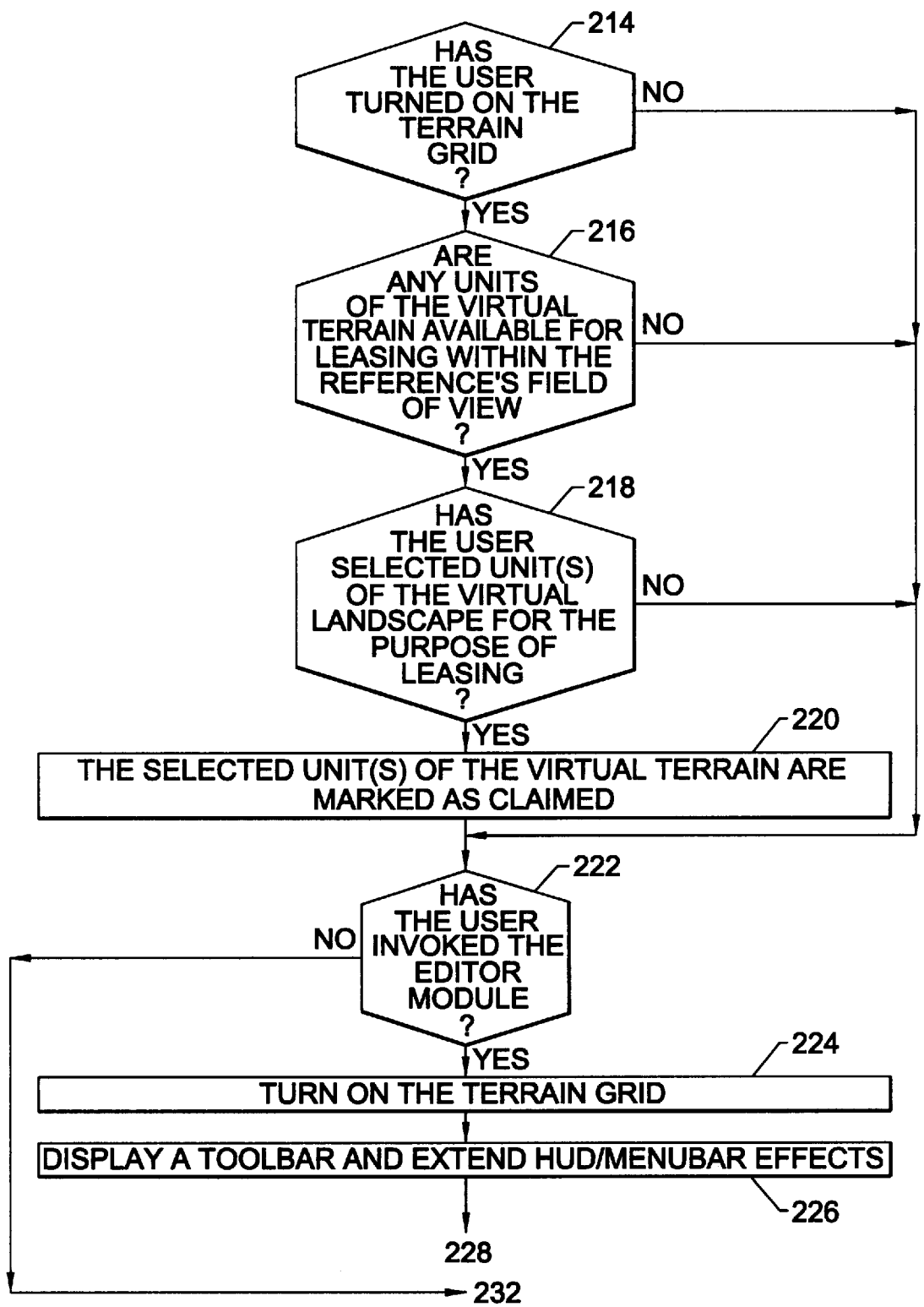
Figure 13C:
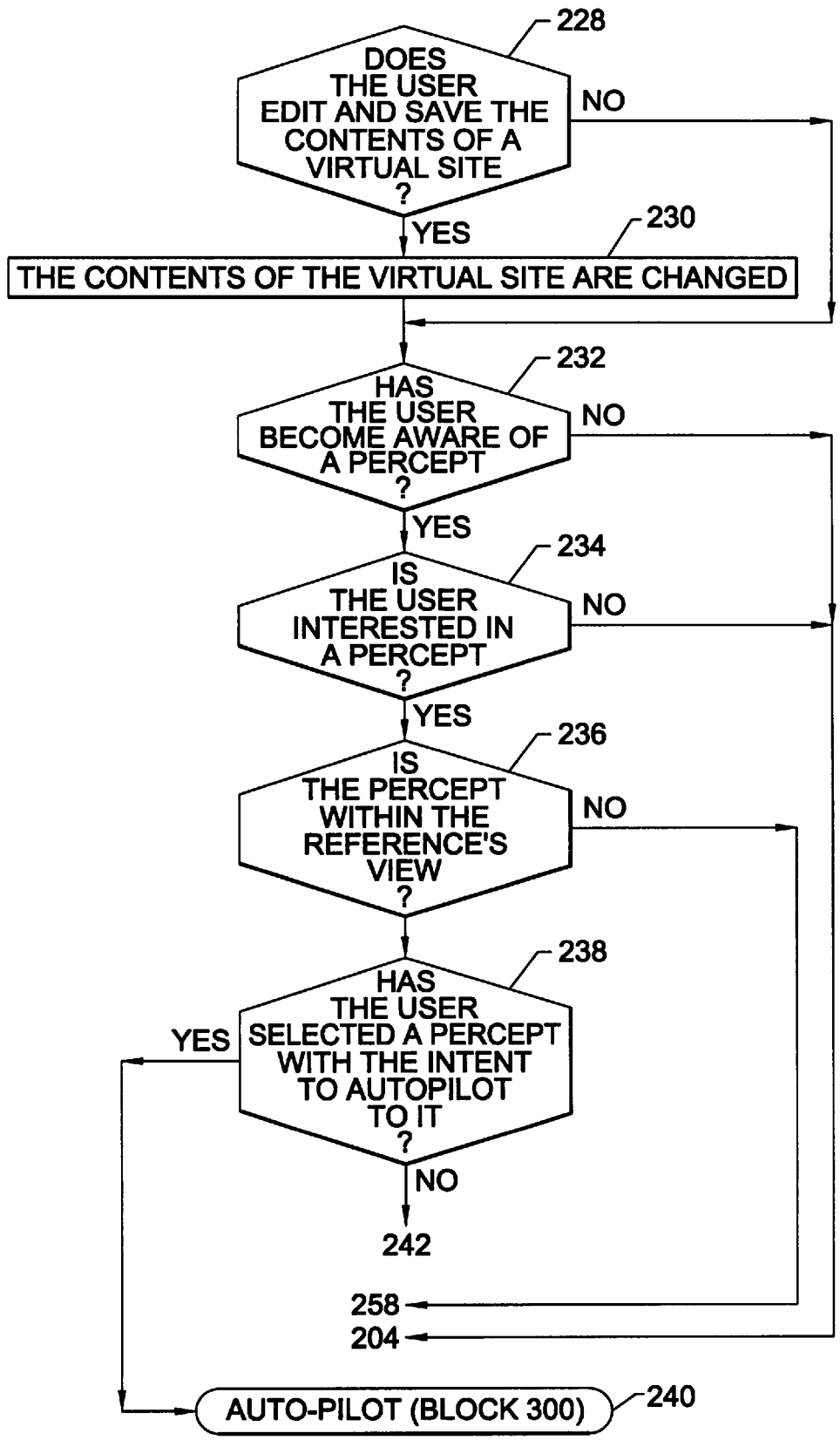
Figure 13D:
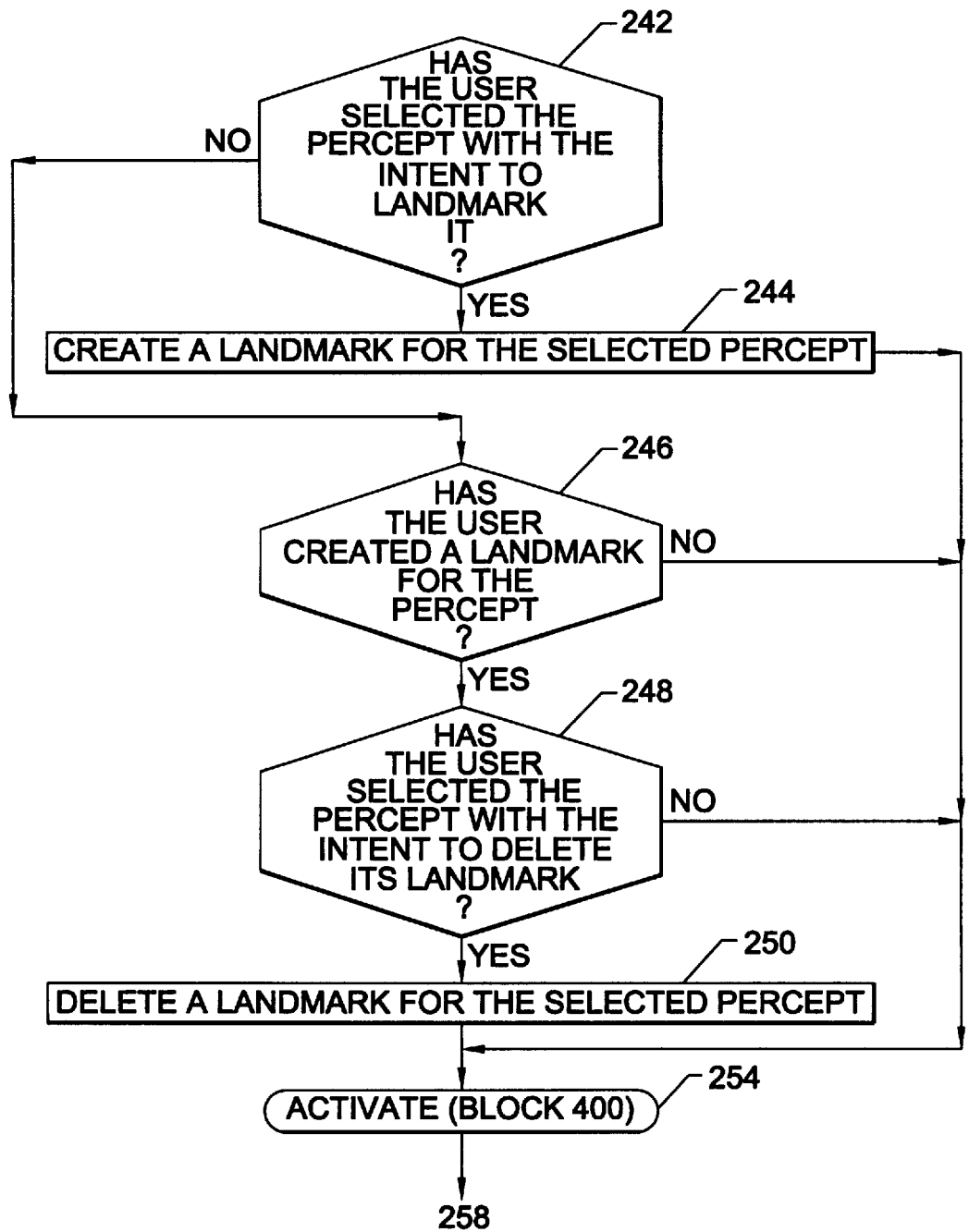
Figure 13E:
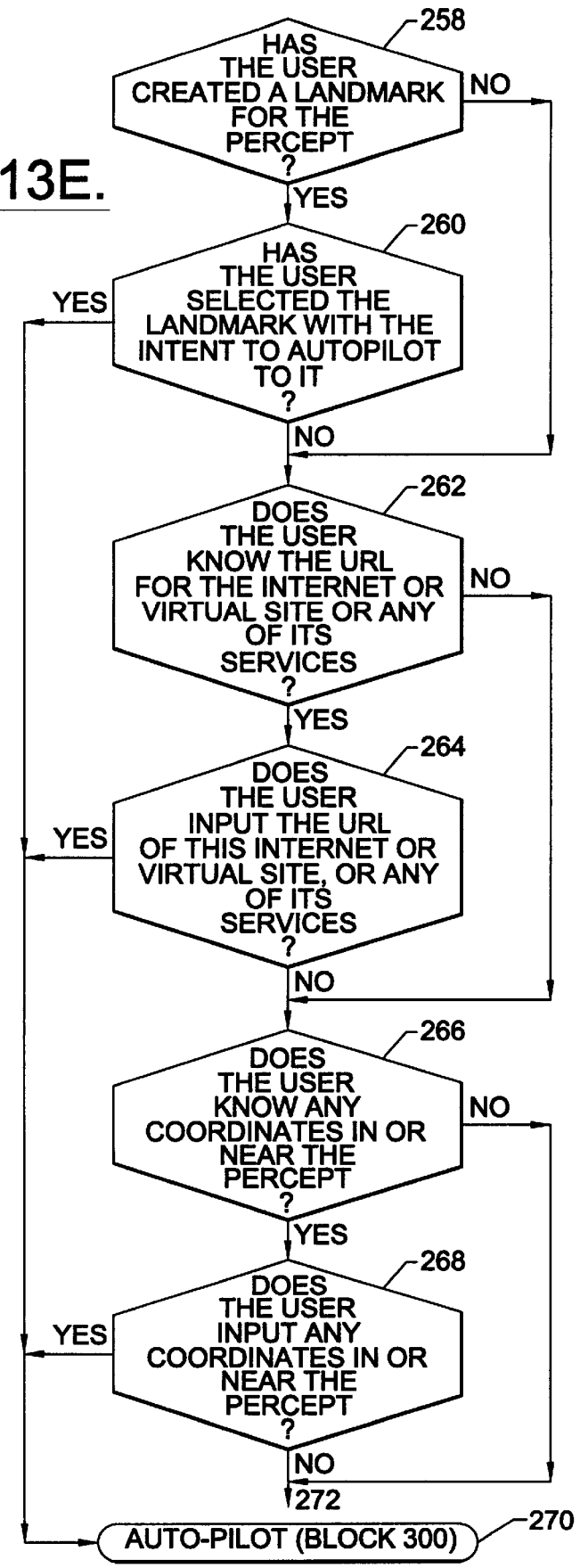
Figure 13F:
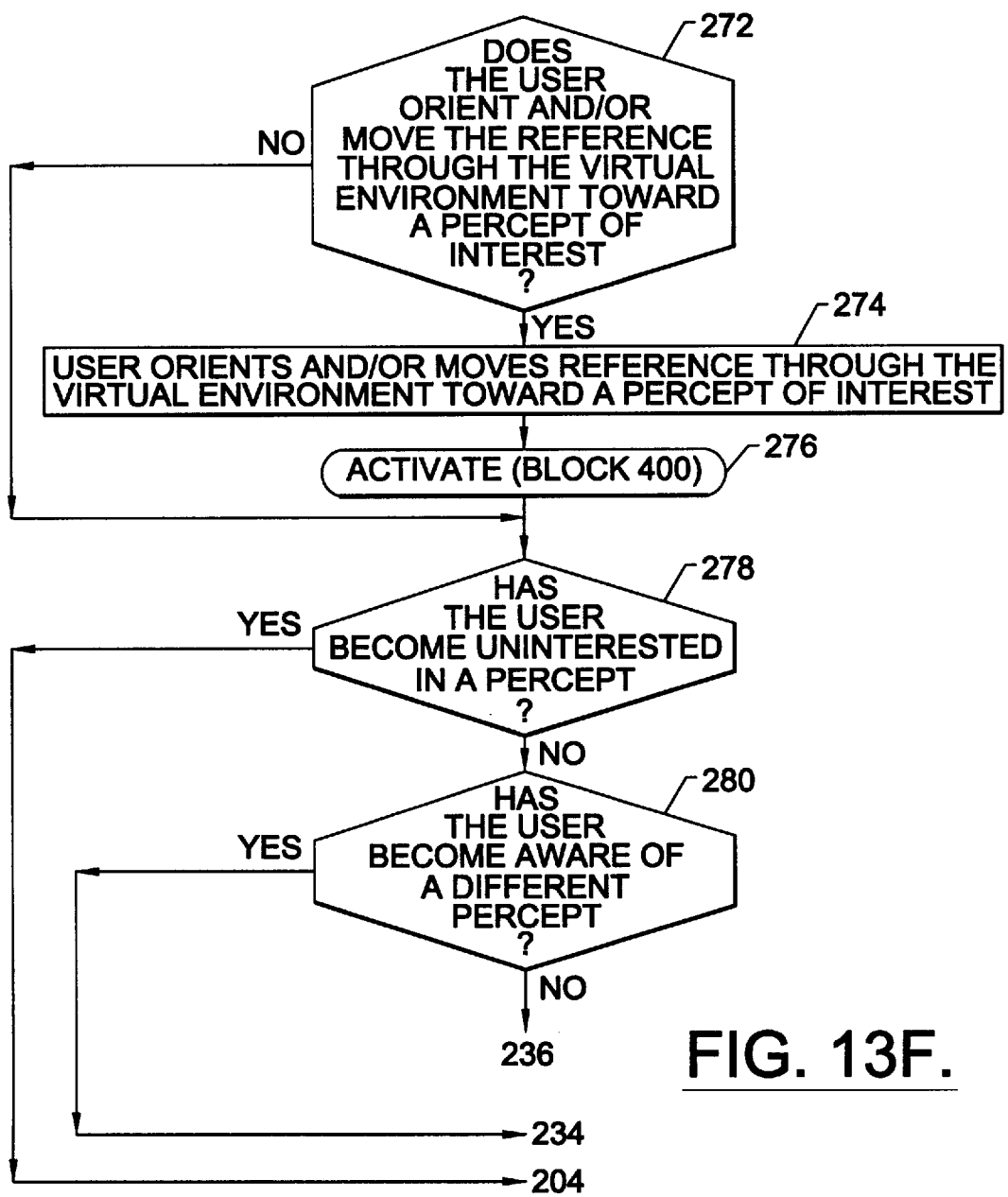

Some blocks in the illustrated flow charts represent the user's state of mind. For example, Block 234 (FIG. 13C) represents the user's decision as to whether he/she has become interested in a particular precept. It is understood that the user's decisions and state of mind are not input into the computer, but is manifested by user action. For example, if a user has become interested in a percept in Block 234 this is manifested by the user continuing to move freely within the multi-dimensional virtual environment. Decision blocks representing user decisions and the like are provided to add clarity to the overall invention.

Figure 5:
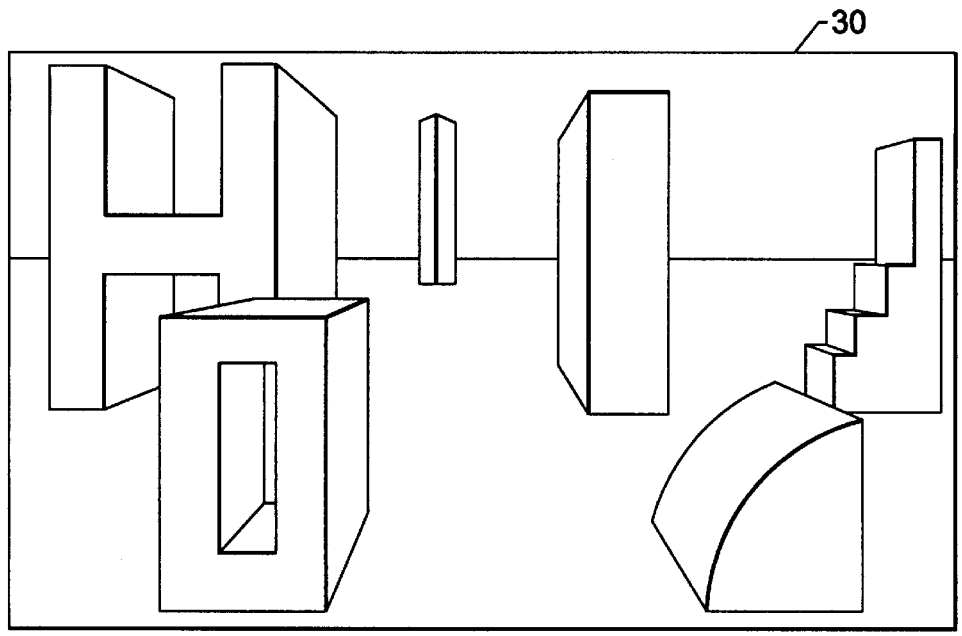
FIG. 5 illustrates a reference, as seen by a user during navigation of a virtual environment.

To navigate the 3D virtual environment, a reference 30 is provided by the client software and is displayed on the computer screen during navigation, as illustrated in FIG. 5. The reference 30 is defined as the point of view from which the virtual environment and structures therein will be rendered, and is defined by "X", "Y", "Z" coordinates. The term "Y","Z" coordinates.

Figure 6A:
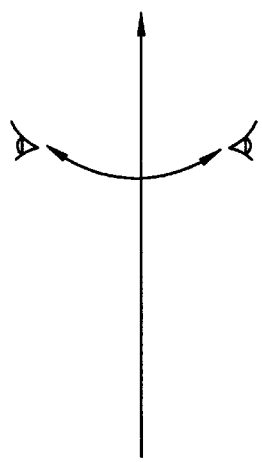
FIGS. 6A–6C illustrates orientation of the field of view of the reference in a virtual environment with six degrees of freedom.
Figure 6B:
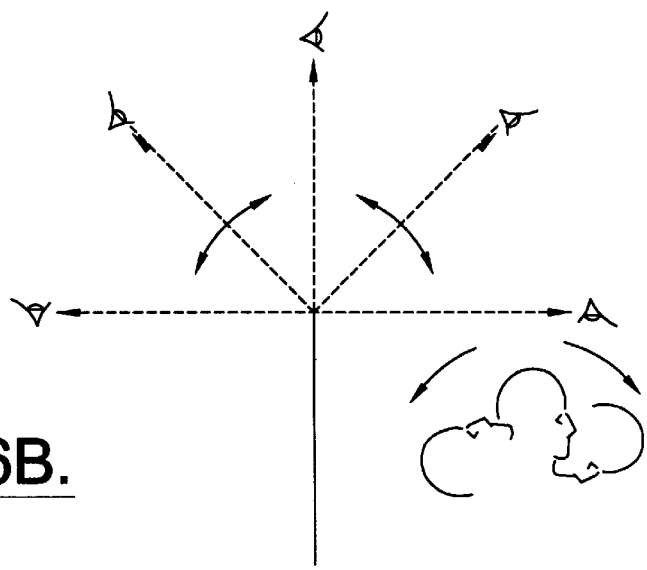
Figure 6C:
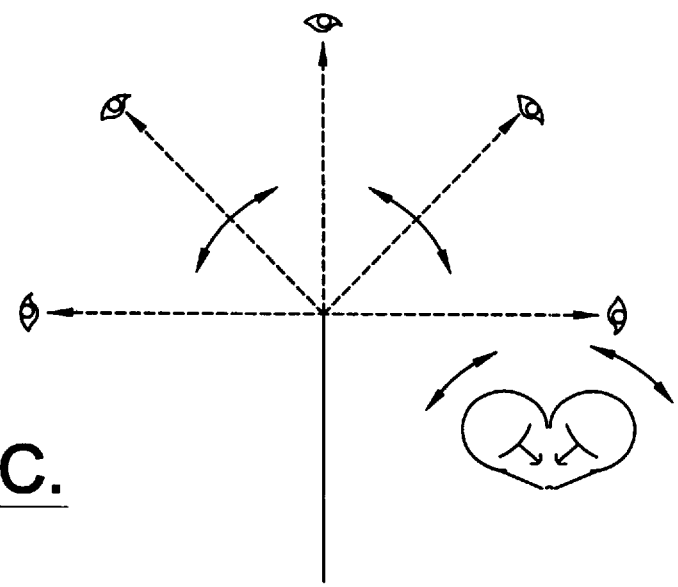

The present invention allows a user to move along six degrees of freedom, as illustrated in FIGS. 6A, 6B, 6C, using a pointing device and virtual reality programming protocols. As shown in FIG. 6A, a user has two degrees of freedom when pivoting around the Z axis and within the X-Y plane. A user has two degrees of freedom when pivoting around the Y axis and within the X-Z plane (FIG. 6B). A user has two degrees of freedom when pivoting around the X axis and within the Y-Z plane (FIG. 6C). The client software may provide users with the ability to navigate a virtual environment using multiple observers 30.

Client Database(s) Portions of the multi-dimensional virtual environment are generated by the client software from data contained within the client database(s). The client databases are located on computer-readable media, including, but not limited to, CD-ROM, tape, and disk. The client database is preferably a relational database constructed using commercial database software such as Microsoft® Access®. Each record within the database preferably comprises at least the following fields: location of virtual site, wire-frame model of virtual site, URL of virtual site, and keywords describing virtual site's content. A wire frame model describes the structures which occupy a virtual site. The keywords are typically those that describe the actual services provided at the actual Internet site.

Startup Module

Figure 7:
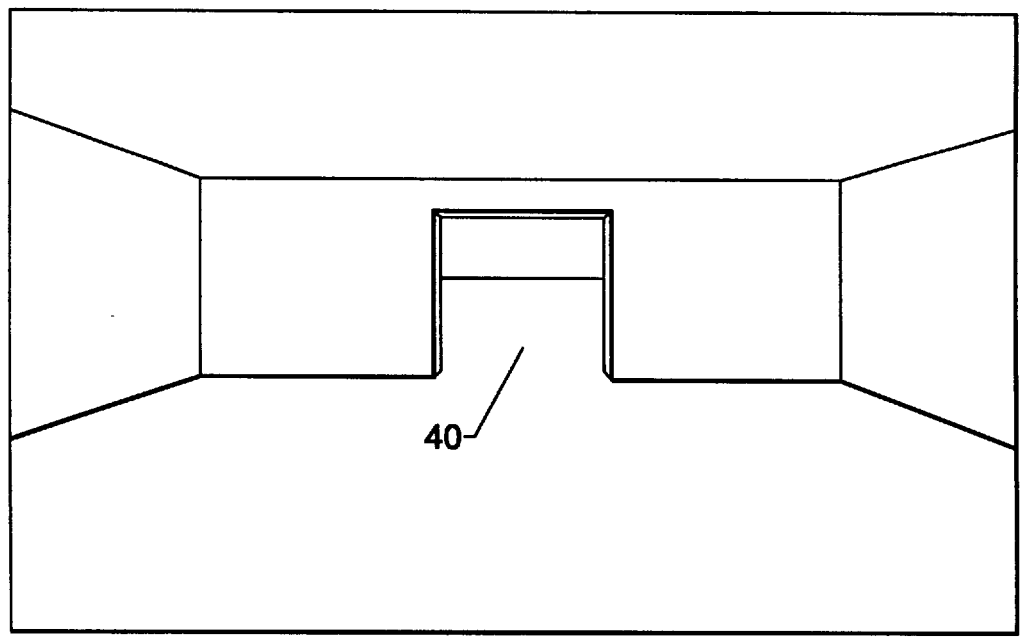
FIG. 7 illustrates a virtual environment visible through a door or portal at program startup.

When a user activates the client software, also referred to as the "program", the Startup Module is the initial Module activated. If this is the first time that a user is running the program, the user's location within the virtual environment is set within a special area. As a default, the user finds himself/herself in a large room or staging area, where various options are graphically depicted within the virtual environment. Options include the activation of tours through which the user can be carried to predetermined places within the virtual environment. These options may be in whole or part software modules or virtual representations of Internet sites (i.e., virtual sites). Other options include the ability to learn more about the program and the services that it provides, and a help Module. At this point, the virtual terrain is visible through a portal or doorway 40 beyond the staging area, as illustrated in FIG. 7.

Figure 8A:
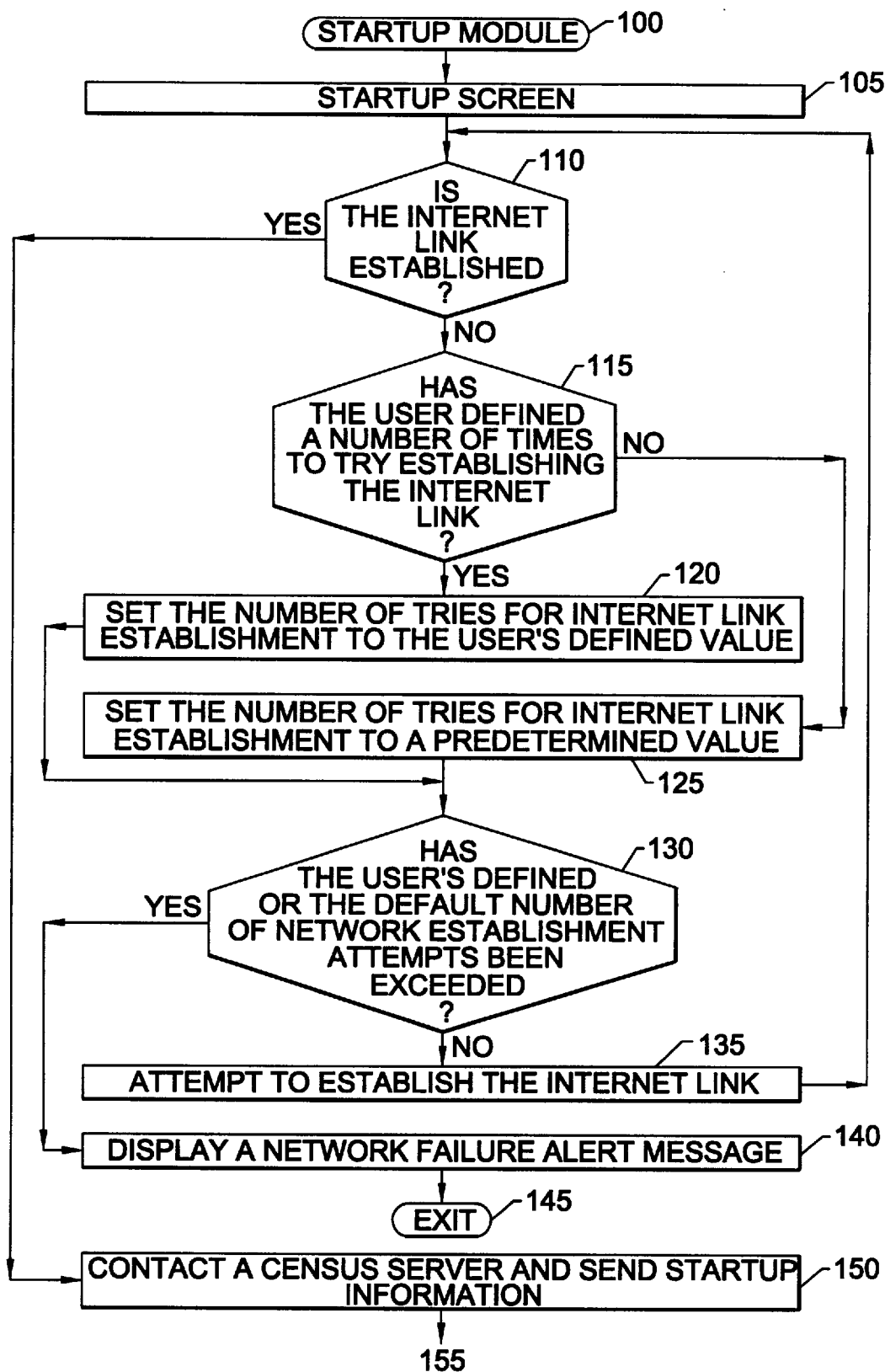
FIGS. 8A–8B are flow charts illustrating operations of the Startup Module, according to the present invention.
Figure 8B:
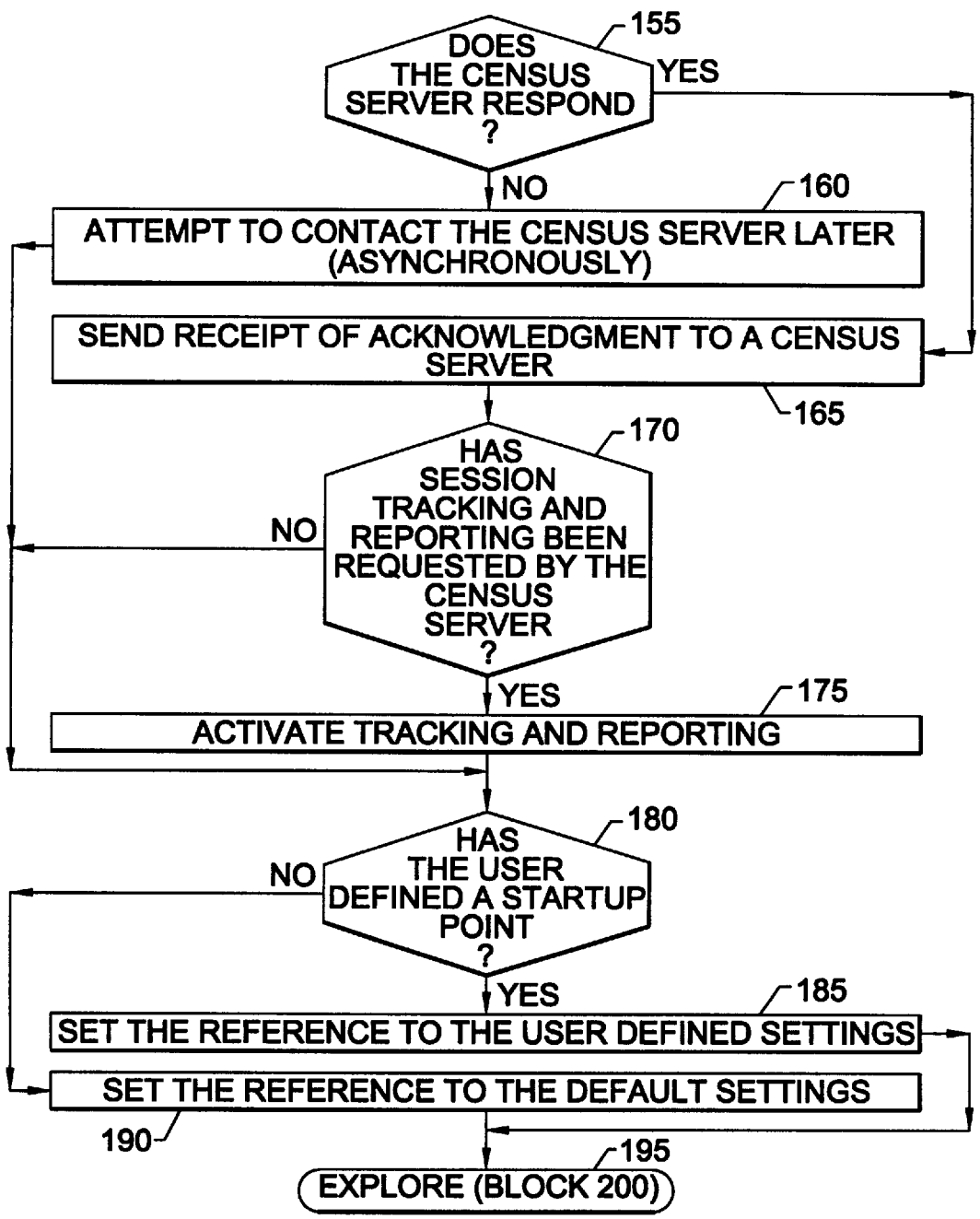

Referring to FIGS. 8A–8B, the Startup Module of the client software will now be described in detail. Upon starting the program (Block 100), the user is presented with a startup screen (Block 105), and the program checks whether the user's computer is connected to the Internet (Block 110). If there is no Internet link established at this point, the program determines if the user has defined a number of times to try to establish the Internet link (Block 115). If yes, then set the number of tries for Internet link establishment to the user's defined value (Block 120). If no, then set the number of tries for Internet link establishment to a predetermined value (Block 125). After Block 120 or Block 125, the program determines whether the number of establishment tries has been exceeded (Block 130). If this number has not been exceeded, the program tries to establish an Internet link (Block 135). The loop represented by Blocks 110–135 continues until either a successful Internet link has been made, or the number of tries has been exceeded. When the number of tries has been exceeded, an alert message is displayed, (Block 140), and the program is terminated (Block 145).

Figure 9:
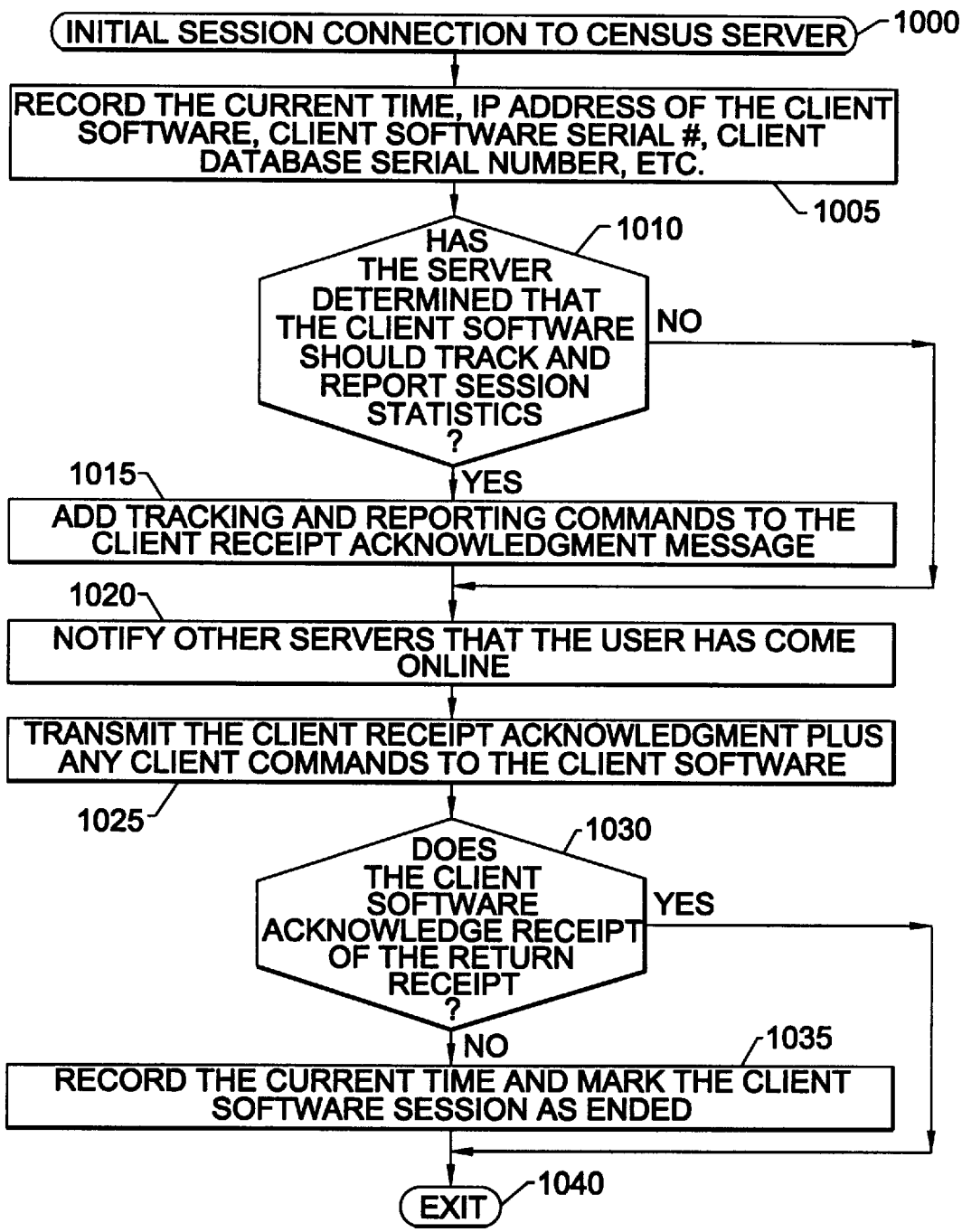
FIG. 9 is a flowchart illustrating operations for the Initial Session Connection to Census Server, according to the present invention.
Figure 10:
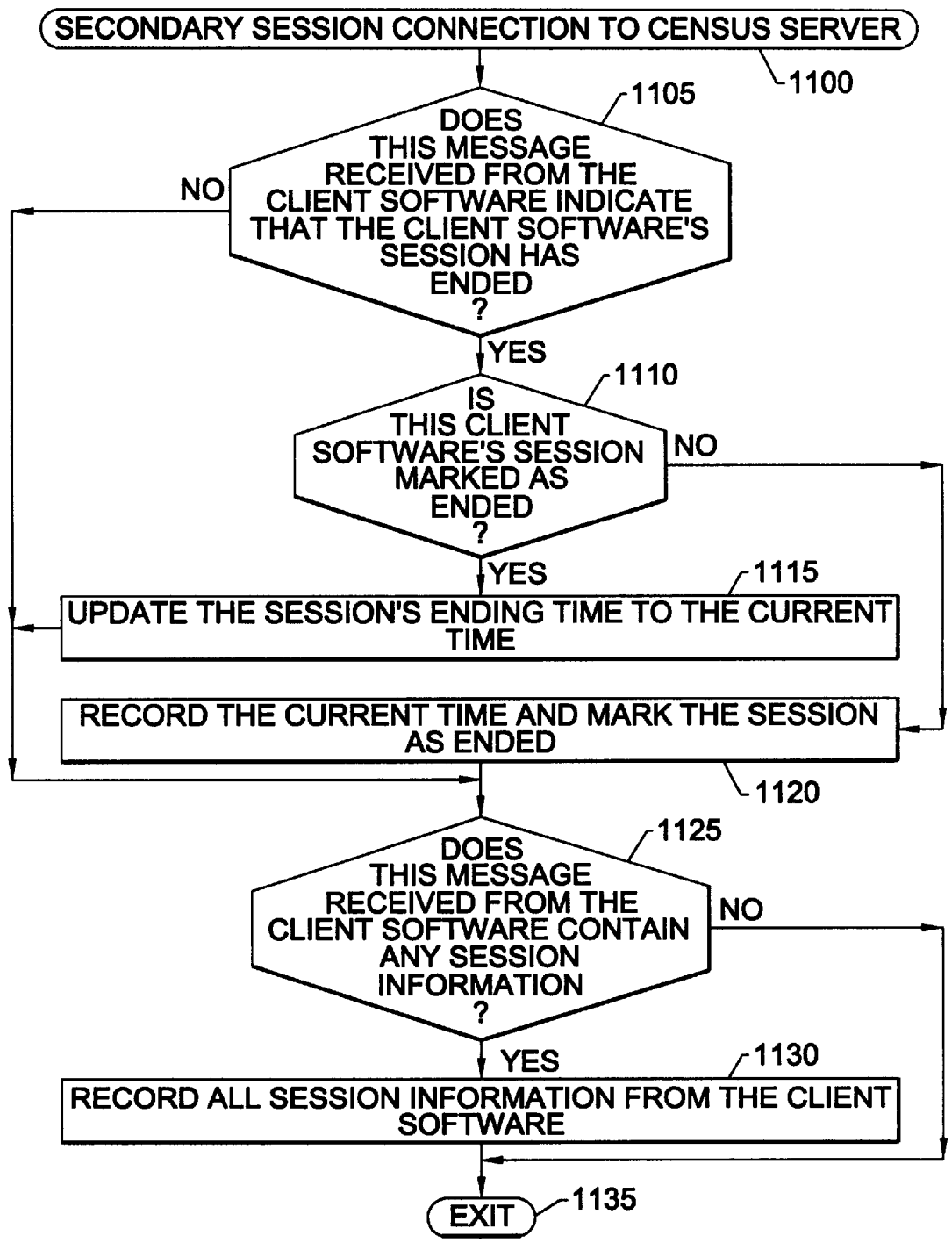
FIG. 10 is a flow chart illustrating operations for the Secondary Session Connection to Census Server, according to the present invention.

When a successful Internet connection has been made (Block 110), the program attempts to establish contact with a census server (Block 150), illustrated in FIGS. 9–10, via the Internet and send startup information to it. Census servers have multiple purposes. First, a census server records that an instance of the software has been invoked by a user. Second, a census server notifies other administrative servers (such as leasing and finance servers) that a user has come on-line. Third, a census server may request that the client software track the user's current session. Information gathered may include: virtual sites visited, virtual sites seen, user idle time, time spent at virtual sites, and the like. A census server may request that the client software transmit a report at intervals or at the end of a session back to a census server. Fourth, a census server records that an instance of the software has been deactivated. If a census server does not respond to the client software (Block 155), the program may attempt to contact the server later while the user goes on to enter the virtual environment(Block 160). The program does not need to establish contact with the census server in order for the user to proceed. The program then proceeds to (Block 180) and determines whether the user has defined a starting point.

If the census server does respond (Block 155), the program sends a receipt of acknowledgment to a census server (Block 165) and proceeds to Block 170.

After a census server has been contacted, the program determines if session tracking and reporting has been requested (Block 170). If the answer is yes, then the program activates tracking and reporting of the session (Block 175) and the program proceeds to Block 180. If the answer is no, the program proceeds directly to Block 180.

At this point (Block 180) the program determines if the user has defined a starting point. If the user has defined a starting point, the program sets the reference's initial location and orientation to the user defined settings (Block 185) and the user enters the virtual environment (Block 195) as illustrated in FIG. 5. If the user has not defined a starting point, the program sets the reference's initial location and orientation to the default values (Block 190) and the user enters the virtual environment (Block 195) as illustrated in FIG. 7.

Navigating the Virtual Environment

The navigational aspects of the present invention provide access to Internet sites without requiring hypertext links, without requiring knowledge of site URLs, and without requiring third-party indexing systems. There are two user-configurable types of movement through the virtual environment: "explore" mode and "auto-pilot" mode.

Explore Module

Explore mode is the default mode of navigation through the virtual environment. While moving freely within explore mode, the user may become aware of a virtual site. Once aware of the virtual site, the user may approach the virtual site, arrive at the virtual site's domain, and activate the virtual site in various ways. For example, the user may activate the virtual site by moving into an activative zone within the virtual site. Alternatively, the user may activate a site by interacting with triggers within the virtual site, such as by "clicking" on a wall switch (a trigger) within a virtual site. In addition, each virtual site may contain one or more triggers, active zones, and/or applets which may dynamically create objects, triggers, zones, and the like. While the user browses the Internet site's services/information, he or she may click on links within a Web or VRML page, for example via HTML or VRML links. If the user chooses a link which directs the browser, or browser module to retrieve a service/information that is outside of the current virtual site, he/she will be transported through the virtual environment in auto-pilot mode to the destination virtual site. If the user exits the browser, or browser Module, he/she will return to the virtual environment in explore mode.

Figure 11:
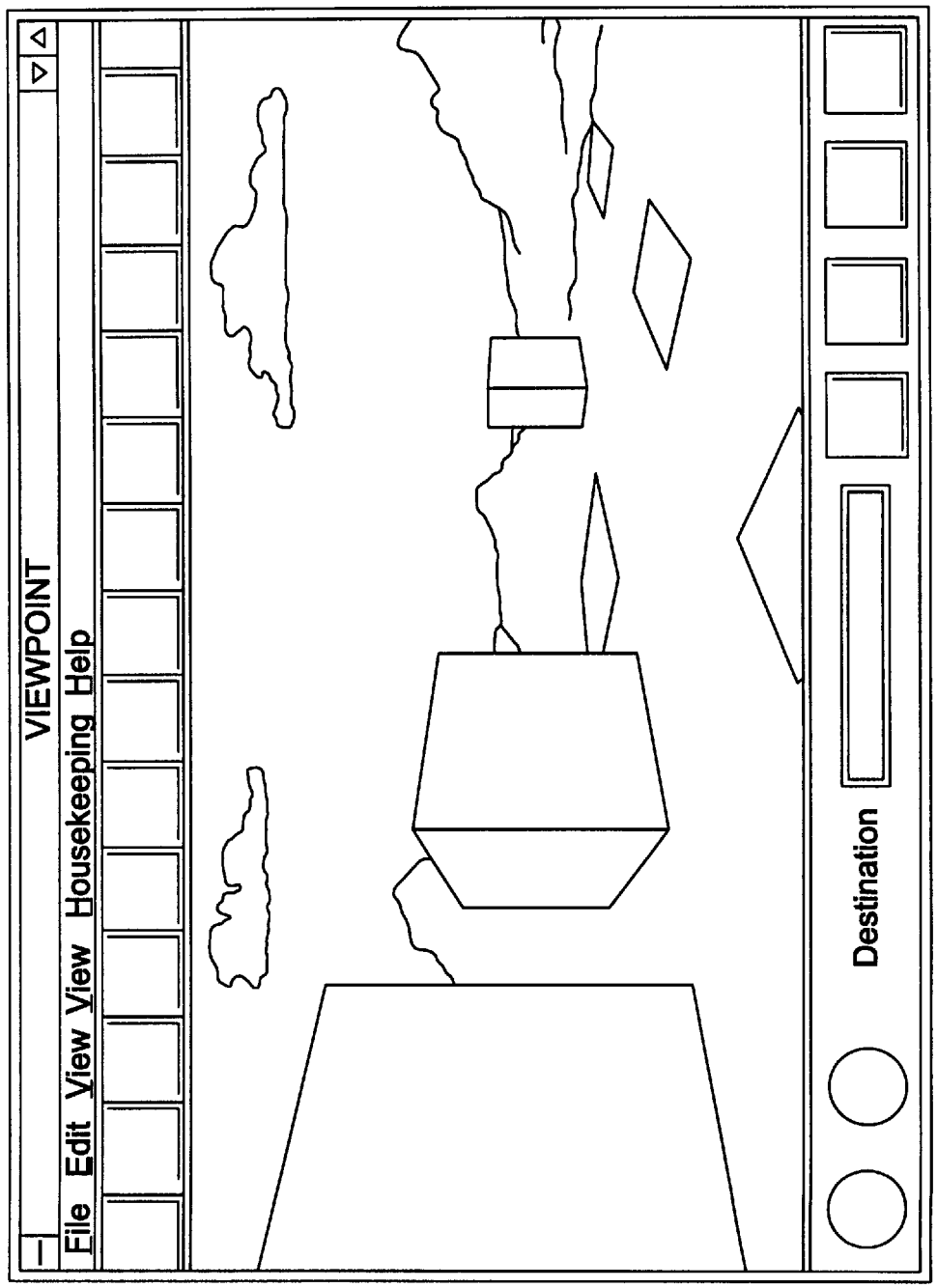
FIG. 11 illustrates an exemplary user interface, according to the present invention.

An exemplary user interface is illustrated in FIG. 11. Users have the ability to control the movements of the reference and direct the reference wherever desired in the virtual environment. Preferably, the reference has six degrees of freedom to accurately represent the six degrees of freedom a human observer has when orienting their view within a three-dimensional space, as described above with respect to FIGS. 6A, 6B, 6C. Means for controlling reference orientation with six degrees of freedom is preferably a gyroscopic mouse such as the Gyropoint Desk® mouse from Gyration, or via a standard 2D mouse, gamepad, joystick or other input device. The program also permits a user to select a mode of transportation (movement of the reference) through the virtual environment during explore mode. For example, users may choose to move by foot, in a surface vehicle, or in an airborne vehicle, and the like.

The default directional controls for movement and orientation of the reference are via the numeric keypad of the keyboard connected to the user's computer. For example, forward movement may be controlled via the "8" key; reverse movement may be controlled via the "2" key; movement to the right may be controlled via the "6" key; and left movement may be controlled via the "4" key. The "9" key may be used to rotate the reference to the right, and the "7" key may be used to rotate the reference to the left. The "5" key can be used to stop the reference's movement. Reference movement upwards and downwards along the Z axis may be controlled via the "+" and "−" keys, respectively. However, the user software will provide users with the ability to map their keyboards to accomplish the above tasks with any keys. In addition, the present invention would allow the user to map discrete movements to an input device(s) based upon the type of movement or orientation of the reference within the virtual environment. For example, an airplane might have movements such as: increase speed, decrease speed, rotate up, rotate down, bank right, and bank left. A flying saucer might have movements such as: go up, go down, turn left, turn right, go forward, and go backwards.

Figure 12A:
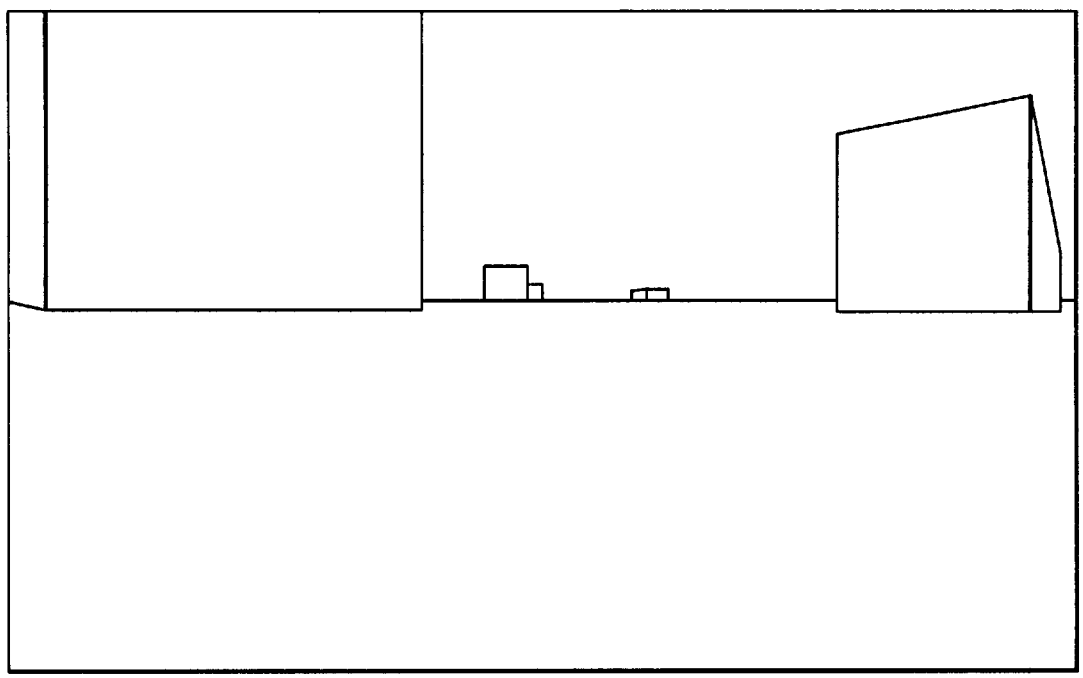
FIG. 12A illustrates user movement through a virtual environment at ground level.
Figure 12B:
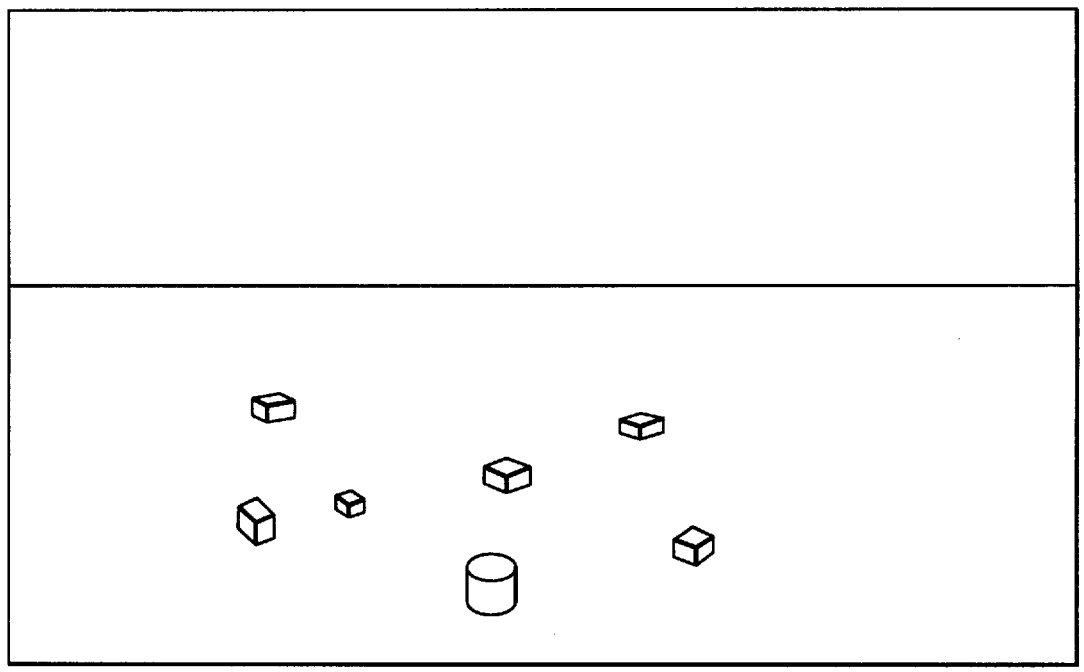
FIG. 12B illustrates user movement through a virtual environment above ground level.
Figure 12C:
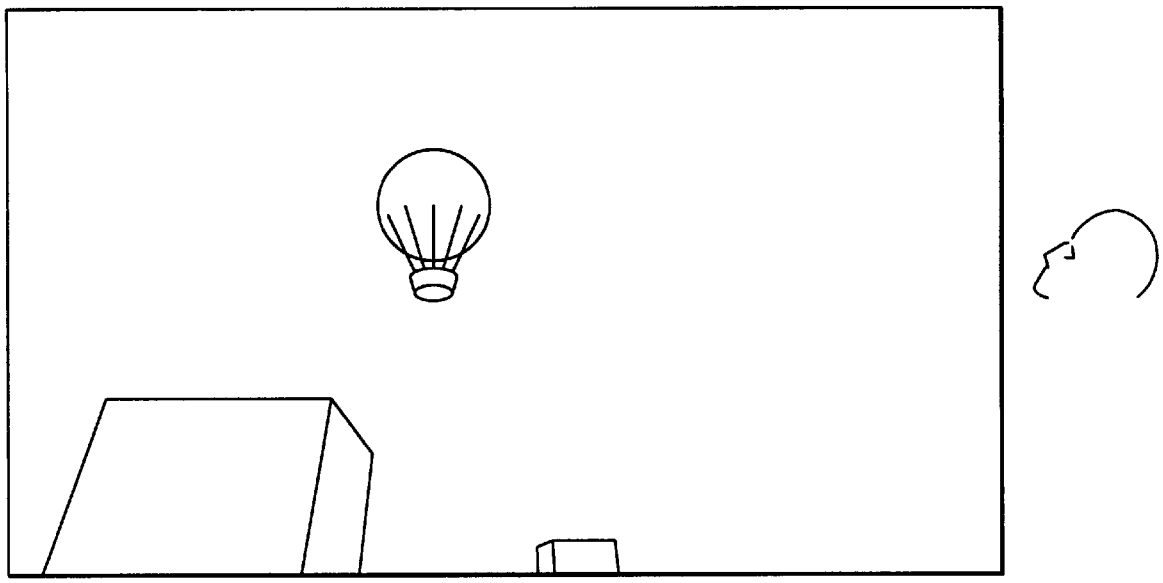
FIGS. 12C–12H illustrate available changes in the orientation of the field of view of the reference in a virtual environment.
Figure 12D:
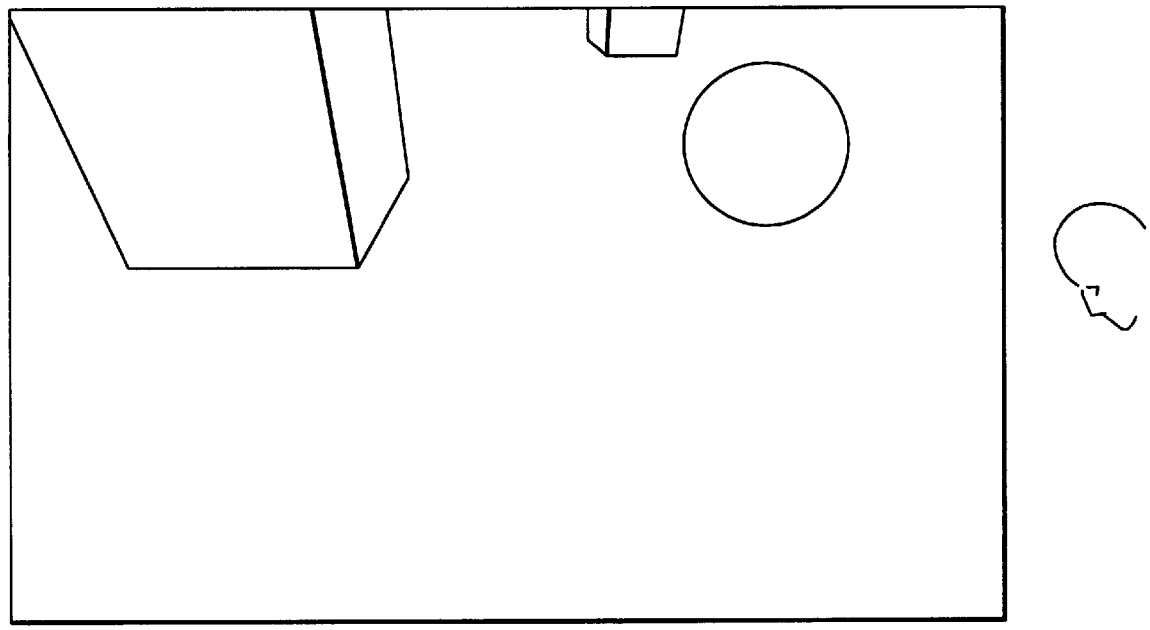
Figure 12E:
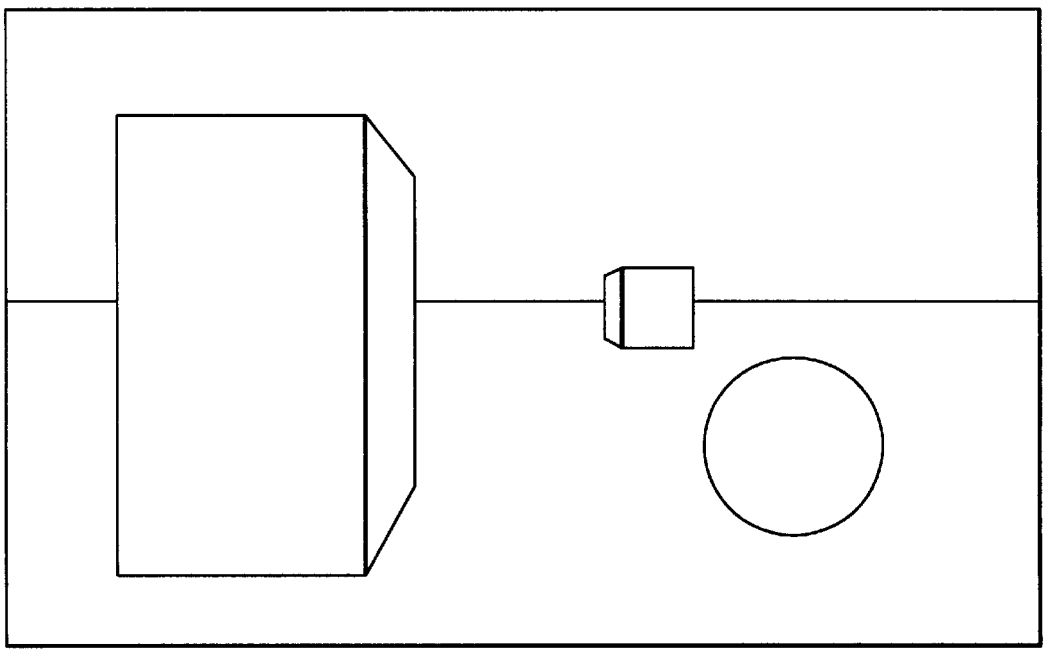
Figure 12F:
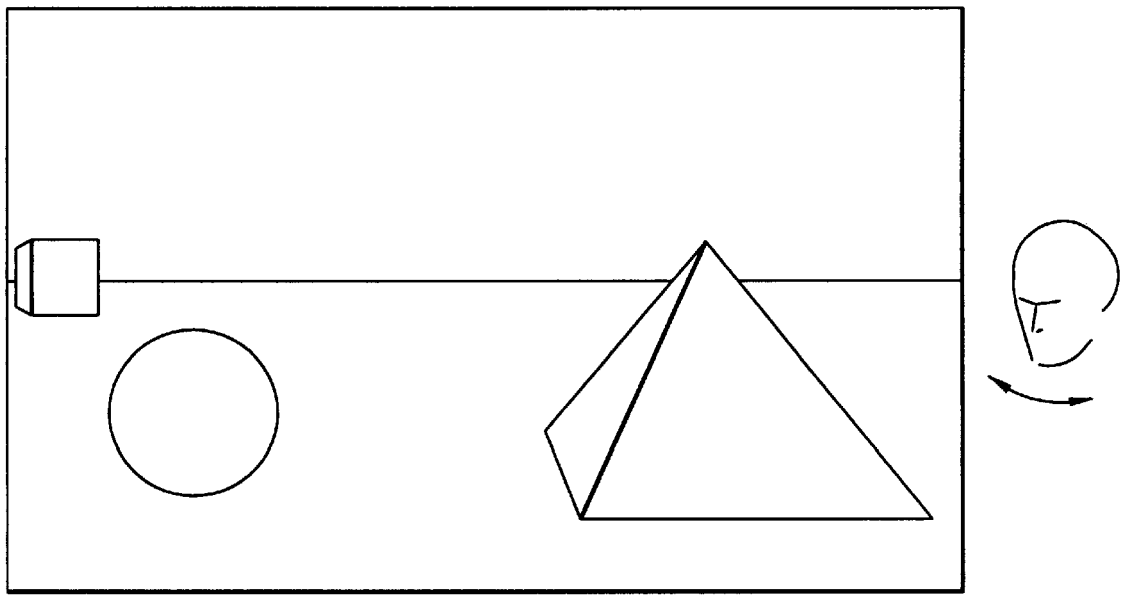
Figure 12G:
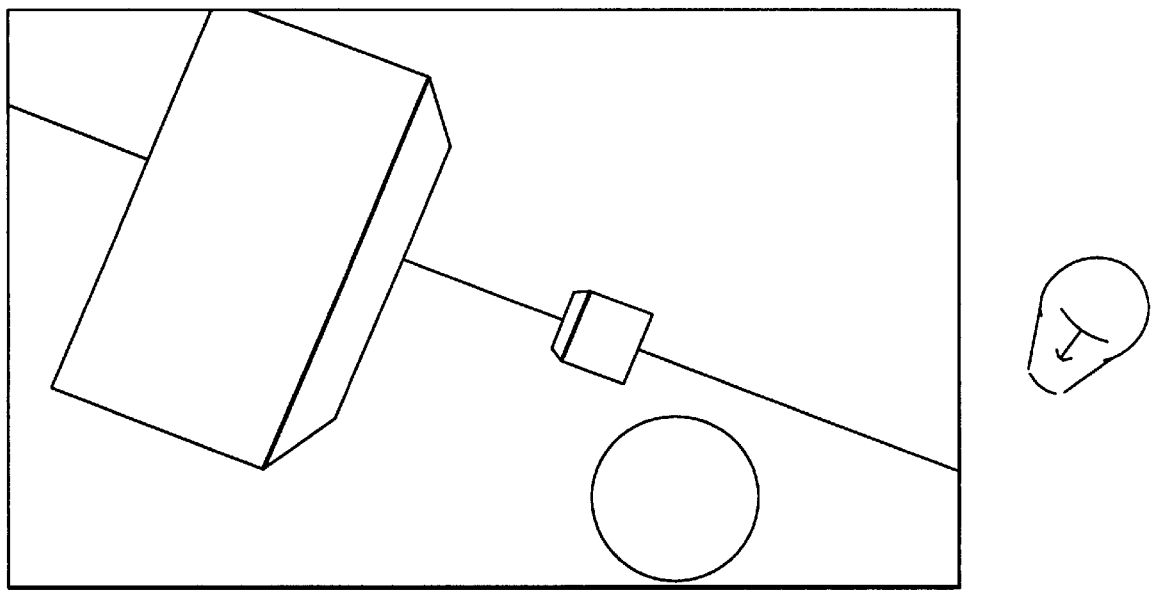
Figure 12H:
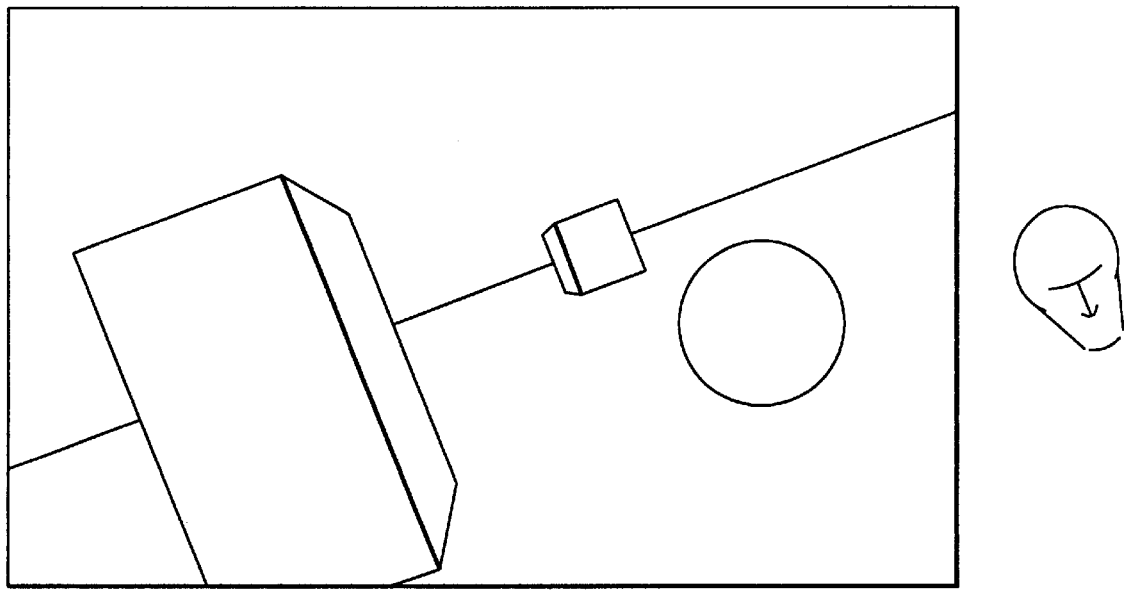
Figure 12I:
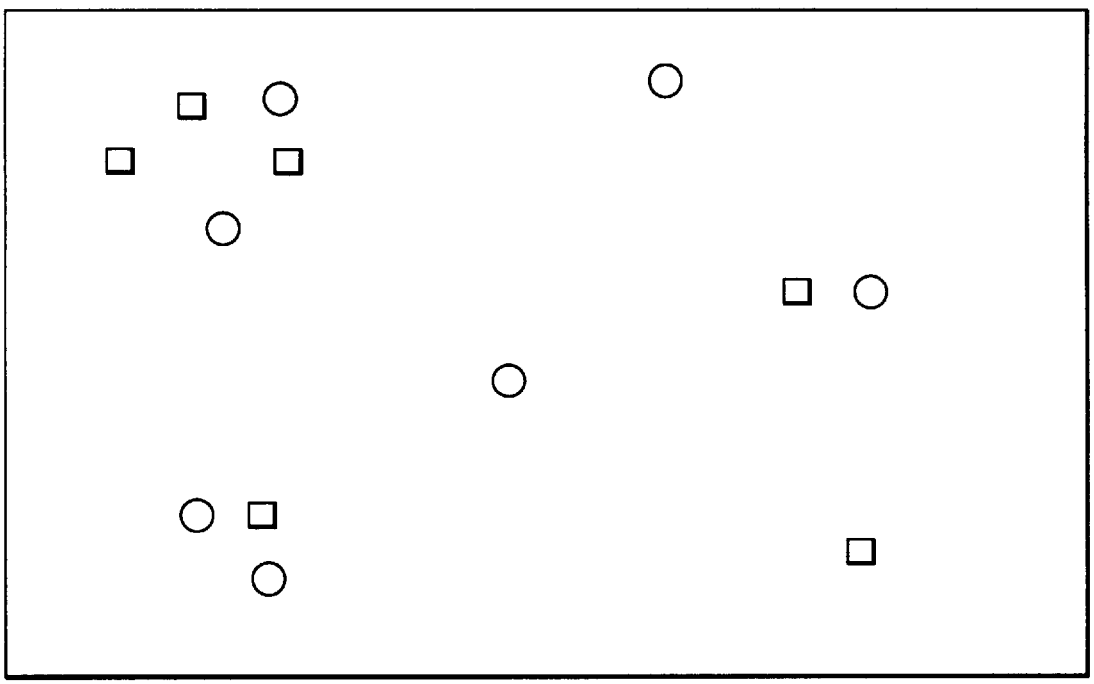
FIG. 12I illustrates a "bombardier's view" available when the client software is in map view mode.

Movement and orientation of the reference in a virtual environment is illustrated in FIGS. 12A–12H. FIG. 12A illustrates movement of the reference at ground level, and FIG. 12B illustrates movement above ground level. FIGS. 12C–12H illustrate changes in the orientation of the field of view of the reference that are available. FIG. 12I illustrates the "bombardier's view" to which the reference is oriented when in map view mode.

Referring to FIGS. 13A–13F, movement and orientation within a virtual environment in explore mode, according to the present invention, will be described in detail. Initially, after the Explore Module has been invoked (Block 200), the program determines whether conditions for activation exist as described in detail below (Activation Module).

Figure 14:
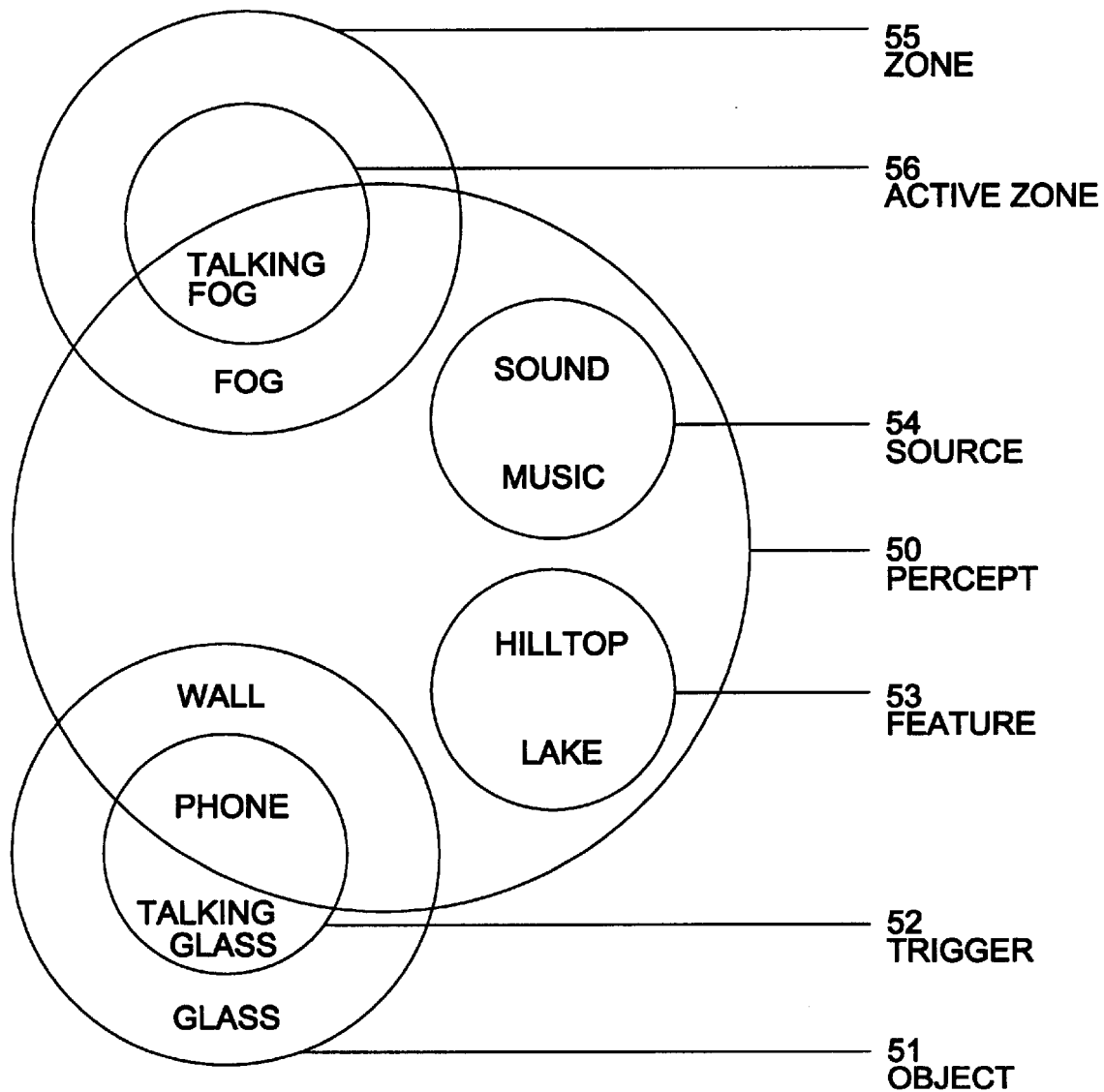
FIG. 14 is a Venn diagram illustrating the relationships of objects, zones, active zones, sources, triggers, percepts, and features of the multi-dimensional virtual environment.

If the user has not configured the program to begin exploration at specific coordinates in the virtual environment, the program begins exploration at the default coordinates illustrated in FIG. 7. Upon entering the virtual environment, a determination is made whether the user has preexisting knowledge of and interest in an Internet site, percept, or virtual site (Block 204). A "percept", as used herein, is defined to be anything that is capable of being perceived by the user. As illustrated in FIG. 14, a percept 50 may include objects 51, triggers 52, features 53, sources 54, zones 55, and active zones, 56, with examples of each provided therein. Certain types of objects and triggers, as well as some zones (active and inactive), may not be perceivable to a user through the field of view of the reference. As a user's reference moves and orients within the virtual environment, the user may become interested in various virtual sites and may see and hear many interesting things. Furthermore, a user at some point may become uninterested in particular virtual sites and percepts. The present invention allows a user to travel freely through the virtual environment and learn information about various virtual sites and percepts.

If the user does not have preexisting knowledge of and interest in virtual site, percept, or Internet site, a determination is made whether he/she has decided to move freely within the virtual environment (Block 206). If the answer is yes, the user then moves freely within the virtual environment (Block 208). If the user does have knowledge of and interest in a virtual site, percept, or Internet site (Block 204), the program advances to Block 236. If the user does not have knowledge of and interest in a virtual site, percept, or Internet site and the user has decided not to move freely within the virtual environment, the program proceeds to Block 214.

If the user is moving freely within the virtual environment (Block 208), the program is configured to determine whether conditions for activation exist as described in detail in the activation module below (Block 210). The program determines whether the terrain grid has been turned on by the user (Block 214). If the terrain grid is turned on, the program determines whether any unit(s) of virtual terrain appear available for leasing (Block 216). If any unit(s) of virtual terrain do appear available for leasing, the program proceeds to determine whether the user has selected any unit(s) of virtual terrain for the purpose of leasing (Block 218). If the user has selected any unit(s) of virtual terrain for the purpose of leasing, selected the unit(s) are marked as claimed (Block 220) and the program returns to Block 222. If the terrain grid is not turned on (Block 214) or no unit(s) of virtual terrain appear available for leasing (Block 216) or the user has not selected any unit(s) of virtual terrain for leasing (Block 218), the program advances to Block 222.

Figure 15:
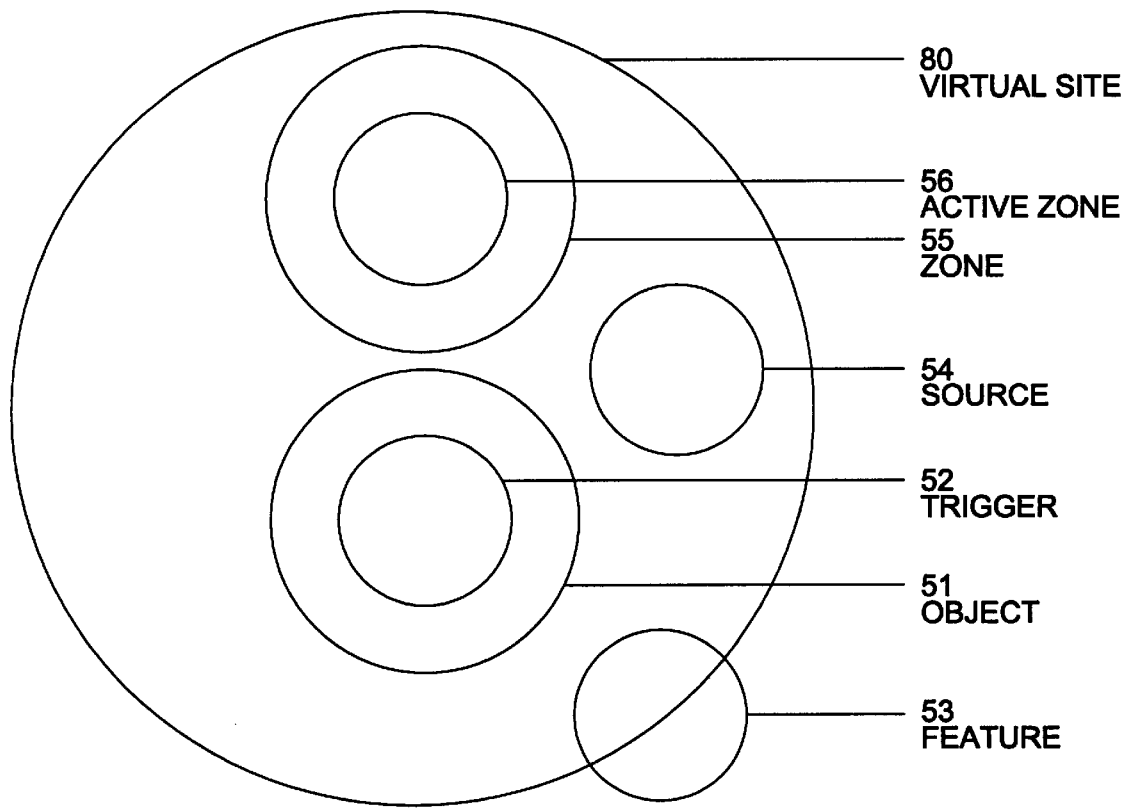
FIG. 15 is a Venn diagram illustrating relationships of virtual sites and their virtual contents.

At Block 222, the program determines whether the user has invoked the Editor Module. If the Editor Module has been invoked, the program turns on the terrain grid (Block 224), displays a tool bar, and extends the HUD (Block 226). The grid, toolbar, and HUD features are described in detail below. If the user has not invoked the Editor Module, the program returns to Block 232. Once the grid has been turned on and the toolbar and HUD features are displayed, the program determines whether the user edits and saves anything within the virtual environment (Block 228). If the user does edit and save contents of a virtual site, whose relationships are illustrated in FIG. 15, the contents are changed (Block 230), and the program returns to Block 232. If the user does not edit and save any contents of a virtual site, the program advances to Block 232. It should be noted that the grid can be toggled on and off at any time during the program and is not limited to its availability only when the editor Module has been invoked. The Editor Module, as discussed in greater detail below, can create all classes of virtual site contents including objects, triggers, zones, active zones, and sources and can modify portions of virtual terrain to create or erase features.

As the user moves freely within the virtual environment, the program constantly makes a determination of whether the user has become aware of a percept (Block 232). If the user has become aware of a percept, the program determines whether the user is interested in the percept (Block 234). If the user is not interested in a particular percept, or if the user has not become aware of a percept, the program returns to Block 204. If the user has become aware of a percept and is interested in the particular percept, the program determines whether the percept is within the reference's field of view (Block 236). For example, a particular percept may not be visible via the reference's field of view because it is far away from the reference, but may make its presence known in other ways such as via sound. If the particular percept that the user has become aware of is within the reference's field of view, the program then determines whether the user has selected this percept with the intent to auto-pilot to it (Block 218). Users may select percepts in one of several ways. These include, but are not limited to selection with the purpose of activation, selection with the purpose of landmark creation, selection with the purpose of landmark deletion, and selection with the intent to auto-pilot. These methods of selection are assigned to buttons of an input device. Any button of an input device may access non-default selection methods through modifiers which include but are not limited to simultaneous keyboard key-presses, simultaneous button presses, and the like. A menu containing a set of available selection methods may be assigned to a button or accessed via modifiers. Any and all selections may be user configurable where appropriate.

Figure 16A:
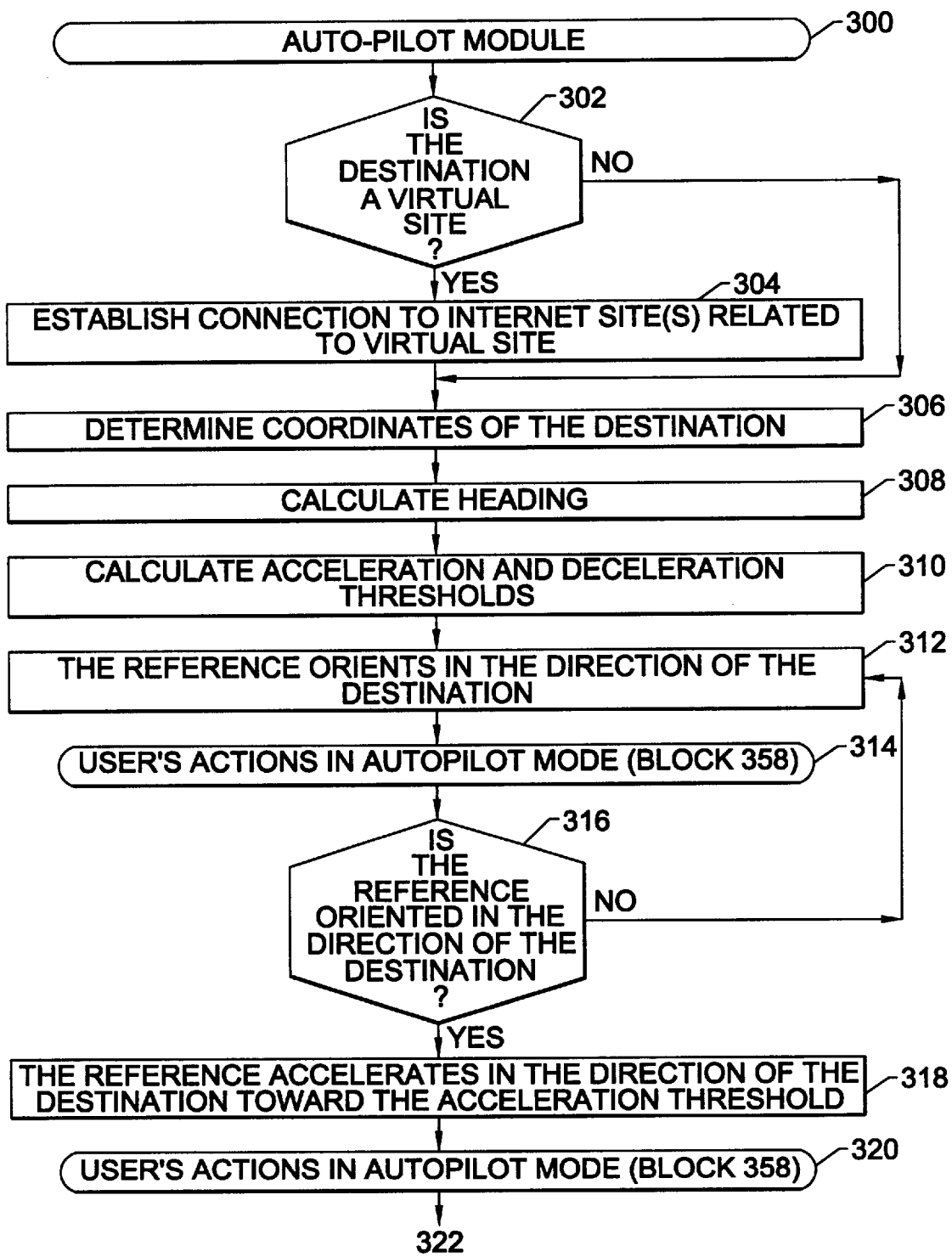
FIGS. 16A–16D are flow charts illustrating operations for the Auto-Pilot Module, according to the present invention.
Figure 16B:
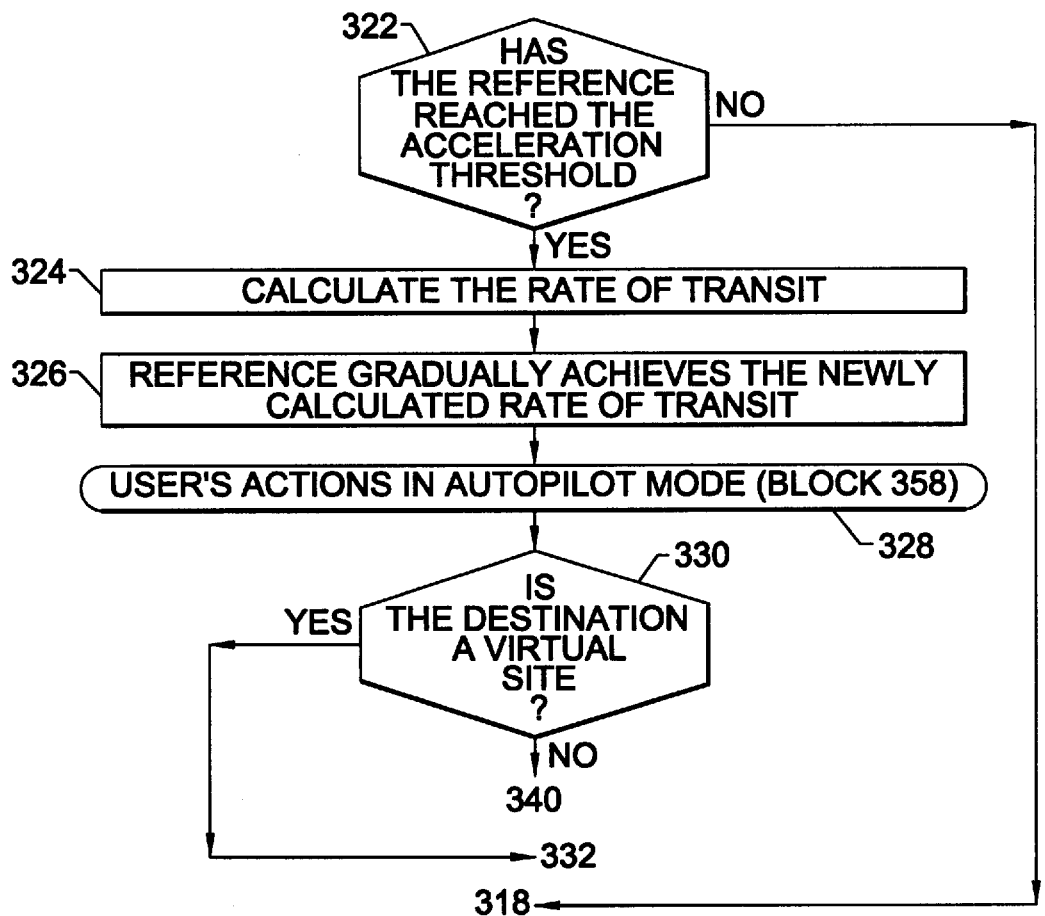
Figure 16C:
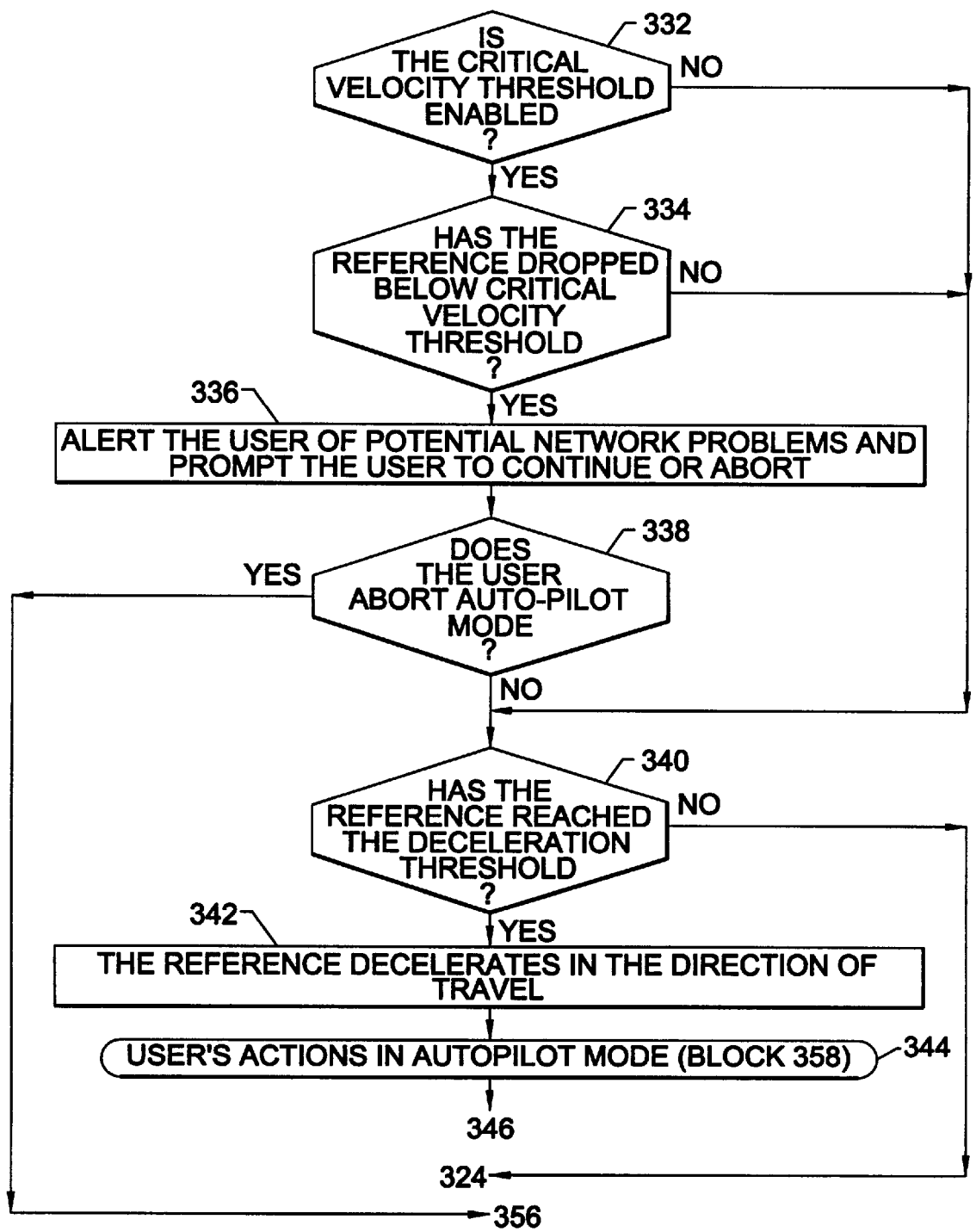
Figure 16D:
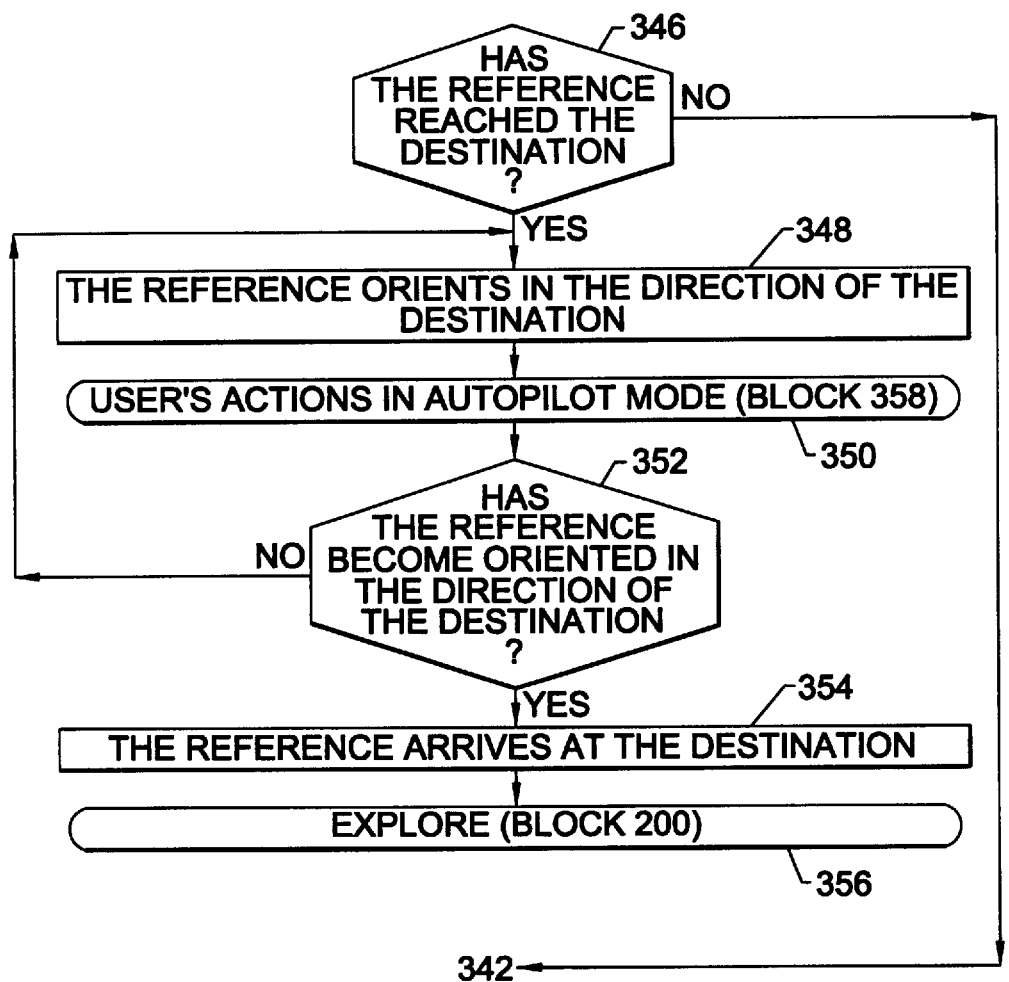

If the user has selected this percept with the intent to auto-pilot to it, the program proceeds to the Auto-Pilot Module at Block 300 (Block 240) FIG. 16A. If the user has not selected this percept with the intent to auto-pilot to it, the program proceeds with determining whether the user selected the percept with the intent to landmark it (Block 242). If the answer is yes, a landmark for the selected percept is created (Block 244). If the answer is no, the program advances to Block 246, where the program determines if the user has previously created a landmark for the percept. If the user has created a landmark for the percept, then the program determines whether the user has selected the percept with the intent to delete its landmark (Block 248). If the answer is yes, the landmark for the selected percept is deleted (Block 250). If the user has not created a landmark for the percept (Block 246) or the user has not select the percept with the intent to delete its landmark (Block 248), the program advances to Block 254. Also, after creating a landmark (Block 244) and after deleting a landmark (Block 250) the program returns to Block 254 and determines whether conditions for activation exist as described in detail in the Activation Module below.

The program then proceeds from Block 254 to determine whether a landmark exists for this percept (Block 220). A landmark allows a user to navigate virtual coordinates automatically in auto-pilot mode, or manually in explore mode. Landmarks may be created in either mode and at any time. Landmarks may be created for a virtual site, or a set of coordinates in the virtual environment. At any time during Explore or Auto-Pilot Mode, a user can select a landmark with the intent to auto-pilot to it, thereby causing the user to be transported automatically in auto-pilot mode to the landmark. Similarly, if the percept is not within the reference's field of view, the program proceeds with determining whether a landmark exists for this percept (Block 258).

If a landmark does exist, the program determines whether the user has selected this landmark with the intent to auto-pilot to it (Block 260). If the answer is yes, the program proceeds to the Auto-Pilot Module at Block 300 (Block 270) FIGS. 16A–16D. If the user has not selected a landmark with the intent to auto-pilot to it, or a landmark does not exist for the percept, the program proceeds to determine whether the user knows a URL for the Internet site indicated by or related to the percept (Block 262). If the user does know a URL for an Internet site indicated by or related to the percept, the program then determines whether the user has input this URL (Block 264). If the answer is yes, the program proceeds to the Auto-Pilot Module at Block 300 (Block 270) FIGS. 16A–16D.

If the user has not input a URL, or if the user does not know the URL for an Internet site indicated by or related to a percept, the program proceeds to determine whether the user knows the coordinates of or near the percept (Block 266). If the user does know the coordinates of or near the percept the program then determines whether the user has input these coordinates (Block 268). If the answer is yes, the program proceeds to the Auto-Pilot Module at Block 300 (Block 270).

If the user has not input these coordinates, or if the user does not know the coordinates of or near the percept, the program proceeds to determine whether the user desires to orient the field of view of the reference and/or move the reference toward a percept he/she is interested in (Block 272). If the user does desire to orient the field of view of the reference or move the reference, the user is free to orient the field of view of the reference and/or move the reference towards a percept he/she is interested in (Block 274). The program then determines whether conditions for activation exist as described in detail in the Activation Module below (Block 276).

If the user does not desire to orient the field of view of the reference or move the reference towards the percept, a determination is made whether the user has become uninterested in the percept (Block 278). If the answer is yes, the user continues to move freely in explore mode and the program returns to Block 204. If the user has not become uninterested in the percept the program proceeds to determine whether the user has become aware of a different percept (Block 280). If the user has become aware of a different percept the program proceeds to (Block 234).

However, if the user has not become aware of a different percept (Block 280), the program then returns to Block 236.

Activation Module

Activation is the act of utilizing information or services offered by Internet sites. Activation may include invoking a browser Module within the program, or by activating a commercially available browser application such as Navigator®. While the user is browsing an Internet site's Web pages through a browser module or application, links within the Web page being browsed may be activated, thereby providing access to Web pages on different Internet sites or different Web pages within the same Internet site. If an activated link is stored outside of the currently browsed Internet site, the browser module or application is suspended and the user's reference is transported via Auto-Pilot Mode to the virtual site representing the destination URL where the browser is automatically resumed.

Activation may also consist of the invocation of scripts or applets. These applets may dynamically modify the virtual environment or act as full fledged applications. For example an applet might be activated when a user's reference enters an active zone. The invoked applet creates a trigger which appears in the virtual environment as a telephone. If the user selects the telephone with the intent to activate it, an applet which implements an Internet telephone is be activated and prompts the user for the Internet address of a call recipient.

Figure 17A:
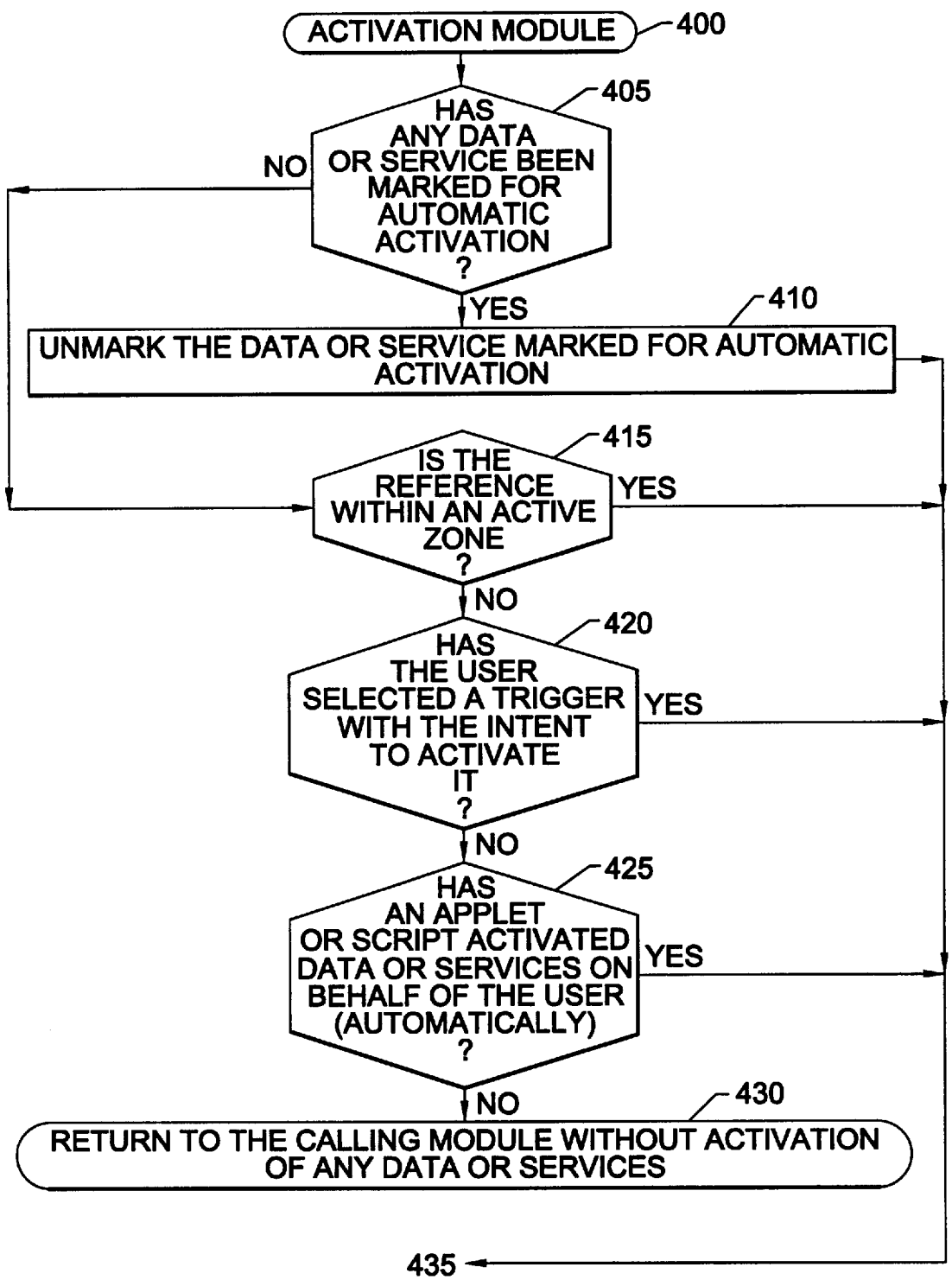
FIGS. 17A–17B is a flow chart illustrating operations for the Activation Module, according to the present invention.
Figure 17B:
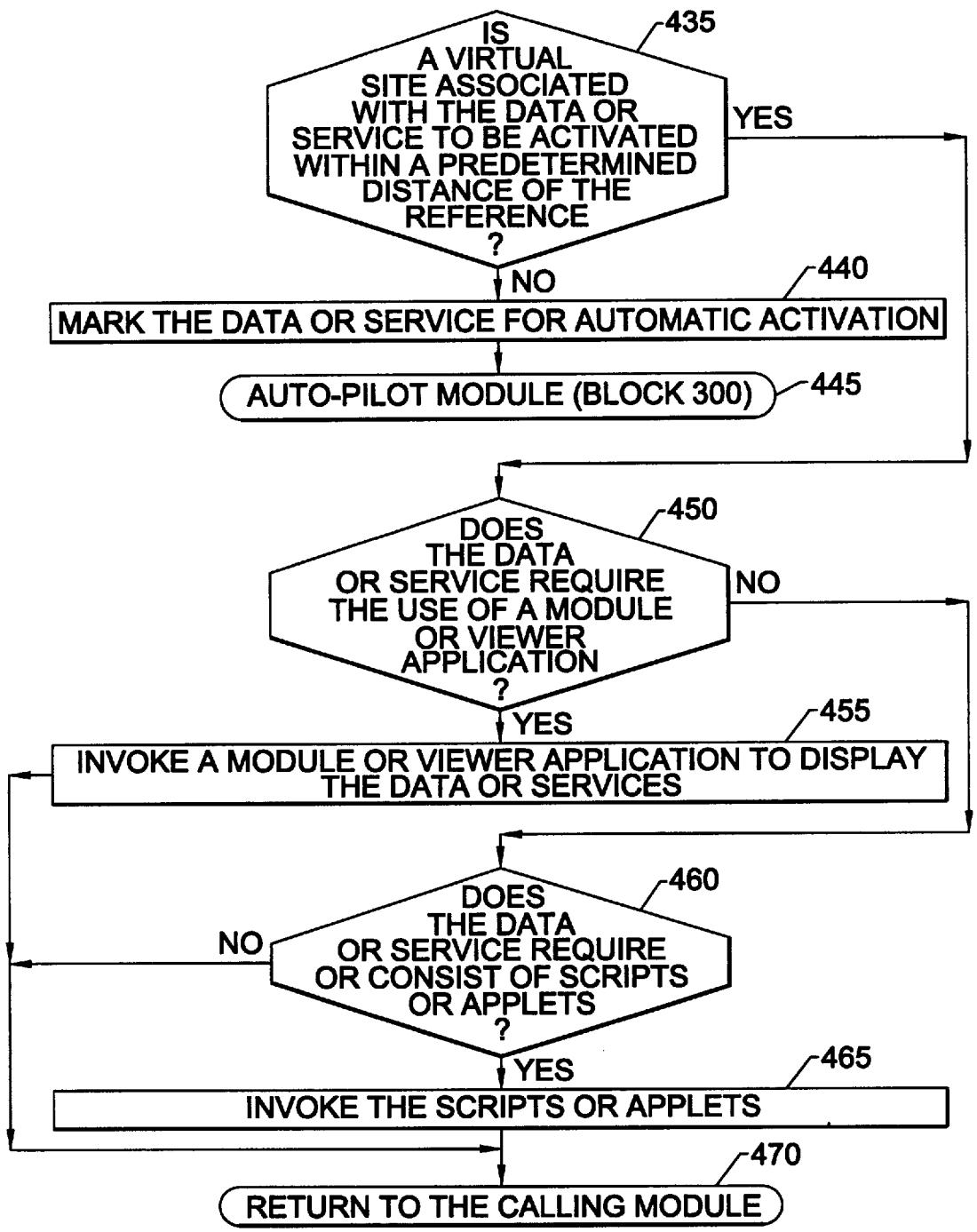

An activation module is provided to determine when and how data and services from virtual or Internet sites are processed. Referring to FIGS. 17A–17B, operations for the Activation Module are illustrated. The Activation Module (Block 400) is invoked from either Auto-Pilot or Explore Mode. The Activation Module initially determines whether any data or service has been marked for automatic activation (Block 405). If data or services are marked for automatic activation, the program unmarks the data or service marked for activation (Block 410). The program then advances to Block 435. If no data or services are marked for automatic activation, the program proceeds to Block 415 where the program determines if the reference is inside an active zone. If the reference is not in an active zone, then the program determines if the user has selected a trigger with the intent to activate it (Block 420). If the answer is no, the program determines if an applet or script has activated data or service on behalf of the user (Block 425). If no applets or scripts have activated data or services on behalf of the user then the program returns to the calling module without activation of any data or services (Block 430). If the reference is within an active zone (Block 415), if the user has selected a trigger with the intent to activate it (Block 420), or if an applet or script has activated data or services on behalf of the user (Block 425), the program advances to Block 435.

At this point (Block 435), the program determines whether a virtual site associated with the data or service to be activated is within a predetermined distance of the reference. If the answer is no, then the program continues to Block 440 and the data or service is marked for automatic activation and the program enters Auto-Pilot Mode Block 300 (Block 445). If the answer is yes, the program determines if the data or service requires the use a module or viewer application (Block 450). If the data or service requires use of a module or viewer application, the program invokes a module or viewer application to display/process the data or service (Block 455) and the Activation Module returns to the calling module (Block 470). If the data or service does not require the use of a module or viewer application, the program determines if the data or service requires the use of or consists of scripts or applets (Block 460). If the answer is yes, then the program proceeds to Block 465 and invokes the scripts or applets. From Block 460 and Block 465 the Activation Module returns to the calling module (Block 470).

Auto-Pilot Module

When in Auto-Pilot mode, the reference is automatically moved through the virtual environment to specific coordinates. For example, when a user provides virtual coordinates or the URL of an Internet site, either by imputing coordinates, a URL, selecting a landmark, or selecting a bookmark from within a browser or a browser module, the reference is automatically guided to an appropriate set of virtual coordinates. When auto-pilot mode is invoked, the reference is accelerated from its present location towards the target coordinates. After acceleration, but before arrival at the destination, the reference may experience a period of transit. As the reference approaches the destination, the rate of speed gradually decreases. The method of acceleration, transit, and deceleration during Auto-Pilot mode, according to the present invention, is advantageous in that the user is given the opportunity to view his/her virtual surroundings for other virtual sites and features while downloading data related to an Internet site, if a virtual site is the destination. While departing from a set of coordinates and approaching a destination, the user has time to view the neighborhoods of the origination and the destination. Also, during transit the user may view percepts within the field of view of the reference. During any phase of Auto-Pilot mode, the user may veer off course and visit other virtual sites.

Figure 18:
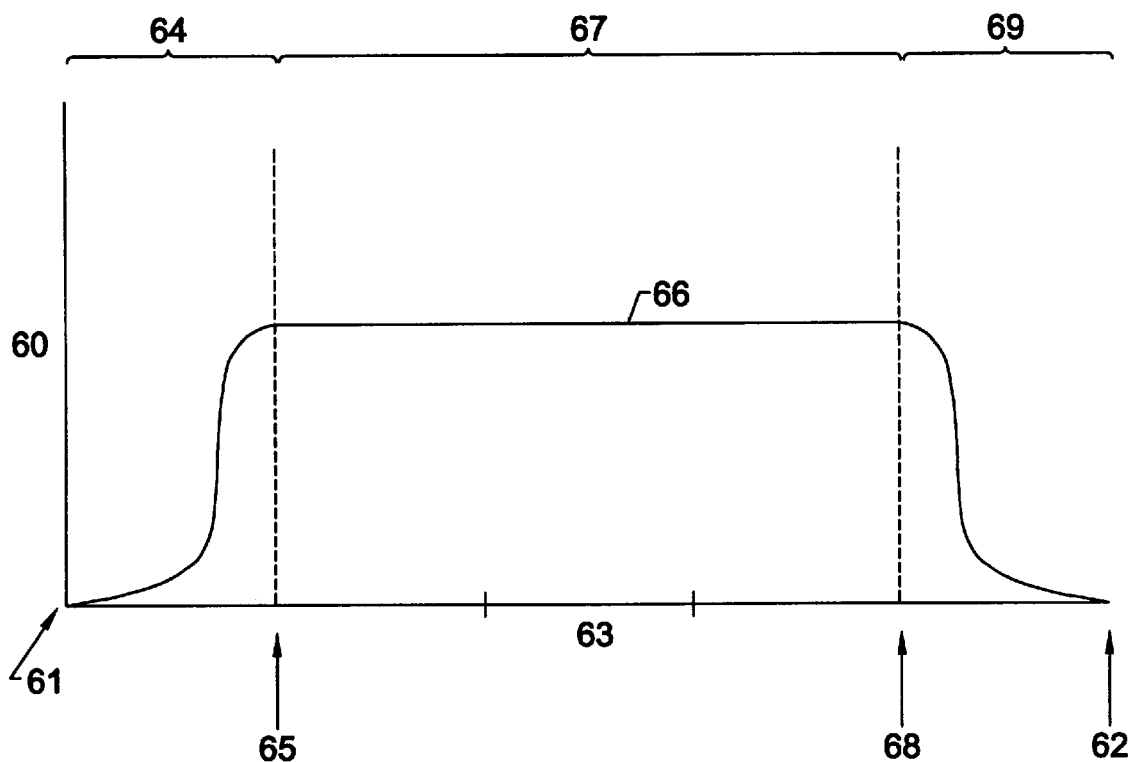
FIG. 18 illustrates accelerating and decelerating from and to virtual site coordinates while in auto-pilot mode, respectively, according to the present invention.

Referring to FIG. 18, the method of acceleration and deceleration upon departure and arrival, respectively, are illustrated. Speed is plotted along the "Y" axis, indicated as 60, and distance between the point of origination 61 and the destination 62 is plotted along the "X" axis, indicated as 63. As shown, when auto-pilot mode is activated, the rate of acceleration during the acceleration phase, as indicated by 64, is calculated based on distance to the destination and estimated download time of Internet site data. Such is the case if a virtual site is the destination. If the destination is not a virtual site, then the rate of acceleration is based on distance alone. During the acceleration phase, the change in elevation of the reference is also calculated by the program. However, the final elevation of the acceleration is user definable.

Once the acceleration threshold has been reached 65, the reference generally maintains a calculated speed during the period of transit, as indicated by graph portion 66. The final elevation of the acceleration phase is generally maintained during transit. The rate of travel is continuously recalculated while the user is in transit 67. Preferably, if the destination is a virtual site, it is approached at a maximum rate which is directly proportional to the estimated download rate determined at the time of contact with the related Internet site. Adjustments in arrival time are calculated by the program during the final approach.

Upon reaching the deceleration threshold 68, the user is decelerated, as indicated by graph portion 69. At this point, the elevation also begins to change to match the elevation of the target. Deceleration may be calculated in a manner similar to acceleration.

A new destination may be selected from Auto-Pilot move even before the current destination is reached by selecting another destination from the surrounding virtual landscape. The program also permits a client to create landmarks by clicking on percepts as they pass within the field of view of the reference. If Auto-Pilot mode is aborted for any reason, a user will be placed into explore mode and is free to navigate as desired or even return to landmarked locations. A user can resume travel in auto-pilot mode at any time, or from any location within the virtual environment by activating the Auto-Pilot Module through one of various ways in the program.

Another aspect of Auto-Pilot mode is when a user invokes a tour of the virtual environment. During a tour, the user may not automatically activate sites. Instead, the user may be prompted to activate a site or continue the tour. If the user chooses to activate a site during a tour, the tour is paused, but can be resumed at any time. Preferably, when a tour is resumed, the user is transported in auto-pilot mode to the last coordinates of the user during the tour.

A tour can be invoked at any time during execution of the program. Preferably, each navigation of the virtual environment made by the user may be recorded as a tour. The user will be given the choice of editing or saving a tour. Because each saved tour is a discrete file, tours can be transferred to other users.

Referring to FIGS. 16A–16D, program steps of the Auto-Pilot Module will be described in detail. Upon activation of the Auto-Pilot module (Block 300), the program initially determines if the destination is a virtual site (Block 302). If the destination is a virtual site, then the program establishes a connection to the Internet site associated with the destination (Block 304). As a result of establishing this connection, the amount of data to be transferred from the Internet site to the user's computer is returned by the Internet site associated with the destination. If the destination is not a virtual site, the program advances to Block 306. The program then determines the coordinates within the virtual environment of the destination virtual site (Block 304). The program uses the coordinates of the destination, or an average of multiple coordinates to calculate a heading (Block 308). The program calculates the heading based on the shortest planar distance as represented by "X","Y" coordinates to the destination site. The program also calculates the acceleration and deceleration thresholds (65, 68, FIG. 18). The acceleration and deceleration thresholds are based on total distance to the destination from the point of origination (Block 310). The program also incorporates the current speed of the reference as well as the heading, if any. The program may also factor in user configurable departure and arrival trajectories during acceleration and deceleration. After calculating the heading and acceleration and deceleration thresholds, the program orients the reference in the direction of the destination such that the user's view is turned to face the direction of the destination site and acceleration begins (Block 312). During acceleration, transit, or deceleration, the user can perform a variety of functions and has various options available as described in detail below in the User's Actions in Auto-Pilot Mode Block 358 (Block 314).

The program then determines whether the reference has become oriented in the direction of the destination (Block 316). If the reference has not been oriented properly, the program returns to Block 312 to continue orienting the reference in the direction of the destination. If the reference is correctly oriented in the direction of the destination the program accelerates the reference in the direction of travel towards the acceleration threshold (Block 356). During this time from the start of Auto-Pilot mode to the acceleration threshold, the user has a variety of options and functions available that are described in detail in the User's Actions in Auto-Pilot Mode Block 358 (Block 320) below.

The program constantly checks whether the user has reached the acceleration threshold (Block 322), and if not continues the rate of acceleration towards this threshold as represented by the loop comprising Blocks 318–322. If the user has reached the acceleration threshold, the program then calculates the rate of transit (Block 324) according to the following equation:

$$\frac{RD}{\left(\frac{ARD}{(CR)(LTM)}\right)}$$

The quantity "RD" refers to the remaining distance to the deceleration threshold. "ARD" represents the amount of remaining data to be received from the Internet site to the user's computer. "CR" represents the connection rate in bytes per second. "LTM" represents the lag time modify which reflects all past lag times. The LTM (lag time modifier) represents delays in network transmission or reception which are not explained by the connection rate (CR). These delays may be introduced by network operators (such as Netcom and AT&T) who have oversold their network bandwidth. Overselling network bandwidth occurs when a network operator has sold an amount of connection rates to customers which exceed their connection rate to the Internet. Based on the calculated rate of transit, the program accelerates or decelerates the reference gradually to the newly calculated velocity (Block 326). Once again the user has available a variety of options and functions in the User's Actions in Auto-Pilot Mode Block 358 (Block 328) as described in detail below.

The program then determines if the destination is a virtual site (Block 330). If the destination is not a virtual site, the program proceeds to Block 340. If the destination is a virtual site, the program then determines whether a critical speed threshold is enabled (Block 332). A critical speed threshold is the calculated speed below which there is a high likelihood that the program is unable to contact, has lost contact with the Internet site, or that the destination site is severely time lagged. The term "time lagged" refers to the situation where data flow from an Internet site is slow for various reasons such as high traffic at the Internet site, slow server speed, or when communication lines are impaired. This critical speed threshold is based on current and previous speed and distance calculations. If the program determines that the critical speed threshold is enabled, the program then determines if the reference has dropped below the critical speed threshold (Block 334). If the reference has dropped below the critical speed threshold, an alert is issued to the user of potential network problems and, preferably a prompt is given to the user requesting permission to continue or abort auto-pilot mode (Block 336). Should the user choose to abort auto-pilot mode (Block 338), the user is returned to explore mode at Block 200 (Block 356). If the program determines that the reference has not dropped below a critical speed threshold (Block 334) or if the critical speed threshold is not enabled (Block 332), the program then determines if the reference has reached the deceleration threshold (Block 340). If not, the program returns to Block 324 and the rate of transit is recalculated and the loop comprising Blocks 324–340 continues. If the program determines that the reference has reached the deceleration threshold, the reference is decelerated in the direction of travel (Block 342). At this point, the user again has available a variety of functions and options in the User's Actions in Auto-Pilot Mode Block 358 (Block 344), as described in greater detail below. At this point, the program determines if the reference has not reached the destination (Block 346), then the program continues to Block 342, and the loop comprised of Blocks 342–346 continues until the reference has reached the destination.

If the program determines that the reference has reached the destination (Block 346), the reference orients towards the destination (Block 348). At this point, the user again has available a variety of functions and options in the User's Actions in Auto-Pilot Mode Block 358 (Block 350), as described in greater detail below.

The program then determines whether the reference has become oriented in the direction of the destination (Block 352). If the reference has not been oriented correctly, the program returns to Block 348 to continue orienting the reference in the direction of the destination. If the reference has been oriented properly, the reference arrives (Block 354) and the user is free to explore the destination site and is returned to Explore Mode at Block 200 (Block 356). However, if the reference is within an active zone upon entering Explore Mode, then activation occurs (Block 202).

User's Actions in Auto-Pilot Mode

Figure 19A:
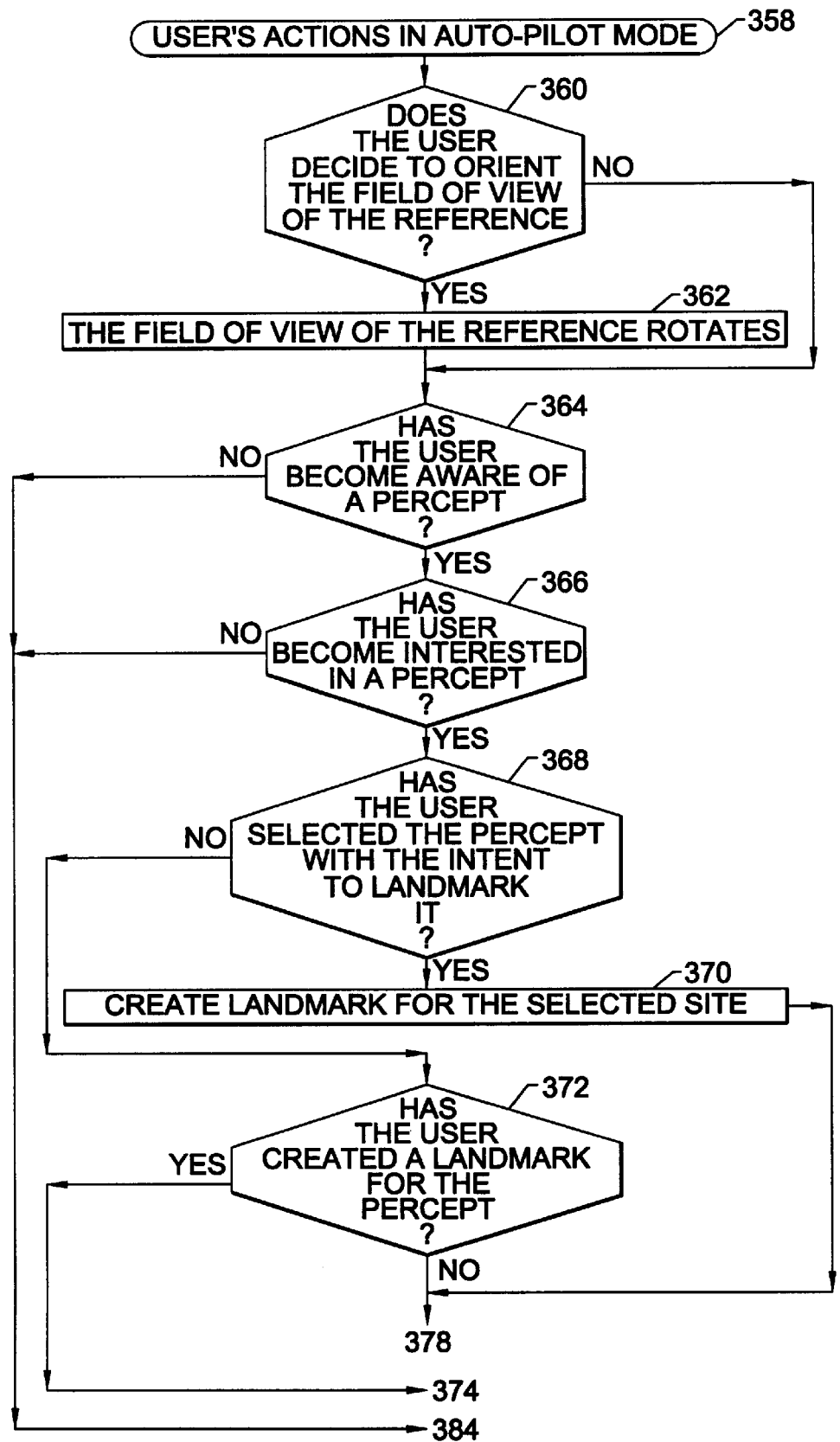
FIGS. 19A–19B are flow charts illustrating actions available to a user when in Auto-Pilot mode, according to the present invention.
Figure 19B:
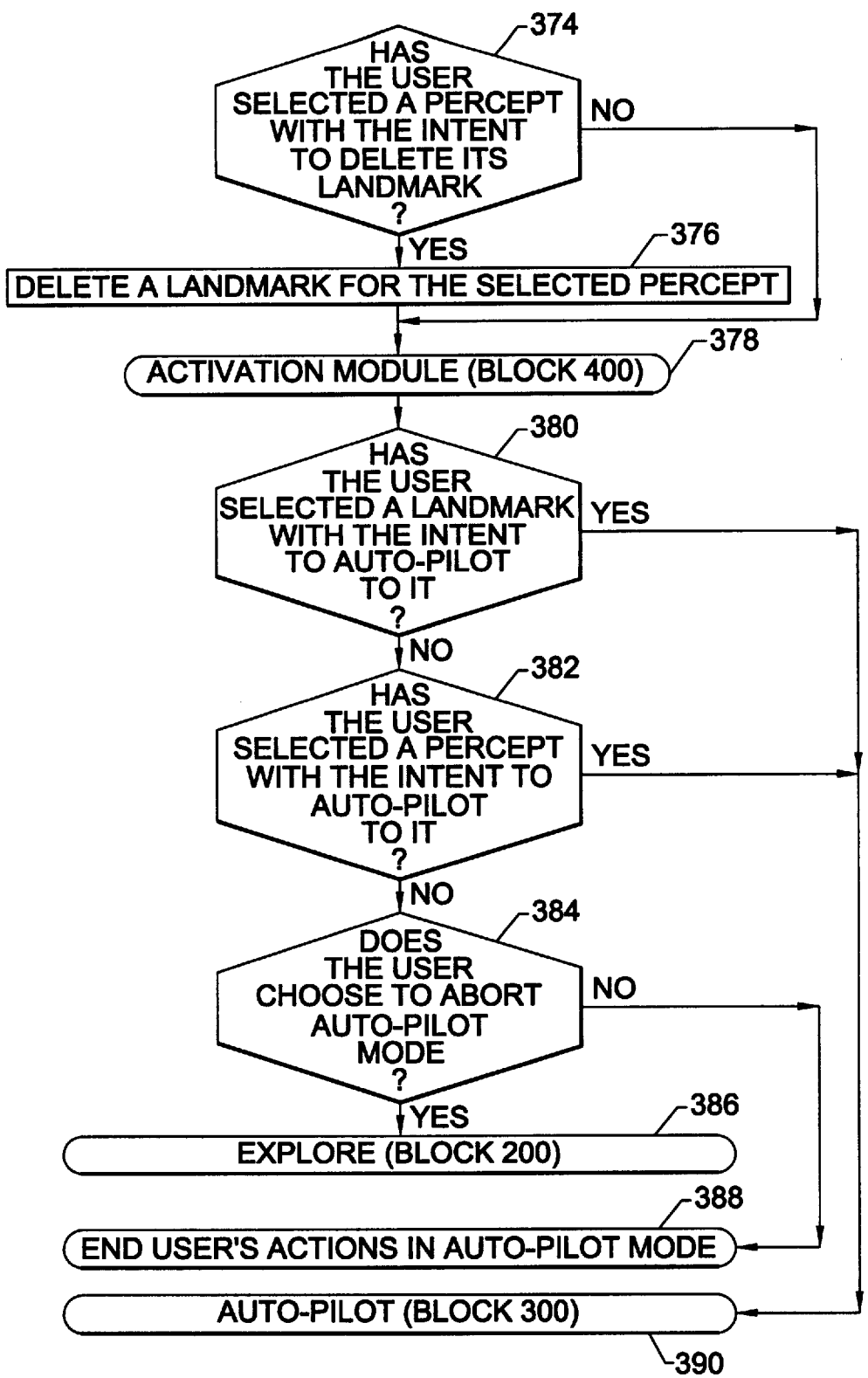

Referring now to FIGS. 19A–19B, the various options and functions available to the user when in auto-pilot mode (Block 358) are described in detail. The program is responsive to actions performed by the user during auto-pilot mode. Many of these actions and functions are similar to those available to the user in explore mode. The program determines whether the user wishes to orient the reference (Block 360). If the answer is yes, the reference is rotated in a direction according to the user's input (Block 362). In this way, the user's view can be moved freely in any direction while in Auto-Pilot mode. The only exceptions to the user's ability to move the field of view of the reference are during initial and final orientation of the field of view of the reference towards the direction of travel. If the user does not wish to orient the reference's field of view, a decision is made whether the user has become aware of a percept along the way to the destination site (Block 364). If the answer is yes, a determination is made whether the user is interested in the percept (Block 366). If the user is not interested in the percept or if the user has not become aware of a percept along the way to the destination site, the program advances to Block 384.

If the user has become interested in a percept of which he/she is aware, the program determines whether the user has selected the percept for purposes of landmarking the percept (Block 368). If the answer is yes, a landmark is created (Block 370). If the answer is no, the program determines if the user previously created a landmark for the percept (Block 372). If the user created a landmark for the percept, the program determines if the user has selected a percept with the intent to delete its landmark (Block 374). If the percept has not been previously landmarked (Block 372) or the user has not selected the percept with the intent to delete its landmark, the program continues to Block 378. If the answer is yes, the landmark for the selected percept is deleted (Block 376) and the program advances to Block 348. Similarly, if a landmark is created (Block 370) the program then advances to Block 378.

At this point, the program determines if the user has uniquely selected the percept with the intent to auto-pilot to it (Block 380). If the answer is yes, the user is returned to auto-pilot mode at Block 300 (Block 390). Consequently, auto-pilot mode towards a destination can be aborted and a new auto-pilot mode set towards a new destination.

If the answer is no, the program then determines if the user has chosen to abort auto-pilot mode (Block 384). If the answer is yes, the user is returned to explore mode at Block 200 (Block 386). If the user has not chosen to abort auto-pilot mode, he/she is returned to the Auto-Pilot Module at the appropriate point as illustrated in FIGS. 16A–16D (Block 388).

Leasing Wizard Modules

Users may create new virtual sites or move existing virtual sites freely throughout the multi-dimensional virtual environment. Users may lease units of the virtual terrain and corresponding airspace (plots of "land", "water", and/or "space") anywhere within the virtual environment. Single or multiple contiguous leased units of virtual terrain are known as virtual sites. The leasing function is accomplished via several modules which comprise the Leasing Wizard. A wizard is a screen interface that asks the user simple questions to arrive at a complex result. The leasing wizard runs the user through a set of screens or questions resulting in the leasing of unit(s) of virtual terrain for one or more virtual sites.

The grid system helps the user identify units of virtual terrain that are available for leasing. For example, a specific color, such as green, may identify units of virtual terrain that are available for leasing. Units of virtual terrain which have already been leased will be displayed in another color, such as red. Units of virtual terrain currently leased by the present service provider will be displayed in yet another color, such as blue. The user will only be able to select from those units of the virtual terrain that appear to be available. Preferably, when the user selects an available unit of virtual terrain for leasing, the desired unit is highlighted to indicate his/her selection. To activate the leasing wizard a service provider must first have selected unit(s) of virtual terrain with the intent to lease them. The user then waits while his/her computer contacts a leasing server via the Internet to determine whether the highlighted unit(s) is claimed by another party. During this communication, a leasing server calculates a lease rate and transmits this information, if the unit(s) is available, back to the leasing wizard. The leasing wizard then presents this information to the user and allows the user to accept or cancel the lease transaction.

The rate of a lease is determined by one or more of various factors including, but not limited to, density of virtual sites in the area, popularity of other nearby virtual sites, and the amount of user traffic in the area. For example, the lease rate of a unit adjacent a unit leased by a service provider whose virtual site is visited often may be greater than one adjacent a virtual site visited infrequently. Another means of assessing lease rates independently of, or in addition to, the aforementioned means is to assess the amount of user traffic in the local area and assess the value accordingly. If the user agrees to the lease rate, he/she is offered various payment options from a leasing server, including, but not limited to, credit card, electronic cash (E-cash), money order, and check. If the user pays via a credit card or E-cash, the leasing agreement is executed at that time. Other forms of payment may secure the rights to the selected virtual site(s) for a predetermined period of time. Once the leasing agreement is formalized through a response from the service provider via the leasing wizard, the leasing wizard determines if it was invoked by the Editor Module. If it was not, it may invoke the Editor Module in order to design objects, zones, sources, and/or features, and assign services, applets, scripts, and/or information to be used in or accessed through the virtual site. The Editor Module provides a function for the service provider to distribute the contents of virtual sites through the Internet to server(s) for inclusion into future client databases. If the leasing wizard was invoked by the Editor Module, then the contents of the virtual site being designed when the leasing wizard was invoked are distributed through the Internet to a server for inclusion into future client databases.

Figure 20A:
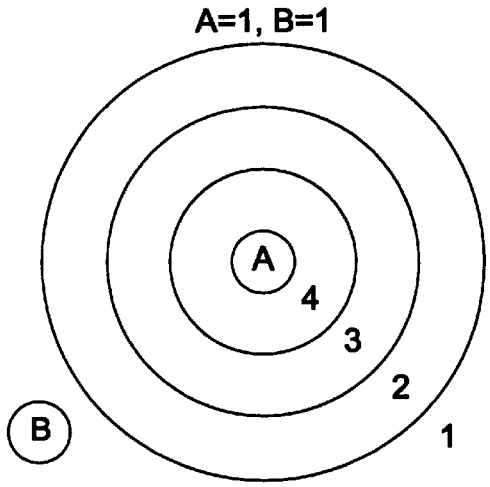
FIGS. 20A–20D illustrate a method of determining virtual site leasing rates, according to the present invention.
Figure 20B:
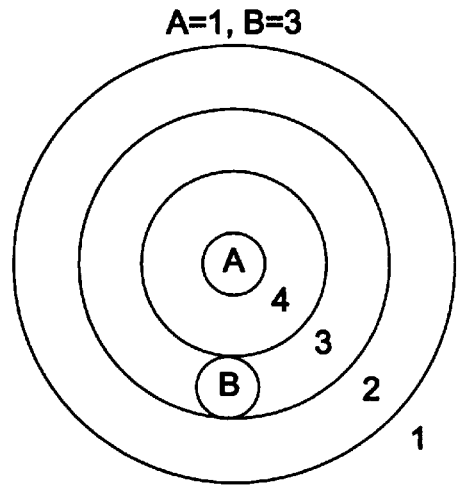

Referring to FIGS. 20A–20D, one exemplary, method of determining virtual site leasing rates is illustrated. In FIG. 20A, two virtual sites "A" and "B" are illustrated. Virtual site "A" has zones shown therearound with assigned rates. The inner most zone around site "A" has a rate of four (4) units of cost. Each of the remaining zones have decreasing rates of three (3), two (2) and one (1) unit(s), of cost respectively. The rates of either virtual site "A" or "B" as shown in FIG. 20A, is one (1) unit of cost. If the service provider leasing the virtual site "B" moves its virtual site within the leasing zones of virtual site "A", as in FIG. 20B, then virtual site "B" is subject to leasing rates based on virtual site "A's" existing leasing rate zones. In FIG. 20B, the leasing rate for virtual site "A" continues to be one (1) unit of cost, while the leasing rate of the relocated virtual site "B" becomes three (3) units of cost, because "B" moved into "A's" existing leasing zones.

Figure 20C:
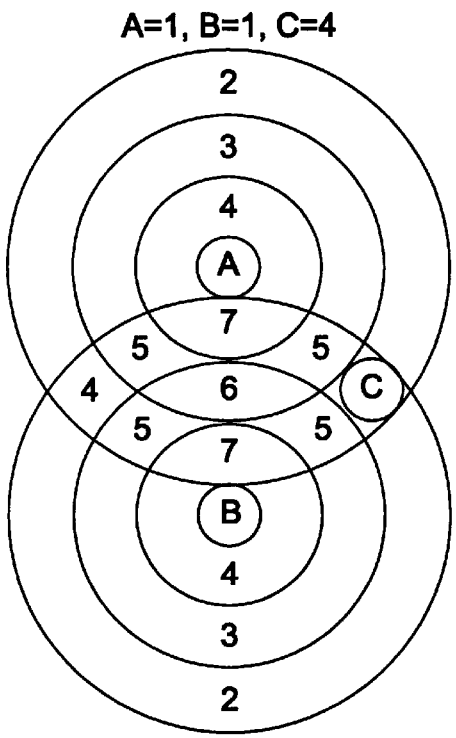
Figure 20D:
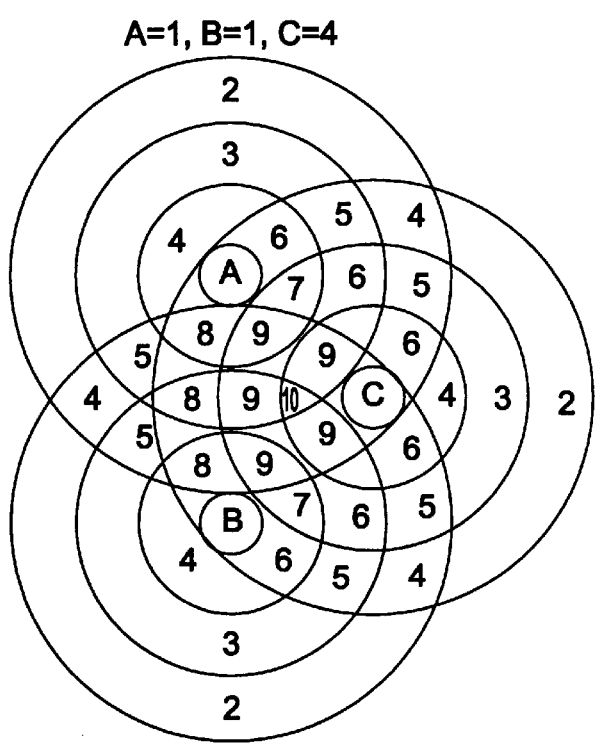

The overlapping concentric zones of virtual sites "A" and "B," resulting when virtual site "B" is close to virtual site "A," increases the rate to additional virtual site owners who desire to move their sites within the overlapping concentric zones of "A" and "B". As illustrated in FIGS. 20C and 20D, the rate to the owner of virtual site "C" is four (4) units of cost, because virtual site "C" has located in the overlapping region of the concentric zones of virtual sites "A" and "B," these concentric zones having a rate of two (2) units of cost each. The rate to virtual site "C" is the sum of these two zones, or four (4) units of cost, while the rates of virtual sites "A" and "B", which preceded "C," remain at one (1) unit of cost. Similarly, the rate to a fourth service provider which locates its virtual site within the overlapping concentric zones of "A", "B", and "C" is as indicated in FIG. 20D. This example provides an illustration of linear concentric leasing zones; however, these leasing zones may be calculated in a non-linear fashion. Furthermore, there may be any number of zones; the present invention is not limited to just four (4) zones or less.

Referring now to FIGS. 21A–21D, the Leasing Wizard Modules are described in detail. The Leasing Wizard Modules include the following: a Leasing claim Module (Block 500); a Leasing Contract Module (Block 520); and a Leasing Approval Module (Block 550). If the Leasing claim Module (Block 500, FIG. 21A) is invoked, the program determines if there are any unit(s) of virtual terrain marked as claimed by the service provider (Block 502). If any unit(s) of virtual terrain are marked as being claimed by the user, the program transmits these claims to a leasing server (Block 510) via the Internet. If the service provider has not claimed any units by marking them, an alert is presented to the service provider that there are no units being claimed (Block 504). The service provider is then given an opportunity to claim units of virtual terrain (Block 506). If the service provider chooses to do so, the program turns on the terrain grid (Block 508), and the Leasing claim Module is terminated (Block 516). If the service provider does not wish to claim any unit(s) of virtual terrain, the Leasing claim Module is terminated. After claims have been transmitted to the leasing server in Block 510, the service provider is informed that his/her claims have been transmitted to a leasing server for verification/processing and that this process may take quite a bit of time, but once a leasing server has responded to the claims, the Leasing Contract and Approval Module will be involved (Block 512). The program then waits for a leasing server to respond (Block 514). If a response is received within the predetermined amount of time, the Leasing Contract Module is invoked Block 520 (Block 518). If the response is not received within a predetermined amount of time the Leasing claim Module is terminated (Block 516). The Leasing claim Module is then terminated (Block 516).

Figure 21A:
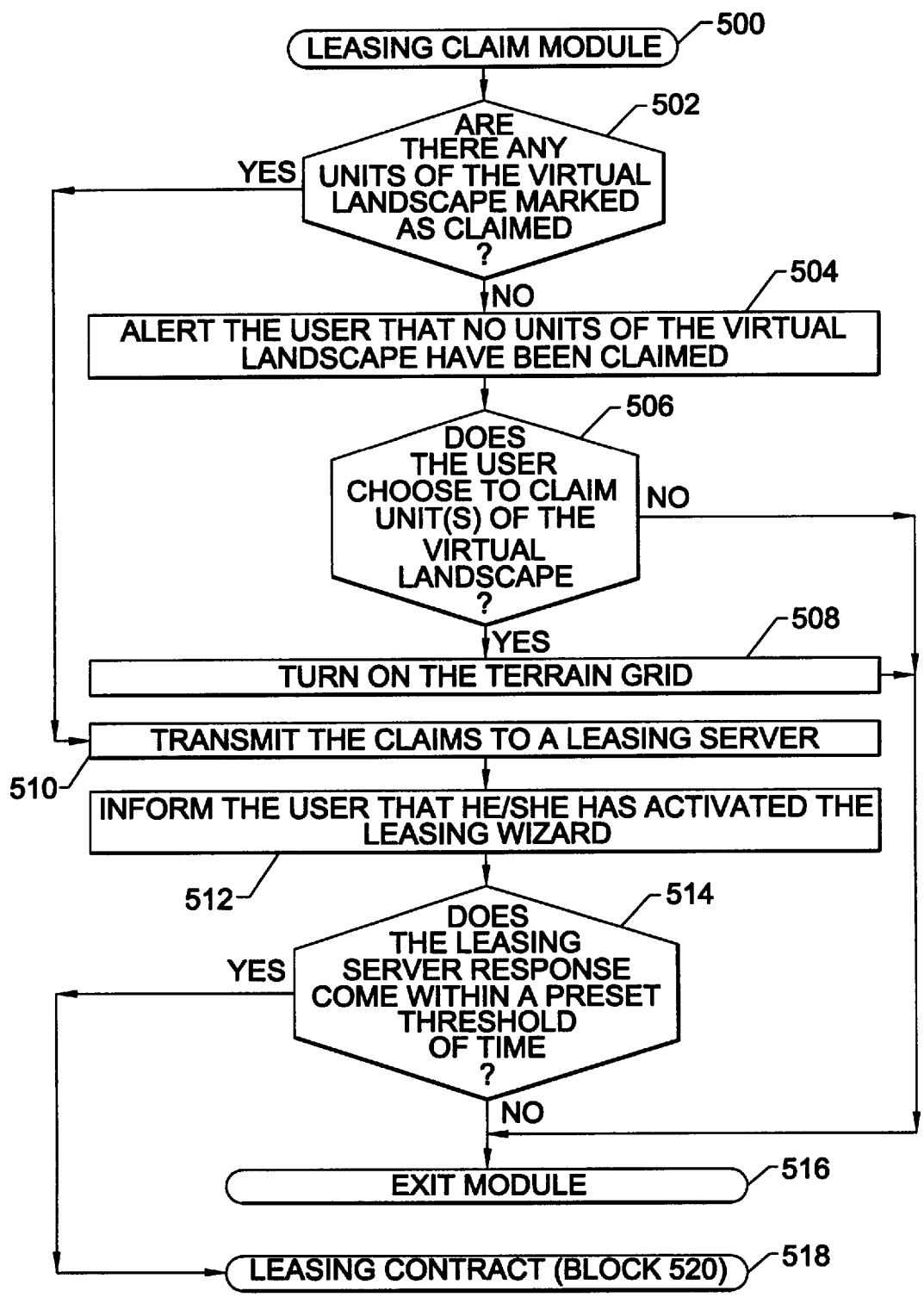
FIG. 21A is a flow chart illustrating operations for the Leasing claim Module, according to the present invention.
Figure 21B:
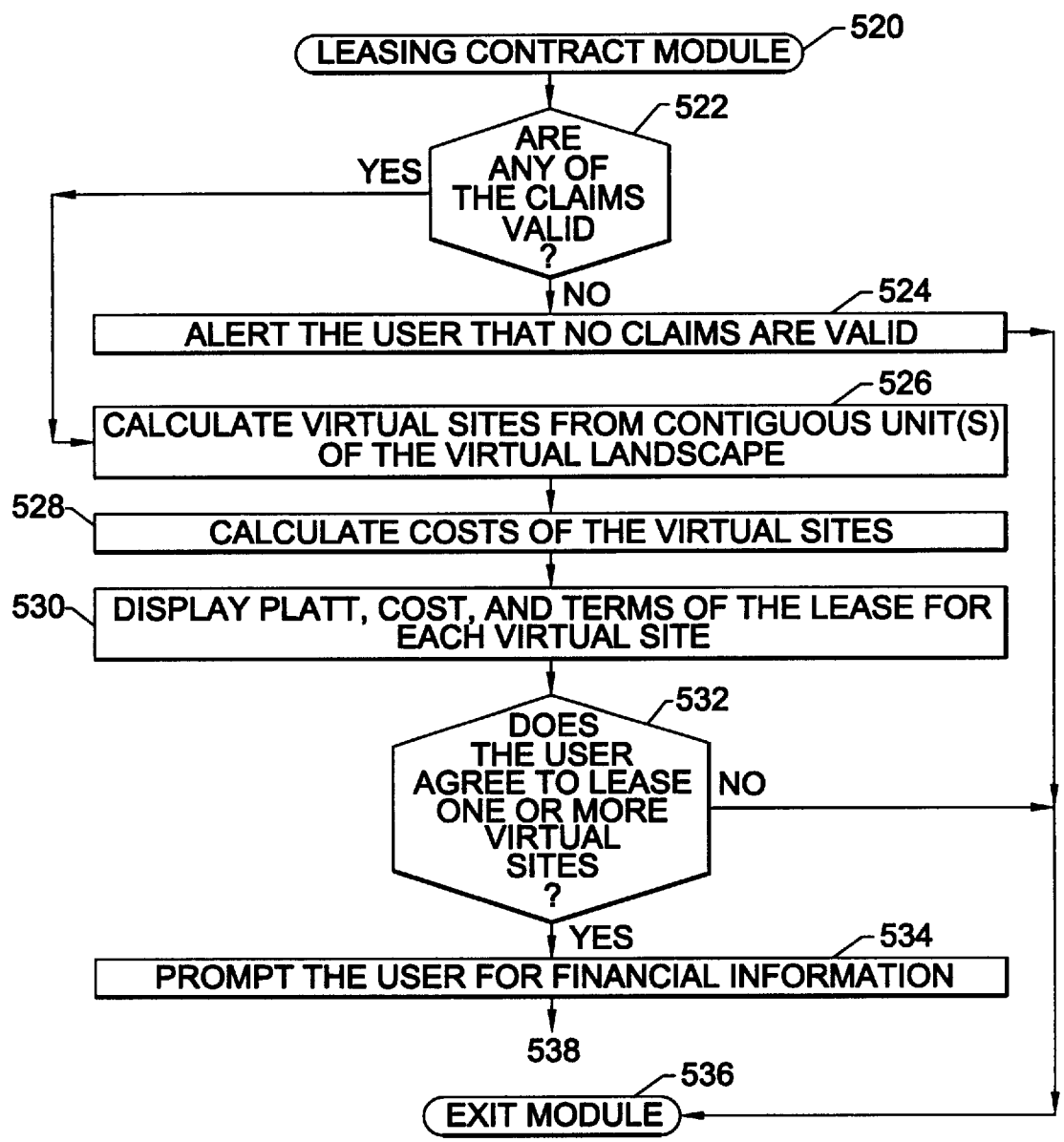
FIGS. 21B–21C is a flow chart illustrating operations for the Leasing Contract Module, according to the present invention.
Figure 21C:
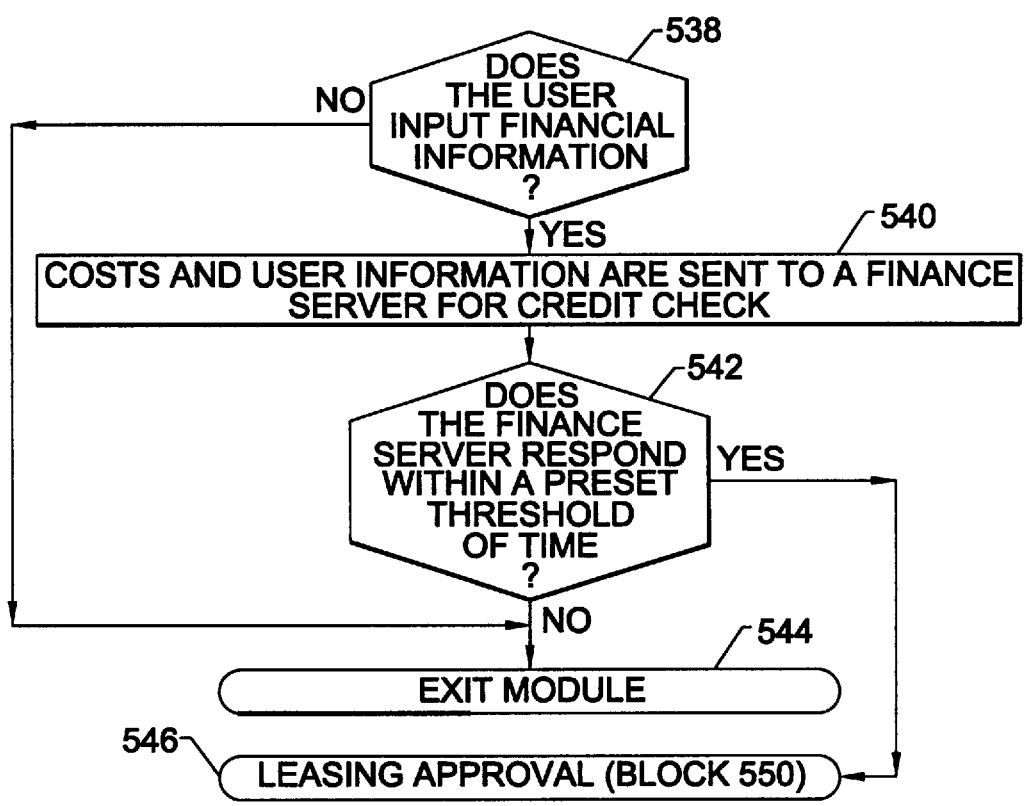

Referring to FIGS. 21B–21C, if the Leasing Contract Module is invoked (Block 520), the program determines whether any of the user's claims to unit(s) of virtual terrain are valid (Block 522). If the claims are not valid, the service provider is presented with an alert that the claims are not valid (Block 524) and the Leasing Contract Module is terminated (Block 536). If the program determines that the claims are valid, the coordinates of the requested virtual sites are calculated (Block 526) and the rate of the virtual sites are calculated (Block 528). The program then displays the terms of the lease for each virtual site as well as the lease rate of each virtual site along with a picture, image, or map of the virtual site(s) requested and their surrounding environs (Block 530). If the user agrees to the leasing terms of one or more of the claimed virtual site(s) (Block 532), the user is prompted for financial information (Block 534). If the user does not agree to lease any of the virtual site(s), the Leasing Contract Module is terminated (Block 544). If the user provides financial information to a finance server (Block 538), the program transmits the cost information and other user information to a finance server for verification (Block 540). The program then waits for a finance server to respond (Block 542). If a response is received within the predetermined amount of time, the Leasing Approval Module is invoked Block 550 (Block 546). If the response is not received within a predetermined amount of time the Leasing Contract Module is terminated (Block 544). If the user does not provide financial information, the Leasing Contract Module is terminated (Block 544).

Figure 21D:
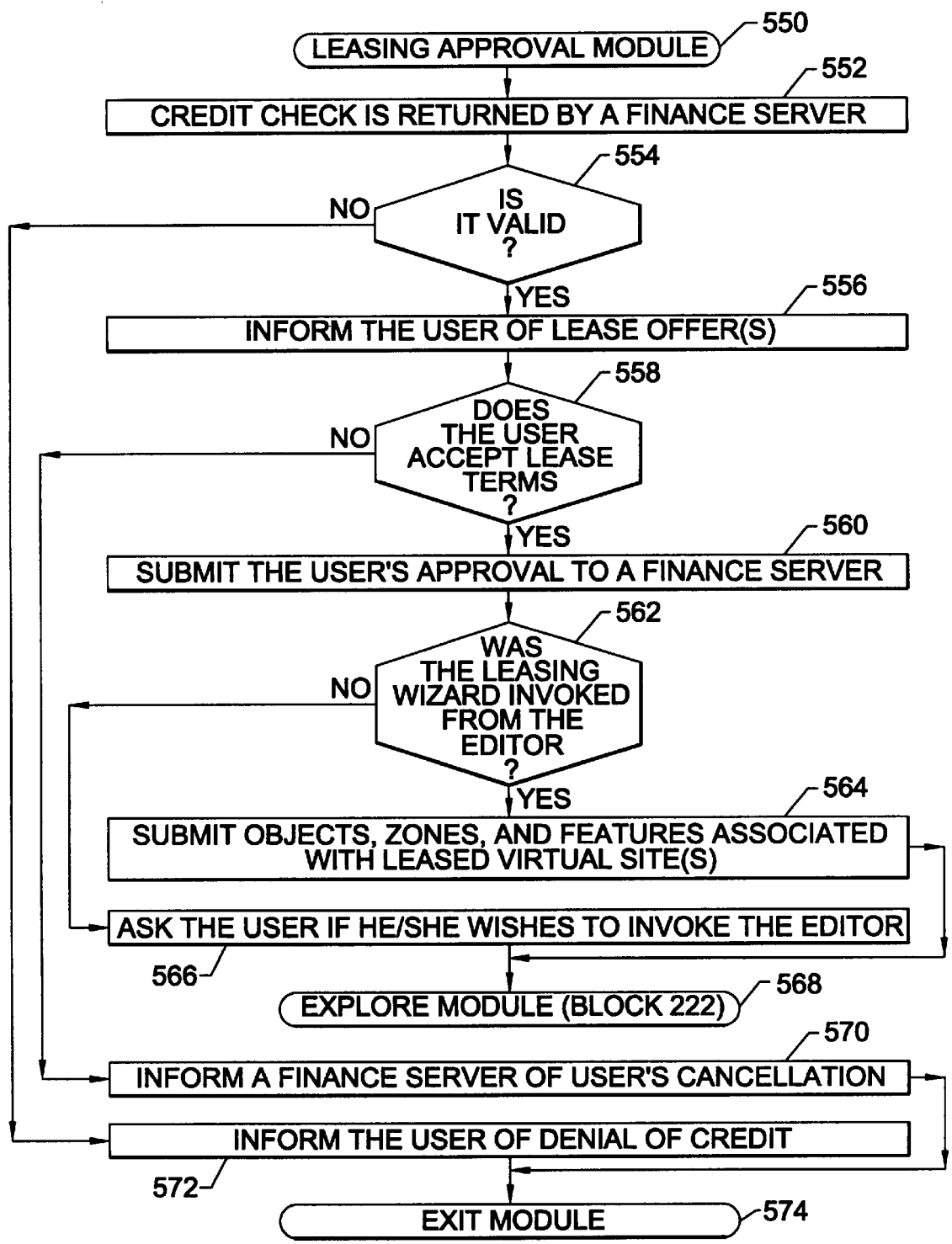
FIG. 21D is a flow chart illustrating operations for the Leasing Approval Module, according to the present invention.

Referring now to FIG. 21D, the Leasing Approval Module is described in detail. If the Leasing Approval Module is invoked (Block 550), a finance server performs a credit check on the user and transmits the results back to the program (Block 552). The program determines if the credit check is valid (Block 554), and if not, the program informs the user that he/she is denied approval (Block 572), and terminates the Leasing Approval Module (Block 574). If the program determines that the credit check is valid, the program informs the user of the lease offering(s) (Block 556). Preferably, the program is configured to request a second confirmation of the intention of the user. Next the program determines if the user accepts the terms of the lease (Block 558). If the terms of the lease are not accepted by the user, the program informs a leasing server of the cancellation of the transaction (Block 570), and the Leasing Approval Module is terminated (Block 574). If the user does accept the terms of the lease, the program submits this acceptance from the user to a finance server (Block 560) via the Internet. As would be understood by those having skill in the art, a plurality of finance and leasing servers may be utilized in performing the various financial and leasing functions.

After user approval has been submitted to a finance server, the program determines whether the initial invocation of the Leasing Wizard Module was made by the Editor Module (Block 562). If the Editor Module initially invoked the Leasing Wizard Module, the program submits the contents of associated leased virtual sites through the Internet to a landscape server (Block 564) and the program advances to Block 222 in the Explore Module (Block 568). If the program determines that the Editor Module did not initially invoke the Leasing Wizard Module, the service provider is prompted as to whether he/she wishes to invoke the Editor Module (Block 566). The program then returns to Block 222 in the Explore Module (Block 568).

Editor Module

The Editor Module (Block 600, FIG. 4) allows a user to modify a leased virtual site, add objects, zones, sources, and/or features to a virtual site, and modify existing objects, zones, sources, and/or features on a virtual site. Once the terms of the lease have been accepted, the user can construct a three-dimensional objects, zones, sources, and/or features on his/her leased virtual site according to his/her own specifications using the Editor Module. When objects, zones, sources, and/or features are constructed on a virtual site, the construction information is sent to a landscape server via the Internet. Information within a landscape server is provided to all subscribing users automatically and via regular updates of the client database. Preferably, such information is downloaded to currently connected users whose Internet connections are idle. Downloaded data of this type augments the client database until an updated version of the client database on computer-readable media becomes available. Consequently, additions and modifications to the virtual environment will become visible to users of the software system automatically following such updates.

The Editor Module manipulates polygons, convex polyhedra, sources, units of the vertical terrain comprising the virtual site, and applets, alone or in combination, and with or without texturemap or other rendering protocol overlays, to construct virtual sites within the virtual environment. Users can construct two or three-dimensional representations (i.e. buildings, trees, tables, lamps, blimps, control panels, etc.) that are visible within the virtual environment. Users may also create zones that, when entered, allow the activation of a helper application (such as a browser or browser module) to display information, the activation of an applet which may interact with the multi-dimensional virtual environment, and/or of a service provided/stored on an Internet site(s). In this way, users can enter a site and explore great detail within the site in a scale-independent way. Internet site information also may be represented on the virtual landscape by motion pictures/ animations and by sound files. Units of virtual terrain encompassed by a virtual site can be modified in both their color, texture, and in their vertex or planar elevations ("Z" axis height). Color and/or texture is modified using rendering protocols known to those having skill in the art, including postscript, TIFF, GIF, etc. In addition, the program enables users to create fully-constructed virtual sites visible only to their local computers. These virtual sites which are visible to a particular computer may be placed anywhere in the virtual environment regardless of factors which restrict the positioning of virtual sites.

The Editor Module can be invoked at anytime while in Explore Mode or from the Leasing Wizard. If the Editor Module is invoked, a special toolbox and menu bar preferably appear which provide added functionality for embellishing virtual sites with, but not limited to, applets, services, objects, zones, sources, features and the like. From the Editor Module, the user is able to edit and save for later use, any modifications made to the virtual environment. Anytime that a user opens a saved virtual site(s), the user is immediately transported to the appropriate coordinates. The user can submit the changes to a leasing server for later publication to other users. If the virtual site being edited by the user is already leased by the same user, then submission will update the user's virtual site. If the virtual site(s) being edited by the user is not yet leased by the user, then submission will automatically invoke the Leasing Wizard Module. If the virtual site(s) being edited by the user is on, or partially on, portions of the virtual terrain that are unavailable, the Editor Module will not invoke the Leasing Wizard Module, but will instead display an error message informing the user of a potential claim problem.

Lag Time Reduction

The present invention facilitates rapid presentation of requested Internet site data to users heretofore unavailable. Current technology based on HTML and VRML requires that Internet site data be downloaded from an Internet site in response to directed user commands/requests. Consequently, significant lag times associated with accessing and rendering sites are experienced by a user, especially those containing complex graphics, since a user must wait for information from Internet sites be downloaded prior to its rendering by the user's computer.

To reduce lag times experienced by users while accessing Internet sites containing complex graphical data, the present invention divides Internet and virtual site data into two classes. The first class of data is data which resides in the client database(s) on the user's computer. First class-type data may include, but is not limited to: virtual domain information such as graphics, texture, and wire frames. Preferably, complex site data requiring a long time to download resides in the client database(s) on the user's computer for many, if not all Internet sites. Additionally, it is preferable that data for the three-dimensional graphical representations of an Internet site be included in the client database(s) as well.

The second class of data is that which may be downloaded to the user computer. Second class-type data may include, but is not limited to: graphics, text, Java applets, OLE objects, and Visual Basic scripts. It is also preferable that data reflecting changes made to a particular virtual site be downloaded at the time the virtual site is selected for access or at the time that the program estimates that the data will be needed. In order to achieve a high level of responsiveness, a Priority Caching Module retrieves and temporarily stores Internet and virtual site data that falls within the second class.

Priority Caching Module

Figure 22A:
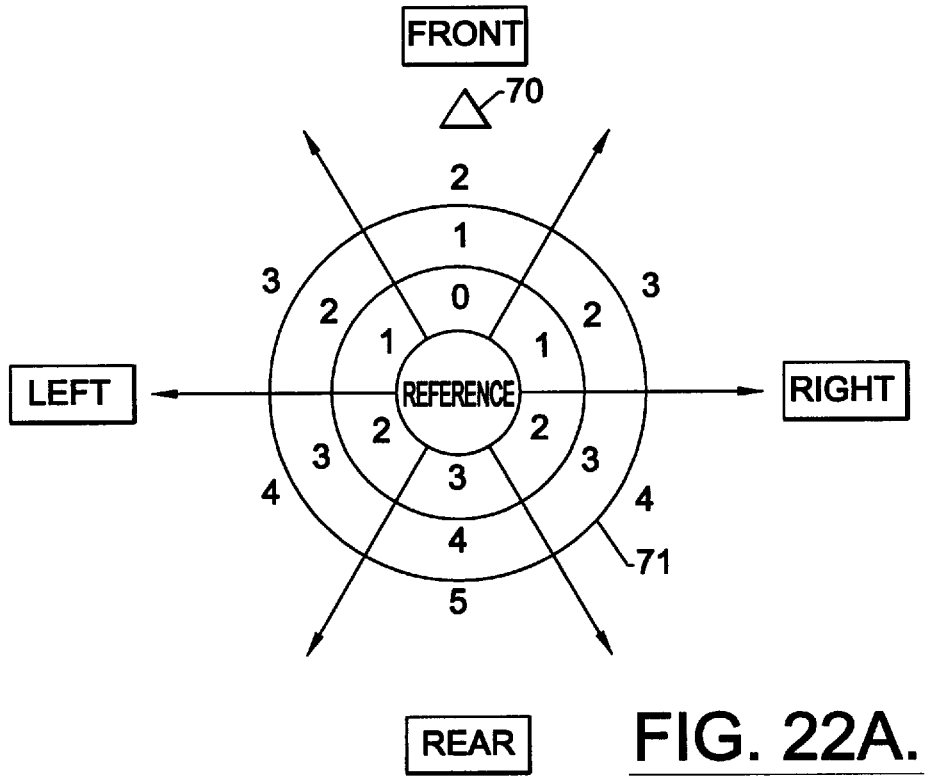
FIGS. 22A–22C illustrate assigning priorities to virtual sites within a predetermined vicinity of the user in a virtual environment.
Figure 22B:
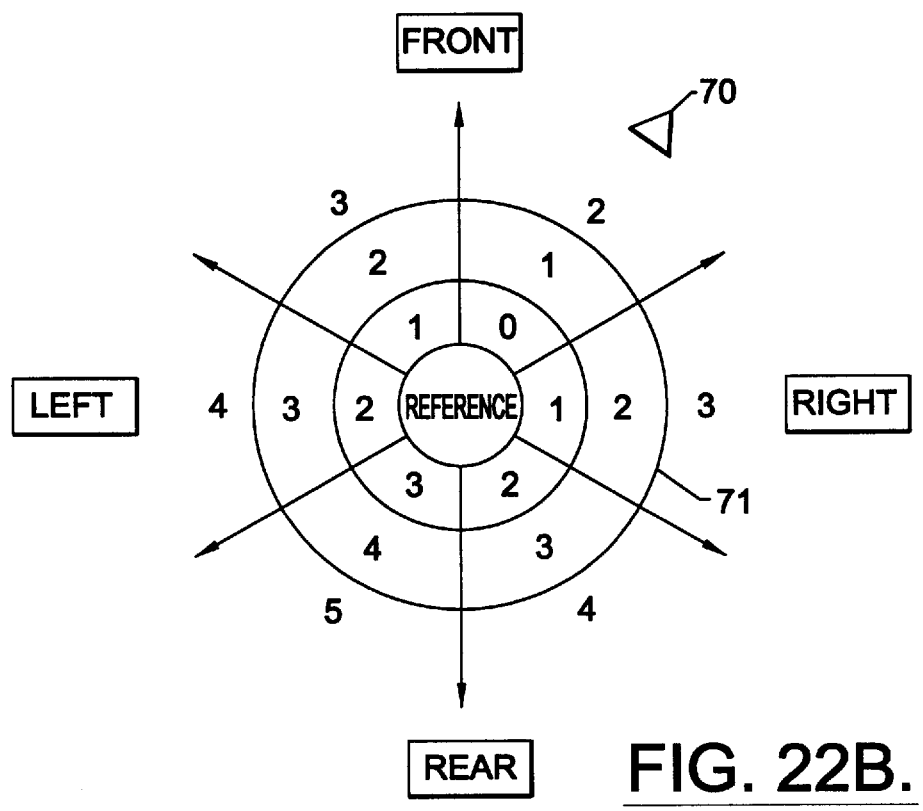

As the user's reference moves through the virtual environment, data in the second class for virtual site representations, active zones and/or triggers visible to a user are assigned a high retrieval priority. As virtual site representations, active zones, and/or triggers enter and leave the field of view of the reference, the priorities associated with them change accordingly. The program employs a caching mechanism that constantly collects and stores information from Internet sites based on the assigned priorities of their respective virtual sites, active zones or triggers. It assigns a priority to all virtual sites, active zones, and/or triggers within the field of view of the reference, as indicated by the arrowhead labelled 70, and within a predetermined vicinity of the reference, as indicated by concentric circles labelled 71, even though not within the view of the reference, as illustrated in FIGS. 22A–22B. Virtual sites, active zones, and/or triggers which are closest to the reference are assigned higher priorities than those further from the reference.

Figure 22C:
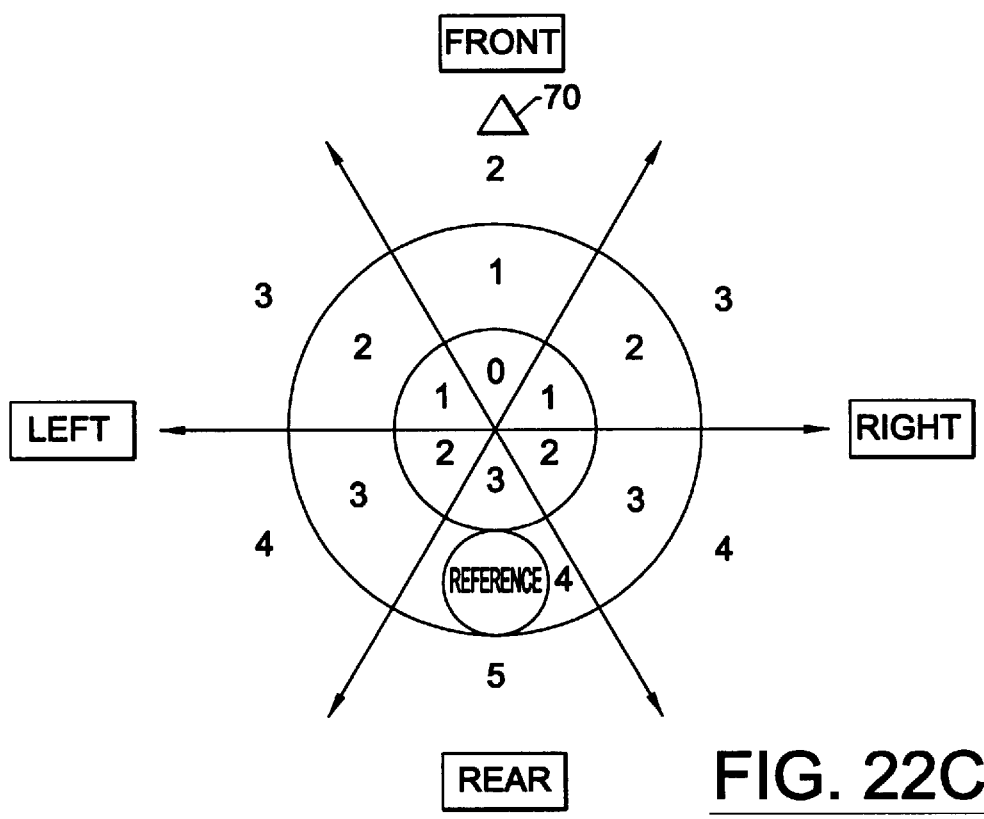

As illustrated in FIGS. 22A–22B, a priority field is superimposed over the virtual environment around the reference's present position, and zones within the priority field are assigned priority values. In the illustrated example, "0" represents the highest priority zone and "5" represents the lowest priority zone. The priorities may extend outwardly to a user-configurable threshold. The highest priority "0" preferably is assigned to the zone which is directly in front of the reference. The lowest priority "5" preferably is assigned to the zone which is relatively far from the reference and directly behind the reference. Virtual sites, active zones, and/or triggers located within each zone inherit the priority of the zone in which they are located. In addition, if the reference rotates left, right, up, or down, the priority field is rotated in the same direction, as illustrated in FIG. 22C.

Based on the assigned priorities of virtual sites, active zones, and/or triggers, the program retrieves "second class" data and then stores it in the user computer's cache. Thus, as a user moves towards a virtual site, active zone, and/or triggers or increases the resolution of a virtual site, active zone, and/or triggers by magnifying the view of the virtual site, active zone, and/or triggers, information from related Internet site(s) starts to download to the user's computer even if the user does not eventually "visit" the virtual site, active zone, and/or trigger. Accordingly, the present invention decreases both actual and perceived lag time necessary for a user to visit and interact with a virtual site via "pre-loaded" data in the client database(s) and via the "downloading-upon-approach" mechanism.

Data from virtual sites, active zones, and/or triggers which have the highest priority and which have been recently used will have the most secure place in the cache of the user's computer. As virtual sites, active zones, and/or triggers are passed by and move into lower priority zones, their data in the cache will be replaced by data from higher priority virtual sites, active zones, and/or triggers. This priority scheme is modified by the reference's acceleration. If the reference accelerates, then the priority field is shifted forward by an amount proportional to the amount of acceleration, as illustrated in FIG. 22B.

Caching, according to the present invention, operates in both explore and auto-pilot modes, as well as with all reference orientations (right, left, forward, rear, etc.) and serves to supplement the data which is included in the client database(s) (first class data). Depending on the preferences of the user, data within the second class that is cached may remain on the user's computer, or it can be purged periodically. Preferably, caching occurs such that data which has not been used recently is replaced with newer data as it arrives. For instance, if the user was examining virtual site "A", then the cache would be filled with virtual site "A's" second class data. However, when the user moves to virtual site "B", then virtual site "B's" second class data will replace virtual site "A's" second class data in the cache, if there is not enough room in the cache to hold both.

Preferably, when a user retrieves and views an HTML document from an Internet site, the HTML document is scanned for links to other Internet sites and then caches these URLs. If the user discards the HTML document, then these URLs are dropped to the lowest priority in the cache and will be replaced by incoming data. Preferably, a histogram of keywords associated with virtual sites visited by a user are compiled by the program. This histogram augments the priority scheme described above by allowing the program to "learn" from the user's habits. For example, if a user habitually visits academic virtual sites, then if this user is in an area with several virtual sites, and one is a university virtual site, the university virtual site will be assigned a higher priority than it would be assigned otherwise. Similarly, a link in a HTML or VRML document to a university Internet site represented by a virtual site would receive priority over other links.

Figure 23A:
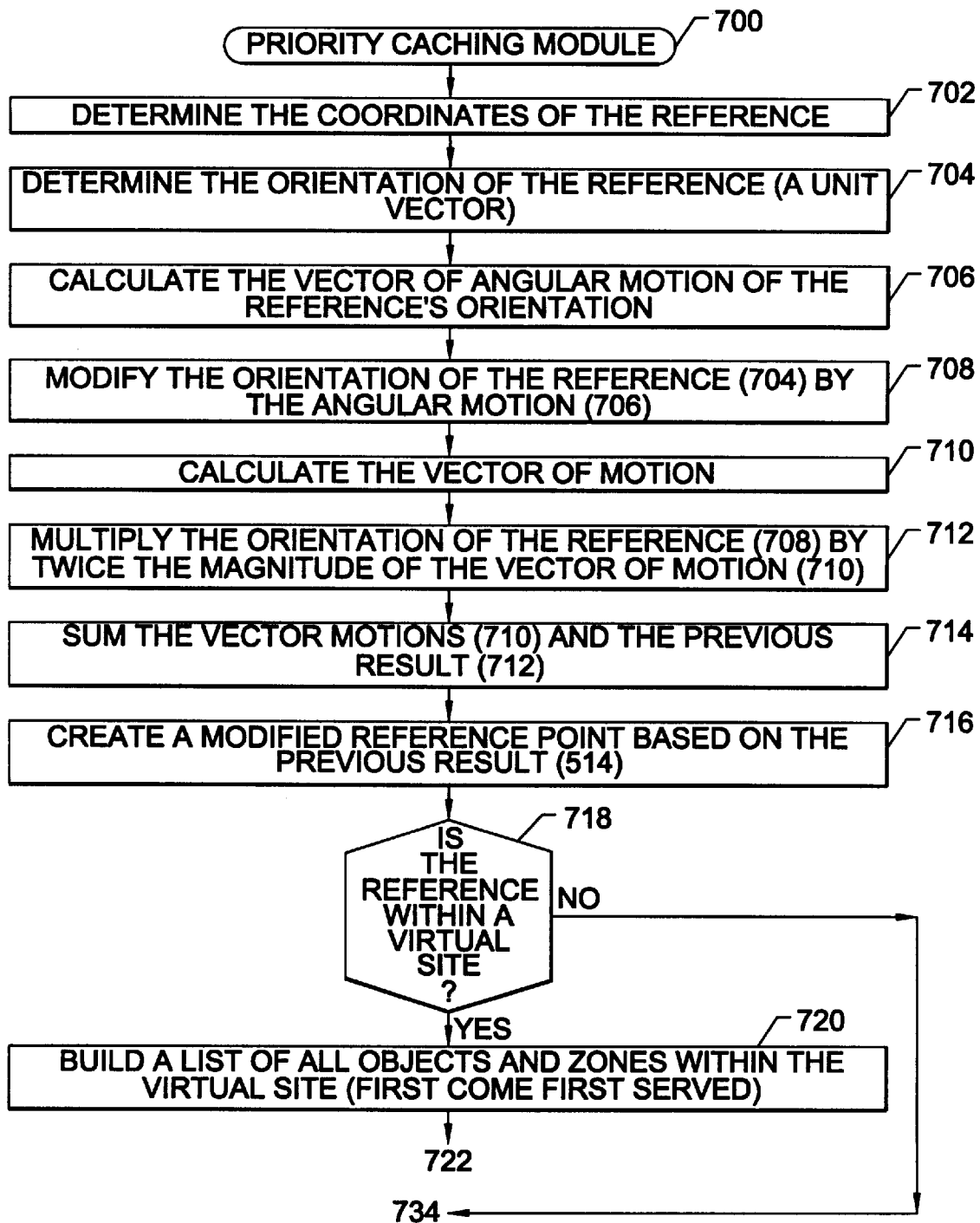
FIGS. 23A–23C are flow charts illustrating operations for the Priority Caching Module, according to the present invention.
Figure 23B:
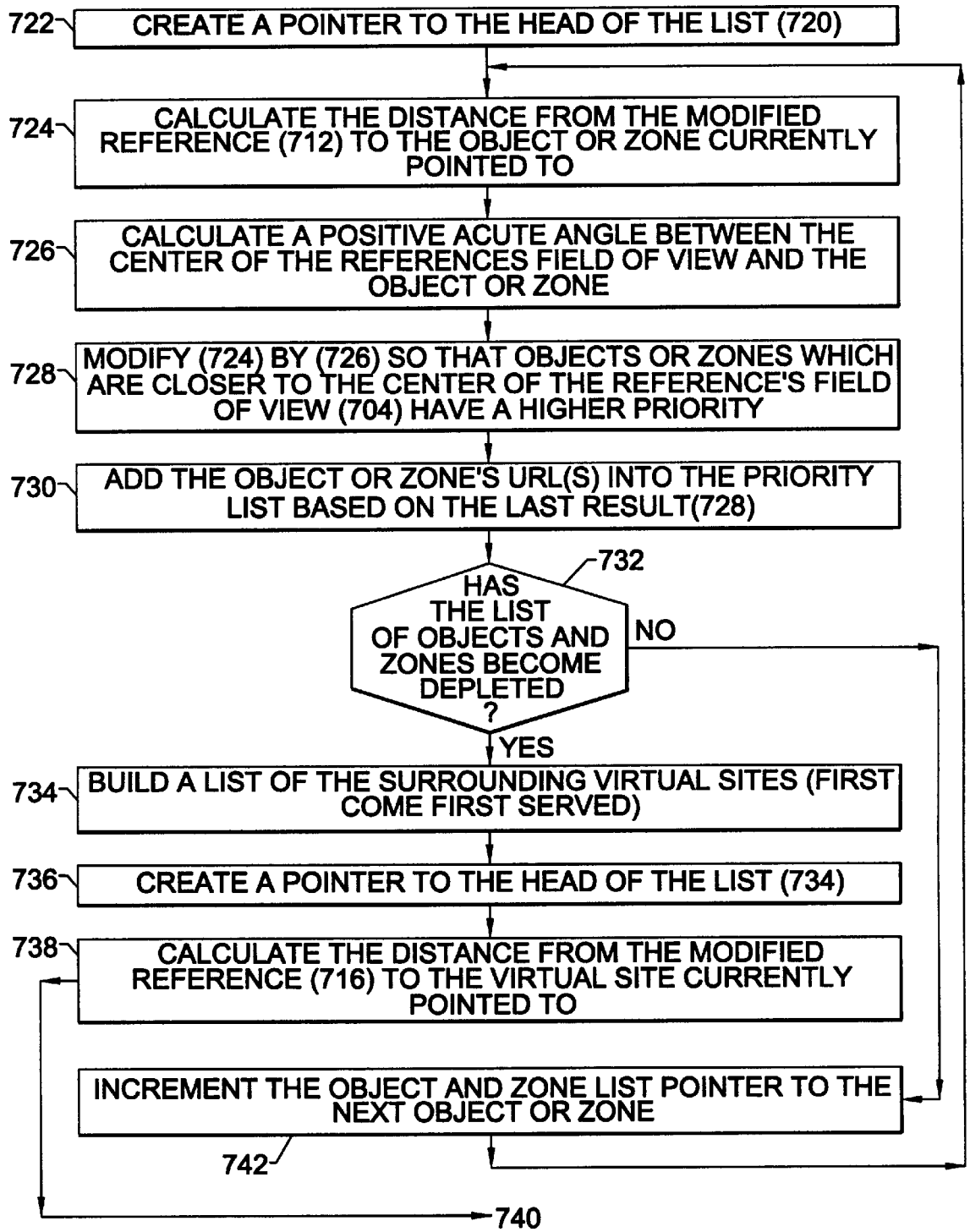
Figure 23C:
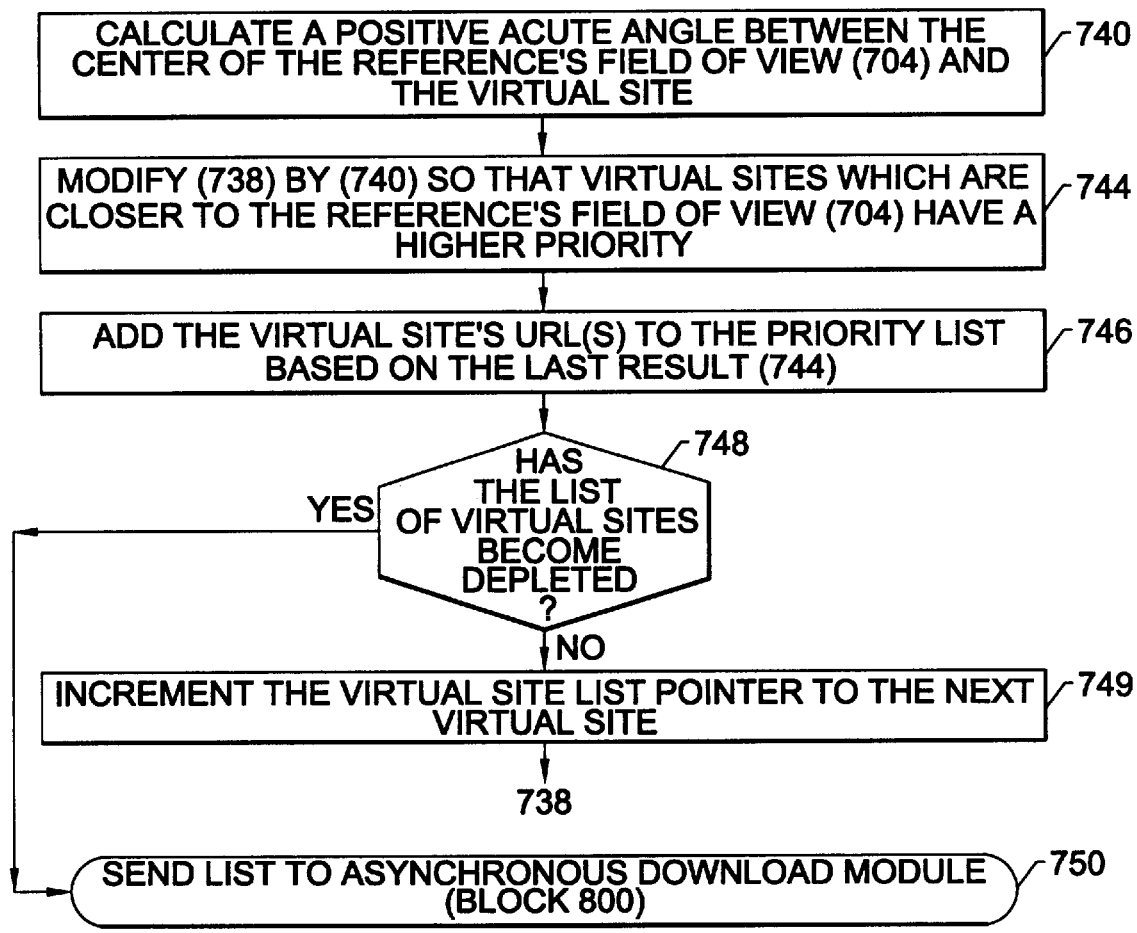
Figure 24A:
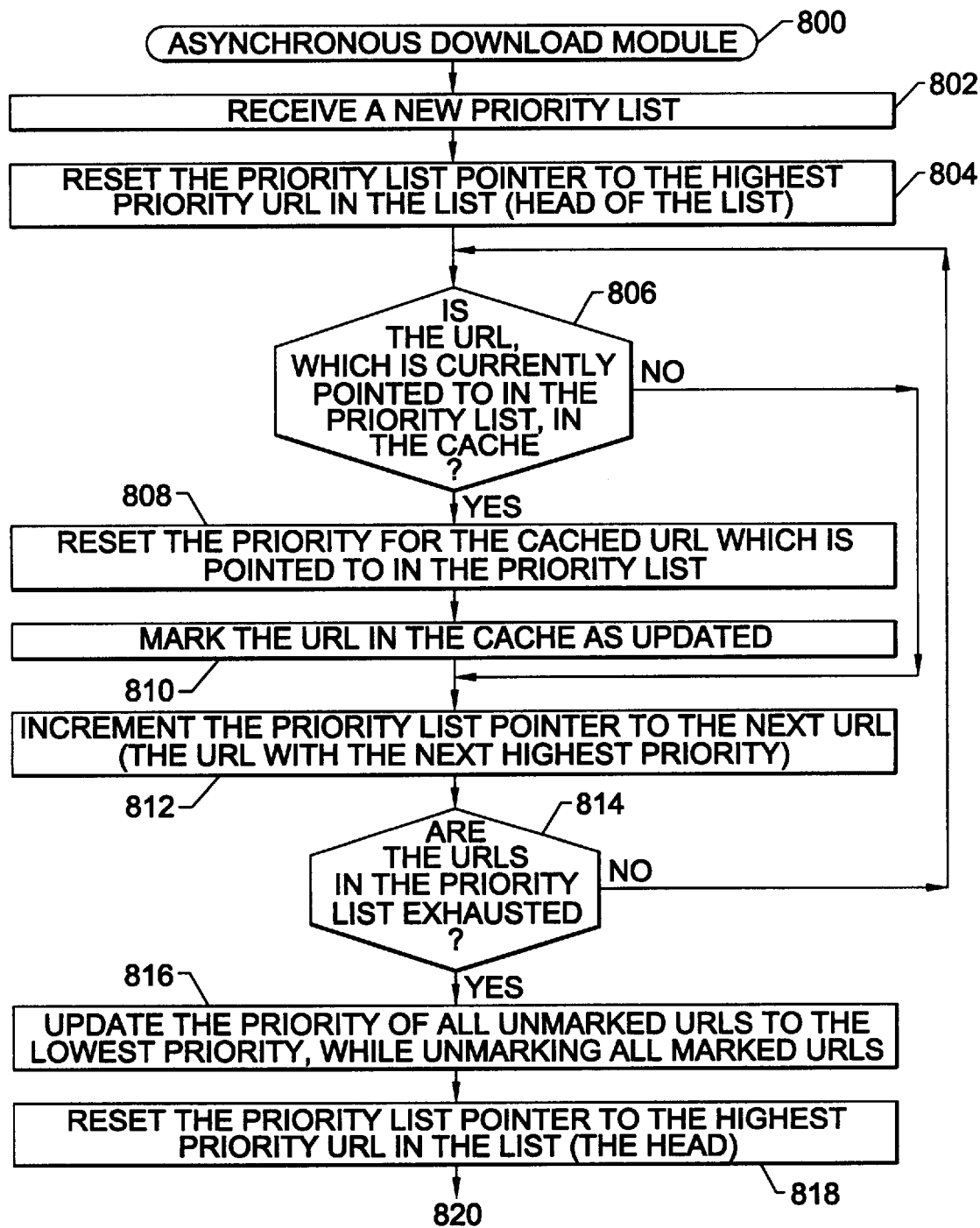
FIGS. 24A–24D are flow charts illustrating operations for the Asynchronous Download Module, according to the present invention.
Figure 24B:
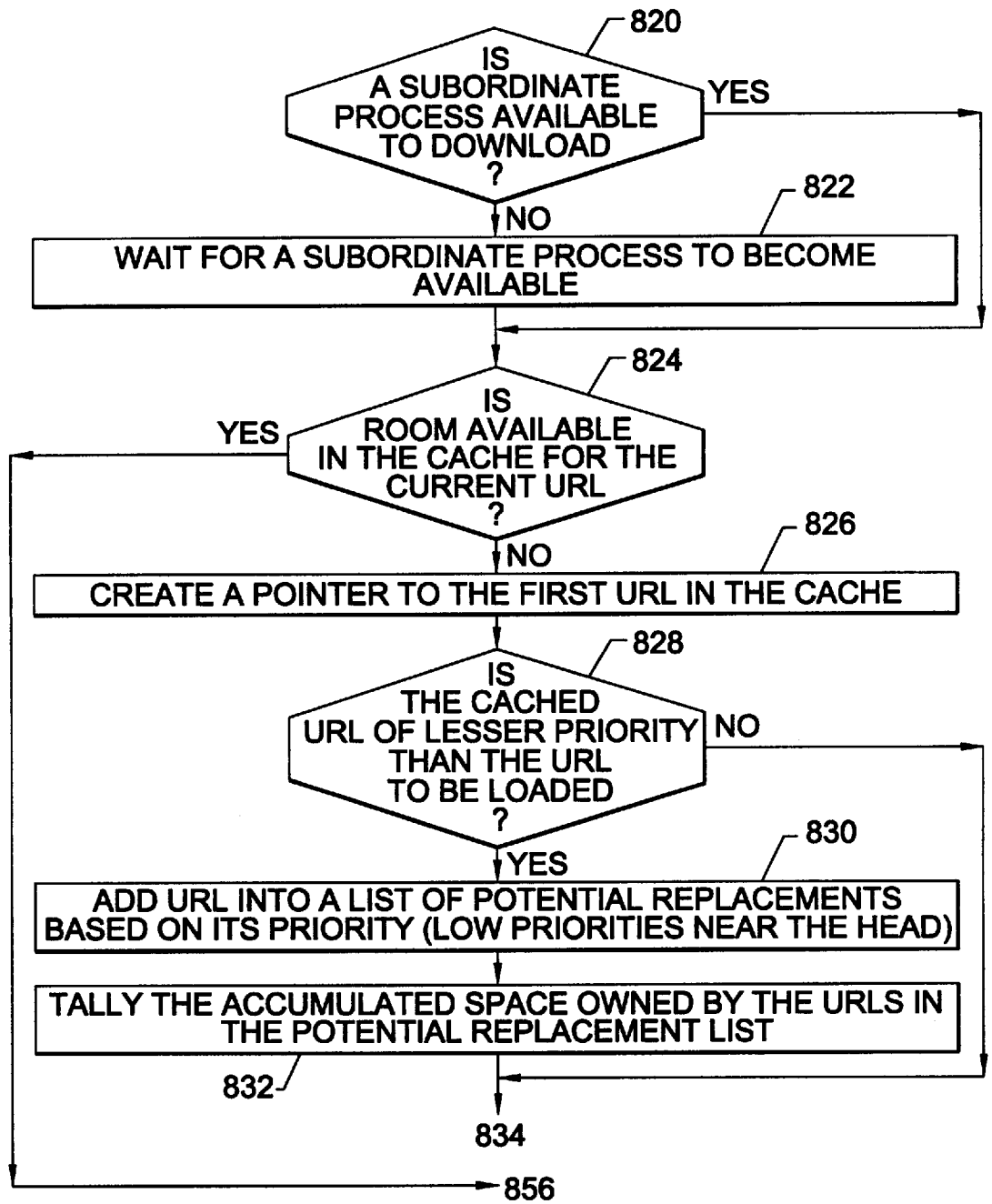
Figure 24C:
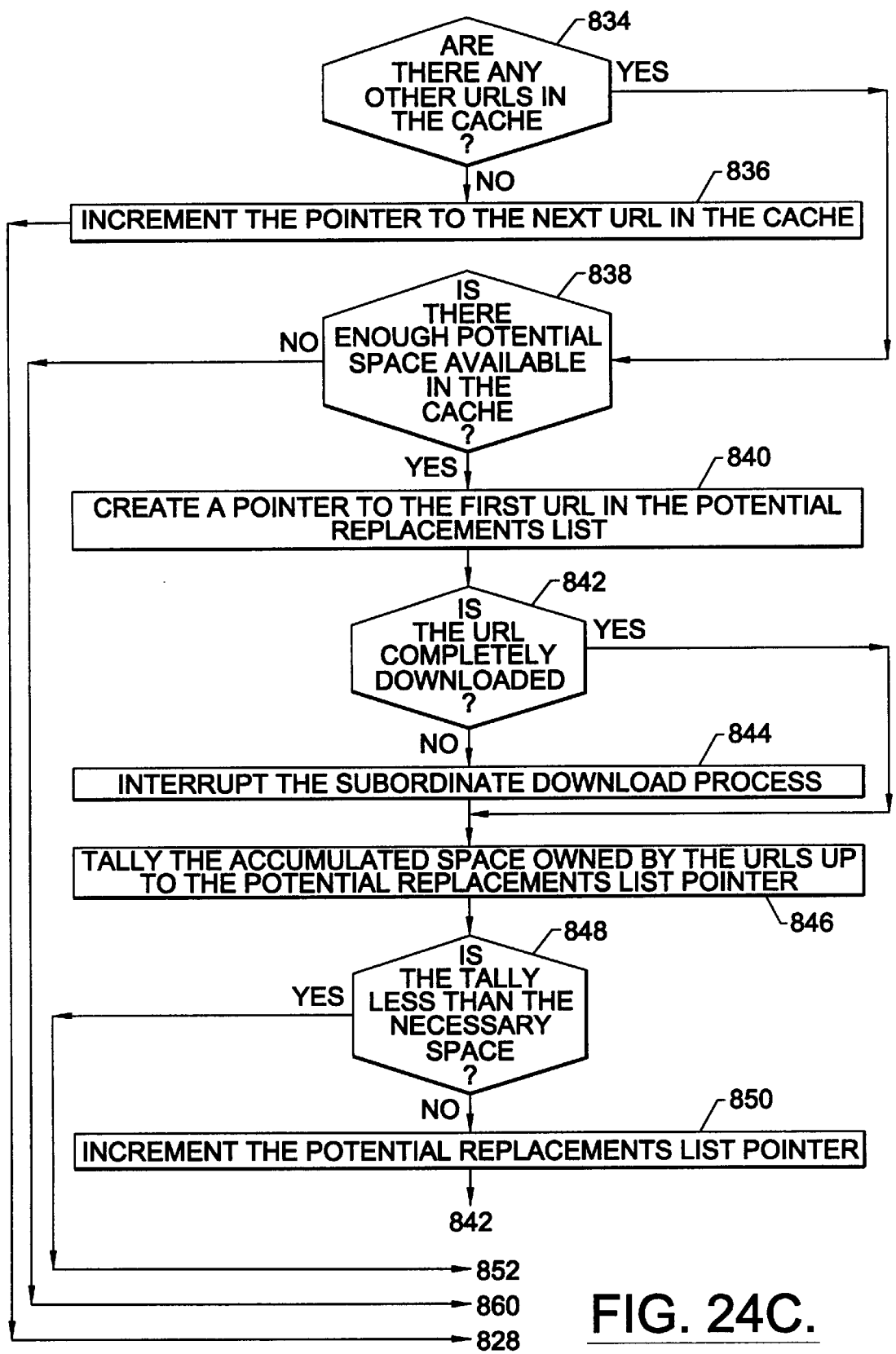
Figure 24D:
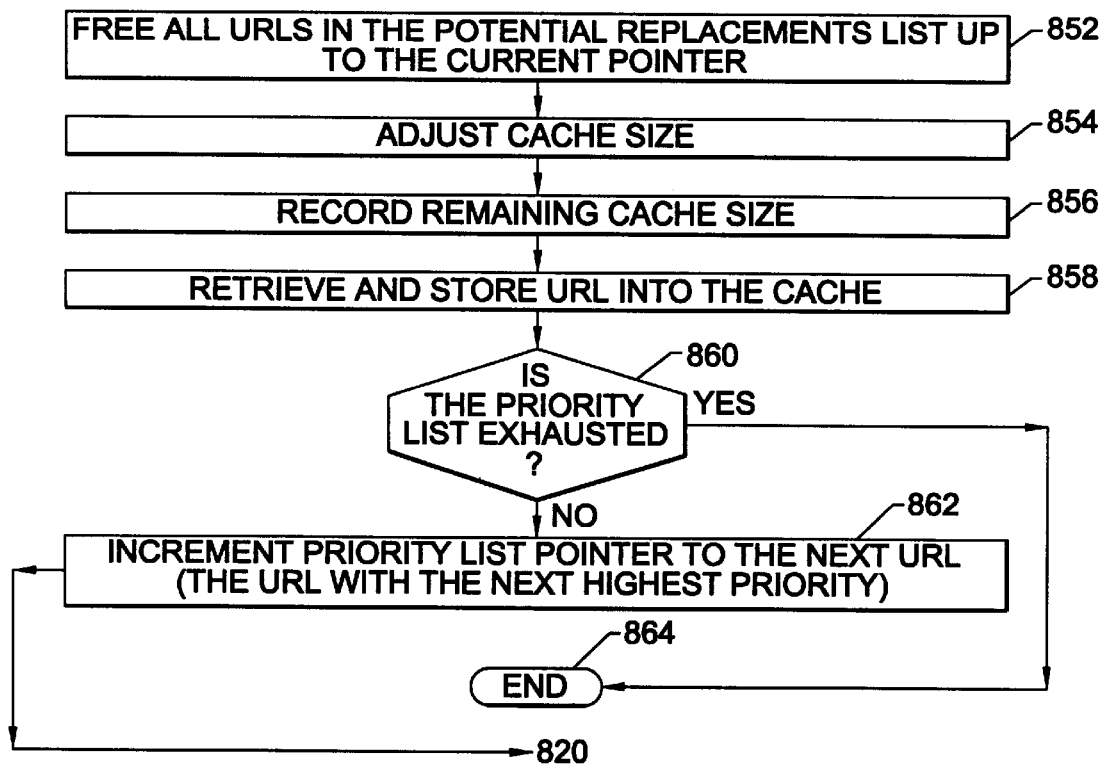

Referring now to FIGS. 23A–23C, operations for creating a priority list of zones for caching purposes will be described. The Priority Caching Module (Block 700) is invoked from Auto-Pilot Mode or Explore Mode. The program determines the coordinates of the reference within the virtual environment at predetermined intervals of time (Block 702). The program determines the reference's orientation (Block 704) and calculates the vector of angular motion of the reference's orientation (Block 706). The program automatically modifies the orientation of the reference by the angular motion of the reference (Block 708) and calculates the vector of motion (Block 710). The program then multiplies the orientation of the reference, which is a unit vector, by twice the magnitude of the vector of motion (Block 712). This quantity is added to the vector of motion (Block 714) and a modified reference point based on this result is created (Block 716).

The program then determines if the reference is in a virtual site (Block 718). If the answer is no, the program advances to Block 734. If the answer is yes, the program builds a list of all active zones or triggers in the virtual site in no particular order (Block 720). The program creates a pointer to the head of the list (Block 722) and calculates the distance from the modified reference to the active zone or trigger currently pointed to (Block 724). Next, the program calculates a positive acute angle between the center of the reference's field of view and the active zone or trigger (Block 726). Using the results from Blocks 724 and 726, the program assigns higher priority to active zones or triggers that are closer to the center of the reference's field of view (Block 728). Active zones or triggers having the highest priority, as determined in Block 728 have their respective URLs added to the priority list, with the highest priority URLs appearing at the head of the priority list (Block 730).

Next, the program determines if the list of active zones or triggers has been depleted (Block 732). If the answer is no, the program advances to Block 742 where the pointer in the list of active zones or triggers is incremented to the next active zone or trigger. The program then loops back to Block 724. If the answer is yes, the program builds a list of all surrounding virtual site(s) in no particular order (Block 734), and then creates a pointer to the head of the list (Block 736). The program calculates the distance from the modified reference to the virtual site currently pointed to (Block 738), and calculates a positive acute angle between the center of the reference's field of view and the virtual site (Block 740). The distance calculated in Block 738 is modified by the angle calculated in Block 740 so that virtual site(s) which are closer to the center of the reference's field of view have a higher priority (Block 744). The URLs for the virtual site(s) assigned a priority in Block 744 are added to the priority list with the highest priority virtual sites' URLs appearing at the head of the list (Block 746).

The program then determines whether the list of virtual site(s) has been depleted (Block 748). If the answer is no, the program increments the pointer to the next virtual site (Block 749) in the list and returns to Block 738. If the answer is yes, the program sends the priority list to the Asynchronous Download Module Block 800 (Block 750).

Asynchronous Download Module

An Asynchronous Download Module is provided for administrating the downloading of data from prioritized virtual sites. Referring to FIGS. 24A–24D, operations for the Asynchronous Download Module are illustrated. The Asynchronous Download Module is invoked (Block 800) when the priority list is sent from the Priority Caching Module at Block 750, as described in detail above. When the Asynchronous Download Module receives a new priority list (Block 802), the program resets the priority list pointer to the highest priority URL in the list, which is at the head of the list (Block 804). The program determines whether the URL currently pointed to in the priority list is in the cache (Block 806). If the answer is no, the program proceeds to Block 812. If the answer is yes, the priority for the cached URL which is pointed to in the priority list is reset (Block 808). The URL in the cache is marked as updated (Block 810). The priority list pointer is incremented to the next URL in the list (Block 812) and then the program determines whether the URLs in the priority list are exhausted (Block 814). If the answer is no, the program loops back to Block 806. If the answer is yes, the priority of all unmarked URLs is updated to the lowest priority and all marked URLs are unmarked (Block 816).

The priority list pointer is reset to the highest priority URL in the list, which is at the head of the list (Block 818). The program then determines whether a subordinate process is available for downloading the current URL (Block 820). If the answer is yes, the program advances to Block 824. If the answer is no, the program waits for a subordinate process to become available (Block 822). Once a subordinate process is available the program determines whether there is room available in the cache for the current URL (Block 824). If the answer is yes, the program advances to Block 856. If the answer is no, the program advances to Block 826 where a pointer to the first URL in the cache is created.

The program then determines whether there is a cached URL of lesser priority than the URL to be loaded (Block 828). If the answer is no, the program proceeds to Block 834. If the answer is yes, the program adds the URL into a list of potential replacements based on its priority (Block 830). URLs with lower priorities are placed near the head of the list. Next, the program tallies the accumulated space owned by the URLs in the potential replacements list (Block 832). The program then determines whether there are any other URLs in the cache (Block 834). If the answer is no, the program proceeds to Block 836 where the pointer is incremented to the next URL in the cache, and then the program loops back to Block 828. If the answer is yes, the program determines whether there is enough potential space available in the cache (Block 838). If the answer is yes, the program proceeds to Block 840 where a pointer is created to the first URL in the potential replacements list. If the answer is no, the program returns to Block 860 and a determination of whether the priority list is exhausted is made.

If there is enough potential space in the cache and a pointer has been created to the first URL in the potential replacements list, the program determines whether the URL is completely downloaded (Block 842). If the answer is no, the subordinate download process is interrupted (Block 844). If the answer is yes, the program advances to Block 846 and tallies the accumulated space owned by the URLs up to the current potential replacements list pointer. The program then determines if the tally of accumulated space is less than the necessary space (Block 848). If the answer is no, the program proceeds to Block 850 and increments the potential replacements list pointer. The program then loops back to Block 842. If the answer is yes, the program frees all URLs in the potential replacements list up to the current pointer (Block 852). The program then adjusts the cache size (Block 854) and advances to Block 856 where it records the remaining cache size.

After recording the remaining cache size, the program retrieves and stores the URL into the cache (Block 858). The program then determines if the priority list is exhausted (Block 860). If the answer is no, the priority list pointer is incremented to the next URL in the list (Block 862) and the program loops back to Block 820. If the priority list has been exhausted as determined in Block 860, the Asynchronous Download Module ends (Block 864).

Accessing Cached Data Module

Figure 25:
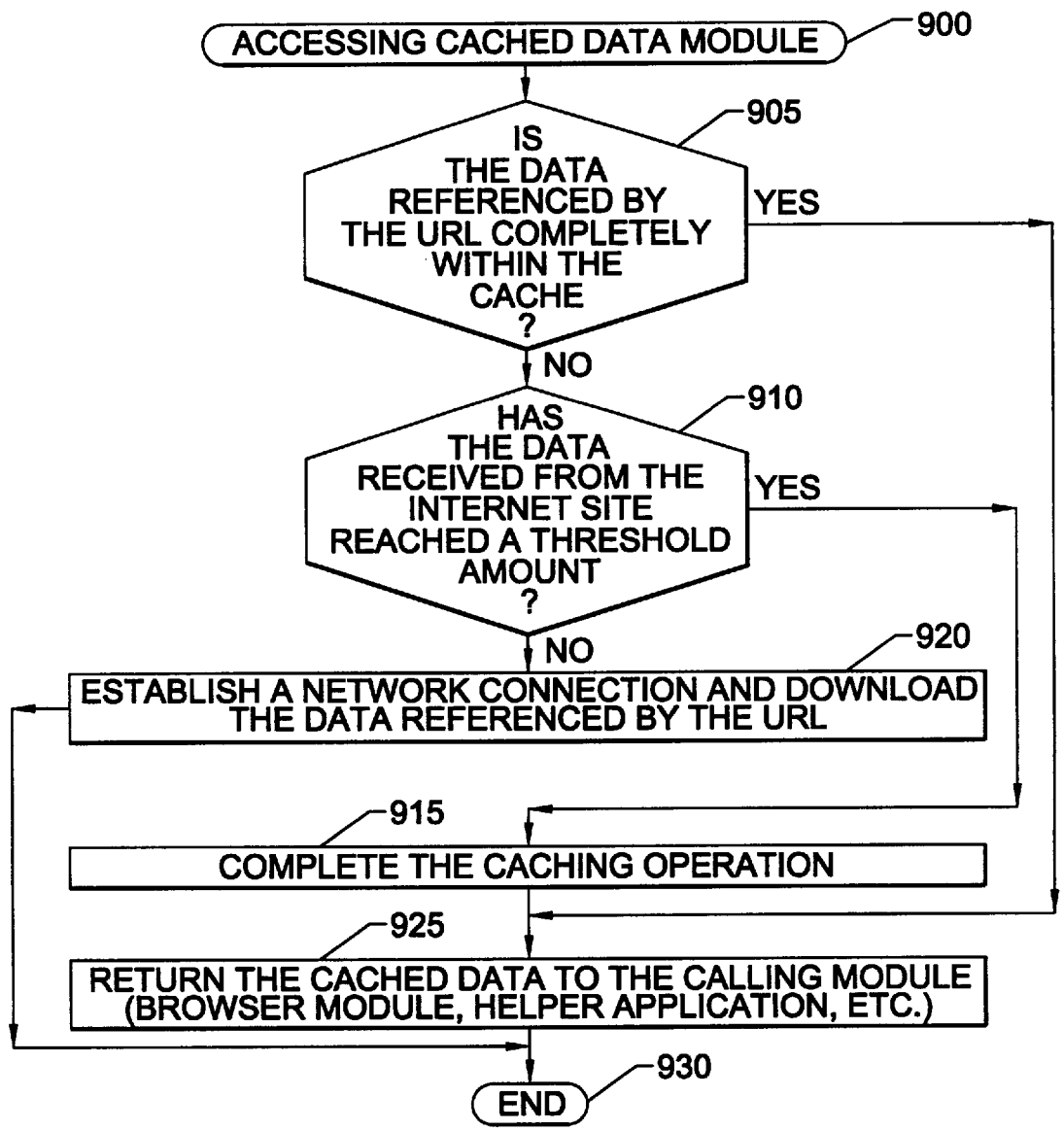
FIG. 25 is a flow chart illustrating operations for the Accessing Cached Data Module, according to the present invention.

Referring now to FIG. 25, the steps for the Accessing Cached Data Module (Block 900) is described in detail. Initially, the program determines whether the URL is completely in the cache (Block 905). If the answer is no, the program determines whether the amount of data received from the Internet site has reached a threshold amount (Block 910). If the answer is no, the program establishes a network connection and downloads the URL (Block 920). The Accessing Cached Data Module ends at this point (Block 930). If, in Block 905 it is determined that the cached data is complete the program returns the cached data to the module or helper application (Block 925), and the Accessing Cached Data Module ends (Block 930). If the program determines in Block 910 that the amount of the completed data has reached a threshold value the program completes the caching operation (Block 915), returns the URL to the module or helper application (Block 925) and the Accessing Cached Data Module ends (Block 930).

Other Modules

The client software may comprise a plurality of additional modules for implementing the present invention. For example, application programming interface (API) module (s) may be provided for a wide range of objectives, including, but not limited to, enabling applet or scripting languages such as Java, Java Script, or Visual Basic Script to interact with the virtual environment. Potential uses include automatically invoking scripts when a user comes within a predetermined distance (proximity threshold) of a virtual site. For example, a Java applet may be activated that creates a 3D blimp which cruises in a predetermined pattern around a virtual site.

Security modules may also be provided for, allowing service providers to hide their virtual sites, corresponding information, and services from unauthorized users. Security modules may also allow users to access files and applications from local area networked computers as virtual sites within the virtual environment. Security modules may make possible rated sites, Intranet security features, document sharing, and the like. In this way, Intranet sites can be represented in the virtual environment, but may be accessible (visible) to authorized users only.

A HUD Module may be provided for processing, filtering and enhancing displayed data for the user. An API for invoking and interacting with document viewers (i.e., browsers, movie players, and the like) may be provided. A helper application process/displays Internet site data.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A system for accessing plurality of Internet sites, comprising:

means for displaying on a user computer said plurality of Internet sites as a multi-dimensional virtual environment, said virtual environment including at least one respective virtual site for each one of said plurality of Internet sites, wherein the virtual sites have a geographic relationship in the displayed multi-dimensional virtual environment which is different from a geographic relationship of the plurality of Internet sites, said displaying means comprising:

means for retrieving Internet site data from the user computer; and means for retrieving Internet site data from an Internet site corresponding to a respective virtual site;

navigating means, responsive to user inputs, for moving a reference through the displayed multi-dimensional virtual environment, and for accessing selected ones of said Internet sites via respective virtual sites in the displayed multi-dimensional virtual environment, said navigating means comprising:

means for allowing a user to adjust speed, distance, and elevation of the reference relative to virtual sites during navigation of said multi-dimensional virtual environment; and caching means for reducing time required for a user to receive Internet site data, said caching means comprising:

means for assigning data transfer priorities to a plurality of virtual sites within a predetermined vicinity of a field of view of the reference;

means for initiating transfer of data related to an Internet site to said caching means based on a data transfer priority assigned to a respective virtual site before a user activates said Internet site via said respective virtual site; and means for receiving and storing transferred data related to an Internet site.

2. A system according to claim 1 further comprising virtual site modification means for allowing a user to modify appearance and functionality of virtual sites and virtual site contents within the displayed multi-dimensional virtual environment, said virtual site modification means comprising:

means for adding elements to a virtual site;

means for modifying existing elements of a virtual site; and means for communicating information about virtual site element additions and modifications made by a user to other users.

3. A system according to claim 1 further comprising virtual environment modification means for allowing a user to modify portions of the displayed multi-dimensional virtual environment, said virtual environment modification means comprising:

means for adding elements to a zone surrounding a virtual site;

means for modifying existing elements of a zone surrounding a virtual site; and means for communicating information about virtual site zone element additions and modifications made by a user to other users.

4. A system according to claim 3, wherein said data transfer priority assigning means comprises:

means for adding data transfer priorities to virtual sites entering the reference field of view;

means for removing data transfer priorities from virtual sites leaving the reference field of view; and means for changing data transfer priorities of virtual sites moving within the reference field of view.

5. A system according to claim 3, wherein said data transfer priority assigning means comprises:

means for superimposing a priority field over the virtual environment around a position of the reference within the virtual environment, the priority field comprising a plurality of zones; and means for assigning data transfer priority values to virtual sites within each of said plurality of zones.

6. A system according to claim 5, wherein said plurality of zones are arranged in a concentric pattern extending outwardly from the position of the reference within the virtual environment, and wherein a highest data transfer priority value is assigned to each virtual site within a zone closest to a position of the reference within the virtual environment.

7. A system according to claim 5 wherein said priority field is configured to move with the reference within the virtual environment.

8. A system according to claim 5 wherein said data transfer priority assigning means further comprises means for modifying data transfer priorities assigned to virtual sites within each of said plurality of zones in response to acceleration of movement of the reference within the virtual environment.

9. A system according to claim 5, wherein said means for assigning a data transfer priority to a plurality of virtual sites comprises means for assigning a data transfer priority based upon the data contained at an Internet site.

10. A system according to claim 1, further comprising virtual site construction means for allowing a user to construct virtual sites on portions of the multi-dimensional virtual environment, said virtual environment construction means comprising means for communicating information about virtual site construction performed by a user to other users.

11. A system according to claim 10 wherein said communication means comprises means for communicating information about virtual site construction performed by a user to selected other users.

12. A system for accessing a plurality of Internet sites, comprising:

means for displaying on a user computer said plurality of Internet sites as a multi-dimensional virtual environment, said virtual environment including at least one respective virtual site for each one of said plurality of Internet sites, wherein the virtual sites have a geographic relationship in the displayed multi-dimensional virtual environment which is different from a geographic relationship of the plurality of Internet sites, said displaying means comprising:

means for retrieving Internet site data from the user computer; and means for retrieving Internet site data from an Internet site corresponding to a respective virtual site;

navigating means, responsive to user inputs, for moving a reference through the displayed multi-dimensional virtual environment, and for accessing selected ones of said Internet sites via respective virtual sites in the displayed multi-dimensional virtual environment; and leasing means, responsive to user requests, for allowing a user to lease portions of the displayed multi-dimensional virtual environment within a field of view of the reference, said leasing means comprising:

means for identifying one or more portions of the virtual environment that are available for leasing;

means for determining a lease rate for the identified one or more portions of the virtual environment available for leasing;

means for communicating acceptance of a lease rate for a respective portion of the virtual environment available for leasing to an owner of the respective virtual environment portion; and means for communicating information about a user lease of one or more portions of the virtual environment to other users.

13. A system according to claim 12 wherein said navigating means comprises:

means for allowing a user to adjust speed, distance, and elevation of the reference relative to virtual sites during navigation of said multi-dimensional virtual environment; and caching means for reducing time required for a user to receive Internet site data, said caching means comprising:

means for assigning data transfer priorities to a plurality of virtual sites within a predetermined vicinity of a field of view of the reference;

means for initiating transfer of data related to an Internet site to said caching means based on a data transfer priority assigned to a respective virtual site before a user activates said Internet site via said respective virtual site; and means for receiving and storing transferred data related to an Internet site.

14. A system according to claim 13, wherein said data transfer priority assigning means comprises:

means for adding transfer priorities to virtual sites entering the reference field of view;

means for removing data transfer priorities from virtual sites leaving the reference field of view; and means for changing data transfer priorities of virtual sites moving within the reference field of view.

15. A system according to claim 13, wherein said data transfer priority assigning means comprises:

means for superimposing a priority field over the virtual environment around a position of the reference within the virtual environment, the priority field comprising a plurality of zones; and means for assigning data transfer priority values to virtual sites within each of said plurality of zones.

16. A system according to claim 15, wherein said plurality of zones are arranged in a concentric pattern extending outwardly from the position of the reference within the virtual environment, and wherein a highest data transfer priority value is assigned to each virtual site within a zone closest to a position of the reference within the virtual environment.

17. A system according to claim 15 wherein said priority field is configured to move with the reference within the virtual environment.

18. A system according to claim 15 wherein said data transfer priority assigning means further comprises means for modifying data transfer priorities assigned to virtual sites within each of said plurality of zones in response to acceleration of movement of the reference within the virtual environment.

19. A system according to claim 15, wherein said means for assigning a data transfer priority to a plurality of virtual sites comprises means for assigning a data transfer priority based upon the data contained at an Internet site.

20. A system according to claim 12, wherein said leasing means further comprises means for validating ownership of one or more portions of the displayed virtual environment within a field of view of the reference.

21. A system according to claim 12 further comprising relocating means, responsive to said leasing means, for allowing a user to relocate one or more virtual sites within the displayed multi-dimensional virtual environment, said relocating means comprising means for communicating information about virtual site relocations made by a user to other users.

22. A system according to claim 12 further comprising virtual site modification means for allowing a user to modify appearance and functionality of virtual sites and virtual site contents within the displayed multi-dimensional virtual environment, said virtual site modification means comprising:

means for adding elements to a virtual site;
means for modifying existing elements of a virtual site; and
means for communicating information about virtual site element additions and modifications made by a user to other users.

23. A system according to claim 12 further comprising virtual environment modification means for allowing a user to modify portions of the displayed multi-dimensional virtual environment, said virtual environment modification means comprising:

means for adding elements to a zone surrounding a virtual site;
means for modifying existing elements of a zone surrounding a virtual site; and
means for communicating information about virtual site zone element additions and modifications made by a user to other users.

24. A computer program product for accessing a plurality of Internet sites, the computer program product comprising a computer usable storage medium having computer readable program code means embodied in the medium, the computer readable program code means comprising:

computer readable program code means for displaying on a user computer said plurality of Internet sites as a multi-dimensional virtual environment, said virtual environment including at least one respective virtual site for each one of said plurality of Internet sites, wherein the virtual sites have a geographic relationship in the displayed multi-dimensional virtual environment which is different from a geographic relationship of the plurality of Internet sites, said displaying means comprising:
    computer readable program code means for retrieving Internet site data from the user computer; and
    computer readable program code means for retrieving Internet site data from an Internet site corresponding to a respective virtual site;
computer readable program code means, responsive to user inputs, for moving a reference through the displayed multi-dimensional virtual environment, and for accessing selected ones of said Internet sites via respective virtual sites in the displayed multi-dimensional virtual environment, comprising:
    computer readable program code means for allowing a user to adjust speed, distance, and elevation of the reference relative to virtual sites during navigation of said multi-dimensional virtual environment; and
    computer readable program code means for reducing time required for a user to receive Internet site data, comprising:
        computer readable program code means for assigning data transfer priorities to a plurality of virtual sites within a predetermined vicinity of a field of view of the reference;
        computer readable program code means for initiating transfer of data related to an Internet site based on a data transfer priority assigned to a respective virtual site before a user activates said Internet site via said respective virtual site; and
        computer readable program code means for receiving and storing transferred data related to an Internet site.

25. A computer program product according to claim 24 further comprising computer readable program code means for allowing a user to modify appearance and functionality of virtual sites and virtual site contents within the displayed multi-dimensional virtual environment, comprising:

computer readable program code means for adding elements to a virtual site;
computer readable program code means for modifying existing elements of a virtual site; and
computer readable program code means for communicating information about virtual site element additions and modifications made by a user to other users.

26. A computer program product according to claim 24 further comprising computer readable program code means for allowing a user to modify portions of the displayed multi-dimensional virtual environment, comprising:

computer readable program code means for adding elements to a zone surrounding a virtual site;
computer readable program code means for modifying existing elements of a zone surrounding a virtual site; and
computer readable program code means for communicating information about virtual site zone element additions and modifications made by a user to other users.

27. A computer program product according to claim 26, wherein said computer readable program code means for assigning data transfer priorities comprises:

computer readable program code means for adding data transfer priorities to virtual sites entering the reference field of view;

computer readable program code means for removing data transfer priorities from virtual sites leaving the reference field of view; and computer readable program code means for changing data transfer priorities of virtual sites moving within the reference field of view.

28. A computer program product according to claim 26, wherein said computer readable program code means for assigning data transfer priorities comprises:

computer readable program code means for superimposing a priority field over the virtual environment around a position of the reference within the virtual environment, the priority field comprising a plurality of zones; and computer readable program code means for assigning data transfer priority values to virtual sites within each of said plurality of zones.

29. A computer program product according to claim 28, wherein said plurality of zones are arranged in a concentric pattern extending outwardly from the position of the reference within the virtual environment, and wherein a highest data transfer priority value is assigned to each virtual site within a zone closest to a position of the reference within the virtual environment.

30. A computer program product according to claim 28 wherein said priority field is configured to move with the reference within the virtual environment.

31. A computer program product according to claim 28 wherein said computer readable program code means for assigning data transfer priorities further comprises computer readable program code means for modifying data transfer priorities assigned to virtual sites within each of said plurality of zones in response to acceleration of movement of the reference within the virtual environment.

32. A computer program product according to claim 28, wherein said computer readable program code means for assigning a data transfer priority to a plurality of virtual sites comprises computer readable program code means for assigning a data transfer priority based upon the data contained at an Internet site.

33. A computer program product according to claim 24, further comprising computer readable program code means for allowing a user to construct virtual sites on portions of the multi-dimensional virtual environment, comprising computer readable program code means for communicating information about virtual site construction performed by a user to other users.

34. A computer program product according to claim 33 wherein said computer readable program code means for communicating information about virtual site construction comprises computer readable program code means for communicating information about virtual site construction performed by a user to selected other users.

35. A computer program product for accessing a plurality of Internet sites, the computer program product comprising a computer usable storage medium having computer readable program code means embodied in the medium, the computer readable program code means comprising:

computer readable program code means for displaying on a user computer said plurality of Internet sites as a multi-dimensional virtual environment, said virtual environment including at least one respective virtual site for each one of said plurality of Internet sites, wherein the virtual sites have a geographic relationship in the displayed multi-dimensional virtual environment which is different from a geographic relationship of the plurality of Internet sites, said displaying means comprising:

computer readable program code means for retrieving Internet site data from the user computer; and computer readable program code means for retrieving Internet site data from an Internet site corresponding to a respective virtual site;

computer readable program code means, responsive to user inputs, for moving a reference through the displayed multi-dimensional virtual environment, and for accessing selected ones of said Internet sites via respective virtual sites in the displayed multi-dimensional virtual environment; and computer readable program code means, responsive to user requests, for allowing a user to lease portions of the displayed multi-dimensional virtual environment within a field of view of the reference, comprising:

computer readable program code means for identifying one or more portions of the virtual environment that are available for leasing;

computer readable program code means for determining a lease rate for the identified one or more portions of the virtual environment available for leasing;

computer readable program code means for communicating acceptance of a lease rate for a respective portion of the virtual environment available for leasing to an owner of the respective virtual environment portion; and computer readable program code means for communicating information about a user lease of one or more portions of the virtual environment to other users.

36. A computer program product according to claim 35 wherein said computer readable program code means for moving a reference through the displayed multi-dimensional virtual environment comprises:

computer readable program code means for allowing a user to adjust speed, distance, and elevation of the reference relative to virtual sites during navigation of said multi-dimensional virtual environment; and computer readable program code means for reducing time required for a user to receive Internet site data, comprising:

computer readable program code means for assigning data transfer priorities to a plurality of virtual sites within a predetermined vicinity of a field of view of the reference;

computer readable program code means for initiating transfer of data related to an Internet site based on a data transfer priority assigned to a respective virtual site before a user activates said Internet site via said respective virtual site; and computer readable program code means for receiving and storing transferred data related to an Internet site.

37. A computer program product according to claim 36, wherein said computer readable program code means for assigning data transfer priorities comprises:

computer readable program code means for adding transfer priorities to virtual sites entering the reference field of view;

computer readable program code means for removing data transfer priorities from virtual sites leaving the reference field of view; and computer readable program code means for changing data transfer priorities of virtual sites moving within the reference field of view.

38. A computer program product according to claim 36, wherein said computer readable program code means for assigning data transfer priorities comprises:

computer readable program code means for superimposing a priority field over the virtual environment around a position of the reference within the virtual environment, the priority field comprising a plurality of zones; and computer readable program code means for assigning data transfer priority values to virtual sites within each of said plurality of zones.

39. A computer program product according to claim 38, wherein said plurality of zones are arranged in a concentric pattern extending outwardly from the position of the reference within the virtual environment, and wherein a highest data transfer priority value is assigned to each virtual site within a zone closest to a position of the reference within the virtual environment.

40. A computer program product according to claim 38 wherein said priority field is configured to move with the reference within the virtual environment.

41. A computer program product according to claim 38 wherein said computer readable program code means for assigning data transfer priorities further comprises computer readable program code means for modifying data transfer priorities assigned to virtual sites within each of said plurality of zones in response to acceleration of movement of the reference within the virtual environment.

42. A computer program product according to claim 38, wherein said computer readable program code means for assigning data transfer priorities to a plurality of virtual sites comprises computer readable program code means for assigning a data transfer priority based upon the data contained at an Internet site.

43. A computer program product according to claim 35, wherein said computer readable program code means for leasing portions of the displayed multi-dimensional virtual environment further comprises computer readable program code means for validating ownership of one or more portions of the displayed virtual environment within a field of view of the reference.

44. A computer program product according to claim 35 further comprising computer readable program code means, responsive to said computer readable program code means for leasing portions of the displayed multi-dimensional virtual environment, for allowing a user to relocate one or more virtual sites within the displayed multi-dimensional virtual environment, comprising computer readable program code means for communicating information about virtual site relocations made by a user to other users.

45. A computer program product according to claim 35 further comprising computer readable program code means for allowing a user to modify appearance and functionality of virtual sites and virtual site contents within the displayed multi-dimensional virtual environment, comprising:

computer readable program code means for adding elements to a virtual site;

computer readable program code means for modifying existing elements of a virtual site; and computer readable program code means for communicating information about virtual site element additions and modifications made by a user to other users.

46. A computer program product according to claim 35 further comprising computer readable program code means for allowing a user to modify portions of the displayed multidimensional virtual environment, comprising:

computer readable program code means for adding elements to a zone surrounding a virtual site;

computer readable program code means for modifying existing elements of a zone surrounding a virtual site; and computer readable program code means for communicating information about virtual site zone element additions and modifications made by a user to other users.

47. A method of accessing a plurality of Internet sites, the method comprising the steps of:

displaying on a user computer said plurality of Internet sites as a multi-dimensional virtual environment, said virtual environment including at least one respective virtual site for each one of said plurality of Internet sites, wherein the virtual sites have a geographic relationship in the displayed multi-dimensional virtual environment which is different from a geographic relationship of the plurality of Internet sites;

responsive to user inputs, moving a reference through the displayed multi-dimensional virtual environment, and accessing selected ones of said Internet sites via respective virtual sites in the displayed multi-dimensional virtual environment, comprising:

adjusting speed, distance, and elevation of the reference relative to virtual sites during navigation of said multi-dimensional virtual environment; and caching Internet site data, comprising:

assigning data transfer priorities to a plurality of virtual sites within a predetermined vicinity of a field of view of the reference;

initiating transfer of data related to an Internet site based on a data transfer priority assigned to a respective virtual site before a user activates said Internet site via said respective virtual site; and receiving and storing transferred data related to an Internet site.

48. A method according to claim 47 further comprising modifying appearance and functionality of virtual sites and virtual site contents within the displayed multi-dimensional virtual environment, comprising:

adding elements to a virtual site;

modifying existing elements of a virtual site; and communicating information about virtual site element additions and modifications made by a user to other users.

49. A method according to claim 47 further comprising modifying portions of the displayed multi-dimensional virtual environment, comprising:

adding elements to a zone surrounding a virtual site;

modifying existing elements of a zone surrounding a virtual site; and communicating information about virtual site zone element additions and modifications made by a user to other users.

50. A method according to claim 49, comprising:

adding data transfer priorities to virtual sites entering the reference field of view;

removing data transfer priorities from virtual sites leaving the reference field of view; and changing data transfer priorities of virtual sites moving within the reference field of view.

51. A method according to claim 49, comprising:

superimposing a priority field over the virtual environment around a position of the reference within the virtual environment, the priority field comprising a plurality of zones; and assigning data transfer priority values to virtual sites within each of said plurality of zones.

52. A method according to claim 51, wherein said plurality of zones are arranged in a concentric pattern extending outwardly from the position of the reference within the virtual environment, and wherein a highest data transfer priority value is assigned to each virtual site within a zone closest to a position of the reference within the virtual environment.

53. A method according to claim 51 wherein said priority field is configured to move with the reference within the virtual environment.

54. A method according to claim 51 wherein data transfer priority assigning comprises modifying data transfer priorities assigned to virtual sites within each of said plurality of zones in response to acceleration of movement of the reference within the virtual environment.

55. A method according to claim 51, wherein assigning a data transfer priority to a plurality of virtual sites comprises assigning a data transfer priority based upon the data contained at an Internet site.

56. A method according to claim 47, further comprising:
constructing virtual sites on portions of the multi-dimensional virtual environment; and
communicating information about virtual site construction performed by a user to other users.

57. A method according to claim 56 wherein further comprising communicating information about virtual site construction performed by a user to selected other users.

58. A method for accessing a plurality of Internet sites, the method comprising the steps of:
displaying on a user computer said plurality of Internet sites as a multi-dimensional virtual environment, said virtual environment including at least one respective virtual site for each one of said plurality of Internet sites, wherein the virtual sites have a geographic relationship in the displayed multi-dimensional virtual environment which is different from a geographic relationship of the plurality of Internet sites, comprising:
retrieving Internet site data from the user computer; and
retrieving Internet site data from an Internet site corresponding to a respective virtual site;
responsive to user inputs, moving a reference through the displayed multi-dimensional virtual environment, and accessing selected ones of said Internet sites via respective virtual sites in the displayed multi-dimensional virtual environment; and
leasing portions of the displayed multi-dimensional virtual environment within a field of view of the reference, comprising:
identifying one or more portions of the virtual environment that are available for leasing;
determining a lease rate for the identified one or more portions of the virtual environment available for leasing;
communicating acceptance of a lease rate for a respective portion of the virtual environment available for leasing to an owner of the respective virtual environment portion; and
communicating information about a user lease of one or more portions of the virtual environment to other users.

59. A method according to claim 58 wherein the step of moving a reference through the displayed multidimensional virtual environment comprises:
allowing a user to adjust speed, distance, and elevation of the reference relative to virtual sites during navigation of said multi-dimensional virtual environment; and
caching Internet site data, comprising:
assigning data transfer priorities to a plurality of virtual sites within a predetermined vicinity of a field of view of the reference;
initiating transfer of data related to an Internet site based on a data transfer priority assigned to a respective virtual site before a user activates said Internet site via said respective virtual site; and
receiving and storing transferred data related to an Internet site.

60. A method according to claim 59, wherein the step of assigning data transfer priorities comprises:
adding transfer priorities to virtual sites entering the reference field of view;
removing data transfer priorities from virtual sites leaving the reference field of view; and
changing data transfer priorities of virtual sites moving within the reference field of view.

61. A method according to claim 59, wherein the step of assigning data transfer priorities comprises:
superimposing a priority field over the virtual environment around a position of the reference within the virtual environment, the priority field comprising a plurality of zones; and
assigning data transfer priority values to virtual sites within each of said plurality of zones.

62. A method according to claim 61, wherein said plurality of zones are arranged in a concentric pattern extending outwardly from the position of the reference within the virtual environment, and wherein a highest data transfer priority value is assigned to each virtual site within a zone closest to a position of the reference within the virtual environment.

63. A method according to claim 61 wherein said priority field is configured to move with the reference within the virtual environment.

64. A system according to claim 61 wherein the step of assigning data transfer priorities further comprises modifying data transfer priorities assigned to virtual sites within each of said plurality of zones in response to acceleration of movement of the reference within the virtual environment.

65. A method according to claim 61, wherein the step of assigning a data transfer priority to a plurality of virtual sites comprises assigning a data transfer priority based upon the data contained at an Internet site.

66. A method according to claim 58, further comprising validating ownership of one or more portions of the displayed virtual environment within a field of view of the reference.

67. A method according to claim 58 further comprising:
relocating one or more virtual sites within the displayed multi-dimensional virtual environment; and
communicating information about virtual site relocations made by a user to other users.

68. A method according to claim 58 further comprising modifying appearance and functionality of virtual sites and virtual site contents within the displayed multi-dimensional virtual environment, comprising:
adding elements to a virtual site;
modifying existing elements of a virtual site; and
communicating information about virtual site element additions and modifications made by a user to other users.

69. A method according to claim 58 further comprising modifying portions of the displayed multidimensional virtual environment, comprising:
adding elements to a zone surrounding a virtual site;
modifying existing elements of a zone surrounding a virtual site; and
communicating information about virtual site zone element additions and modifications made by a user to other users.

* * * * *

UNITED STATES PATENT AND TRADEMARK OFFICE
CERTIFICATE OF CORRECTION

PATENT NO. : 5,889,951
DATED : March 30, 1999
INVENTOR(S) : Julian Lombardi

It is certified that error appears in the above-identified patent and that said Letters Patent is hereby corrected as shown below:

Other Publications:
  Page 2, line 5 should read -- "Integrated Data Systems": (http://www.ids-net.com/ids/in- --

Column 10, line 56 -- Client Database(s) should be centered as a subheading. Paragraph begins with Portions of ...

Column 30, line 23 add "a" after accessing

Signed and Sealed this

Fourteenth Day of December, 1999

Attest:

Q. TODD DICKINSON

Attesting Officer

Acting Commissioner of Patents and Trademarks